United States Patent
Tange et al.

(10) Patent No.: US 12,242,533 B2
(45) Date of Patent: Mar. 4, 2025

(54) CONTENT PROVIDING SYSTEM, CONTENT PROVIDING METHOD, AND STORAGE MEDIUM

(71) Applicant: Sony Group Corporation, Tokyo (JP)

(72) Inventors: Akira Tange, Tokyo (JP); Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 17/774,145

(22) PCT Filed: Nov. 18, 2020

(86) PCT No.: PCT/JP2020/042907
§ 371 (c)(1),
(2) Date: May 4, 2022

(87) PCT Pub. No.: WO2021/111872
PCT Pub. Date: Jun. 10, 2021

(65) Prior Publication Data
US 2022/0391440 A1    Dec. 8, 2022

(30) Foreign Application Priority Data
Dec. 2, 2019   (JP) ................................ 2019-218214

(51) Int. Cl.
*G06F 16/683* (2019.01)
*G06F 16/383* (2019.01)
*G10L 13/08* (2013.01)

(52) U.S. Cl.
CPC .......... *G06F 16/683* (2019.01); *G06F 16/383* (2019.01); *G10L 13/08* (2013.01)

(58) Field of Classification Search
CPC .. G06Q 30/0252; G06Q 30/06; G06Q 50/184; G06Q 10/101; G06Q 30/0276;
(Continued)

(56) References Cited

U.S. PATENT DOCUMENTS 10,949,429 B1 * 3/2021 Jackson ................ H04L 67/306
11,113,449 B2 * 9/2021 Pinnamaneni ........ G06F 40/106
(Continued)

FOREIGN PATENT DOCUMENTS

JP      2002-342206 A      11/2002
JP      2004348895 A    * 12/2004
(Continued)

OTHER PUBLICATIONS

International Search Report and Written Opinion mailed on Feb. 9, 2021, received for PCT Application PCT/JP2020/042907, Filed on Nov. 18, 2020, 8 pages including English Translation.

*Primary Examiner* — Phung-Hoang J Nguyen
(74) *Attorney, Agent, or Firm* — XSENSUS LLP

(57) ABSTRACT

A content provision system in which a script that is generated by a creator and includes identification information of content and comment information is stored in a predetermined storage medium to be browsable by a user, the content providing system including a control unit that performs control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

19 Claims, 41 Drawing Sheets

(58) Field of Classification Search
CPC .... G06Q 30/0241; G06Q 50/10; G06Q 50/40; G06F 16/683; G06F 16/60; G06F 16/483; G06F 16/383; G06F 16/40; G10L 13/08; G10L 13/00
USPC ............................................................ 700/94
See application file for complete search history.

(56) References Cited

U.S. PATENT DOCUMENTS

| | | | | |
|---|---|---|---|---|
| 2003/0226012 | A1* | 12/2003 | Asokan | G06F 21/10 380/277 |
| 2004/0028195 | A1* | 2/2004 | Leyden | H04M 1/72403 704/275 |
| 2006/0180647 | A1* | 8/2006 | Hansen | G07F 17/20 235/375 |
| 2007/0260460 | A1 | 11/2007 | Hyatt | |
| 2008/0256109 | A1* | 10/2008 | Irvin | G06F 16/637 707/999.102 |
| 2008/0282870 | A1* | 11/2008 | Carrick | G06F 16/68 84/601 |
| 2010/0082349 | A1* | 4/2010 | Bellegarda | G10L 13/08 704/260 |
| 2010/0107082 | A1* | 4/2010 | Ban | H04N 21/4325 715/733 |
| 2012/0102124 | A1* | 4/2012 | Hansson | G06Q 30/02 709/204 |
| 2013/0262118 | A1* | 10/2013 | Saeki | G05B 15/02 704/260 |

FOREIGN PATENT DOCUMENTS

| | | |
|---|---|---|
| JP | 2007-164078 A | 6/2007 |
| JP | 2011-166833 A | 8/2011 |
| JP | 2015-60545 A | 3/2015 |
| JP | 2015-518171 A | 6/2015 |
| KR | 101721155 B1 | 4/2017 |
| WO | 2004/073309 A1 | 8/2004 |

* cited by examiner

FIG. 17

```
Program is :

Opening Talk File
→(Speech File1→Song1→Speech File2)
→(Speech File3→Song2→Speech File4)
→
```

CONTENT PROVIDING SYSTEM, CONTENT PROVIDING METHOD, AND STORAGE MEDIUM

CROSS-REFERENCE TO RELATED APPLICATIONS

The present application is based on PCT filing PCT/JP2020/042907, filed Nov. 18, 2020, which claims priority to Japanese Patent Application No. 2019-218214, filed Dec. 2, 2019, the entire contents of each are incorporated herein by reference.

TECHNICAL FIELD

The present technology relates to a content providing system, a content providing method, and a storage medium, and particularly relates to a content providing system, a content providing method, and a storage medium capable of providing content and a comment thereof more easily.

BACKGROUND ART

In recent years, with diversification of methods for providing content, various services and devices have been provided (see, for example, Patent Documents 1 and 2).

Patent Document 1 discloses a device that automatically selects a stream to be reproduced on the basis of sequence information for controlling a reproduction order of the stream and outputs the stream to a television monitor. In this device, a stream and a character string to be output are combined and output according to sequence information.

Patent Document 2 discloses a program for causing a function to sequentially repeat extracting an element from a hypertext downloaded on the basis of an address extracted from a program list, voice synthesizing when there is a text to generate a voice, and extracting a material of a link destination and performing output corresponding to the material when there is a link.

CITATION LIST

Patent Document

Patent Document 1: International Publication WO 2004/073309
Patent Document 2: Japanese Patent Application Laid-Open No. 2002-342206

SUMMARY OF THE INVENTION

Problems to be Solved by the Invention

Meanwhile, when a comment regarding content or the like is provided together with the content, it is required to more easily provide the content and the comment thereof.

The present technology has been made in view of such a situation, and makes it possible to provide content and a comment thereof more easily.

Solutions to Problems

A content providing system according to one aspect of the present technology is a content provision system in which a script that is generated by a creator and includes identification information of content and comment information is stored in a predetermined storage medium to be browsable by a user, the content providing system including a control unit that performs control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

A content providing method according to one aspect of the present technology is a content providing method in which a script that is generated by a creator and includes identification information of content and comment information is stored in a predetermined storage medium to be browsable by a user, the content providing method including performing control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

A storage medium according to one aspect of the present technology is a storage medium recording a program in which a script that is generated by a creator and includes identification information of content and comment information is stored in a predetermined storage medium to be browsable by a user, the program causing a computer to function as a control unit that performs control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

In the content providing system, the content providing method, and the storage medium according to one aspect of the present technology, a script that is generated by a creator and includes identification information of content and comment information is stored in a predetermined storage medium to be browsable by a user, control is performed to execute reading, according to a script selected by the user, content indicated by content identification information included in the script by using a right that the user has already acquired by a contract with a specific service, and provide the content to the user, and control is performed to read a comment according to the comment information included in the script and provide the comment to the user at least one of before or after the provision of the content.

BRIEF DESCRIPTION OF DRAWINGS

FIG. 17 is a diagram illustrating an example of a script of a program generated by the program creation tool.

MODE FOR CARRYING OUT THE INVENTION

Hereinafter, embodiments of the present technology will be described with reference to the drawings. Note that the description will be made in the following order.

1. First embodiment: basic configuration
2. Second embodiment: function of cooperating with another service
3. Third embodiment: minimum use permission function
4. Fourth embodiment: advertisement function
5. Modification example
6. Configuration of computer <Representative Diagram>

Figure 1:
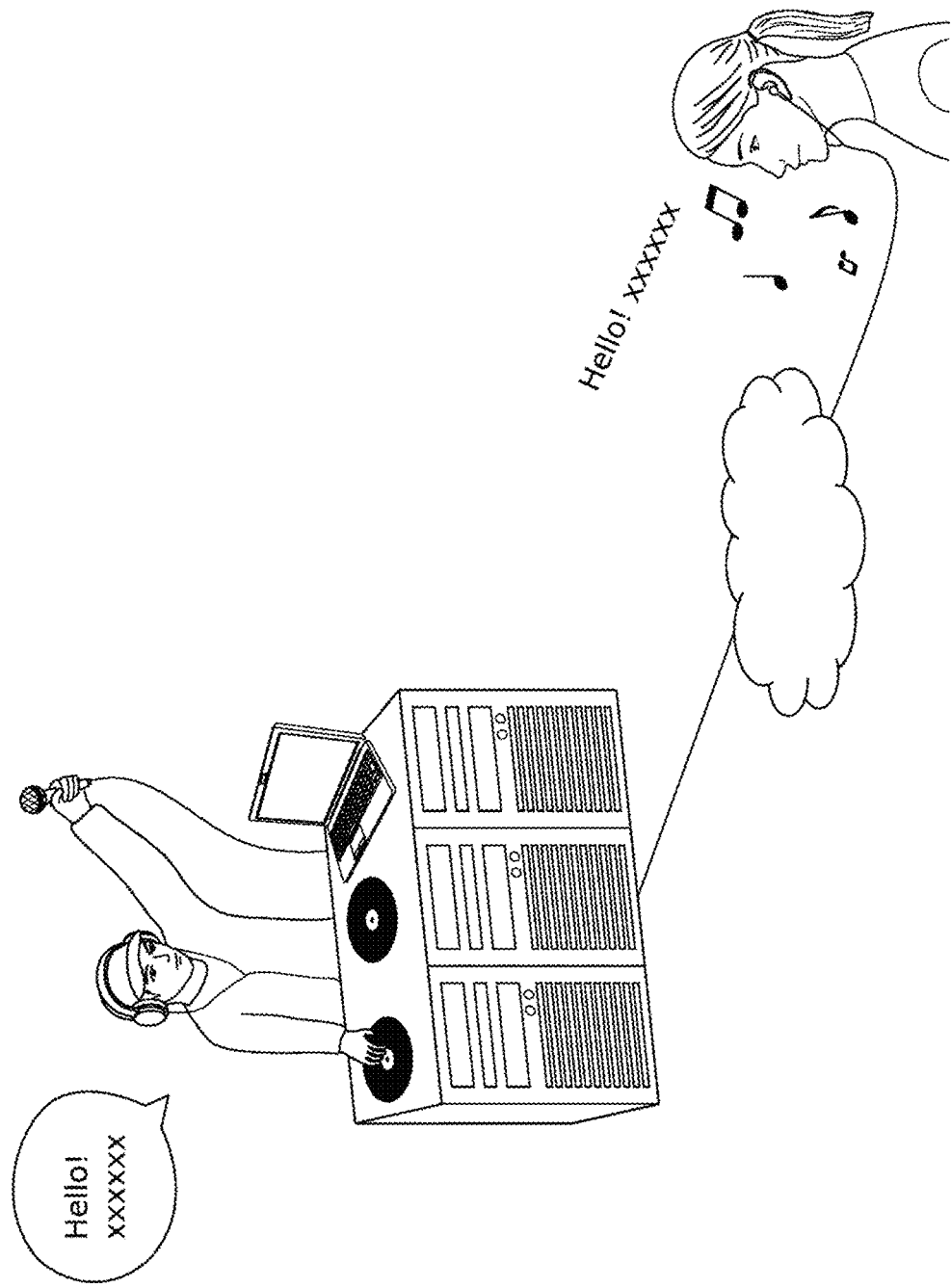
FIG. 1 is a representative diagram illustrating an outline of the present technology.

FIG. 1 is a representative diagram illustrating an outline of the present technology.

The present technology provides, when content is programmed, a comment regarding content or the like together with the content by using a contract of the user with a service or text-to-speech synthesis, to thereby provide the content and the comment thereof more easily.

In FIG. 1, a DJ distributes a song selected by himself or herself from a song distribution server and transmits a comment on the song using a microphone. On the other hand, a user listens to the song selected by the DJ and the transmitted comment distributed from the song distribution server.

Here, the DJ is assumed to be a virtual one created by a creator, but the song selected by the DJ is provided to the user using a music distribution service that the user has already contracted, and the comment transmitted by the DJ is provided to the user by text-to-speech synthesis, so that the content and the comment thereof can be provided more easily.

1. First Embodiment (Outline of Virtual Podcast System)

Figure 2:
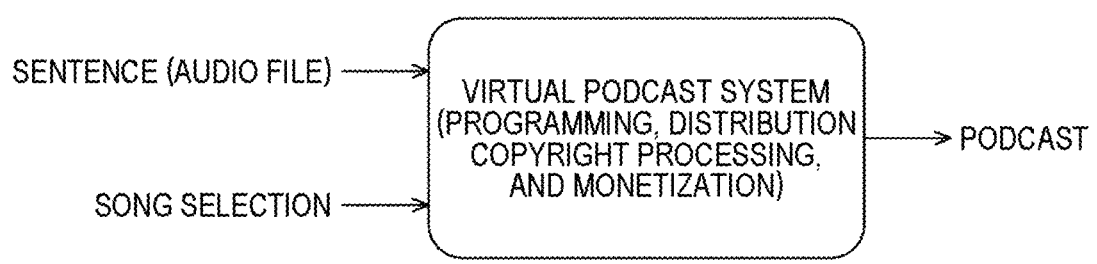
FIG. 2 is a diagram illustrating an outline of a content providing system to which the present technology is applied.

FIG. 2 illustrates an outline of a content providing system to which the present technology is applied. In the example of FIG. 2, a virtual podcast system is illustrated as an embodiment of the content providing system to which the present technology is applied.

The virtual podcast system is a system in which a creator can create a podcast program simply by operating his or her terminal device to select song and write a sentence. Podcasting is one of methods for disclosing audio and video data files on the Internet, and is a kind of Internet radio and Internet television. Note that the sentence is not limited to text, and may be provided as a voice file.

The podcast program created by the creator is registered in a distribution server. Thus, the user can operate the user's own terminal device and reproduce the podcast program distributed from the distribution server, so as to view or listen to the program.

Meanwhile, from the creator who distributes the podcast program, he or she would like to efficiently distribute the podcast program created by himself or herself to allow more users to view or listen to the podcast program.

Furthermore, in a case where a song is distributed through the podcast, copyright processing of the song occurs for the creator who performs the distribution, and thus such work is troublesome for the creator. Accordingly, he or she may want another person to perform copyright processing of the song on his or her behalf.

In recent years, in a video distribution site, a creator opens his or her own video distribution channel and transmits information through video content of various themes, and the creator obtains, as a reward for providing the video content to users, a reward such as advertisement revenue according to the number of times of reproduction of a video, or advertisement revenue due to creation of a tie-up video with an advertiser.

Also for the creator who distributes the podcast program, rewards for the podcast program created by himself or herself is an extremely important concern, and he or she would want to have returns of appropriate rewards.

The above-described programing, distribution copyright processing, and monetization are matters that cannot be avoided for creators who distribute podcast programs, and a mechanism for easily solving these matters is demanded. The virtual podcast system provides a mechanism for responding to requests for programming, distribution copyright processing, and monetization by creators while allowing creators to create and distribute podcast programs so that users can view or listen to the podcast programs.

Figure 3:
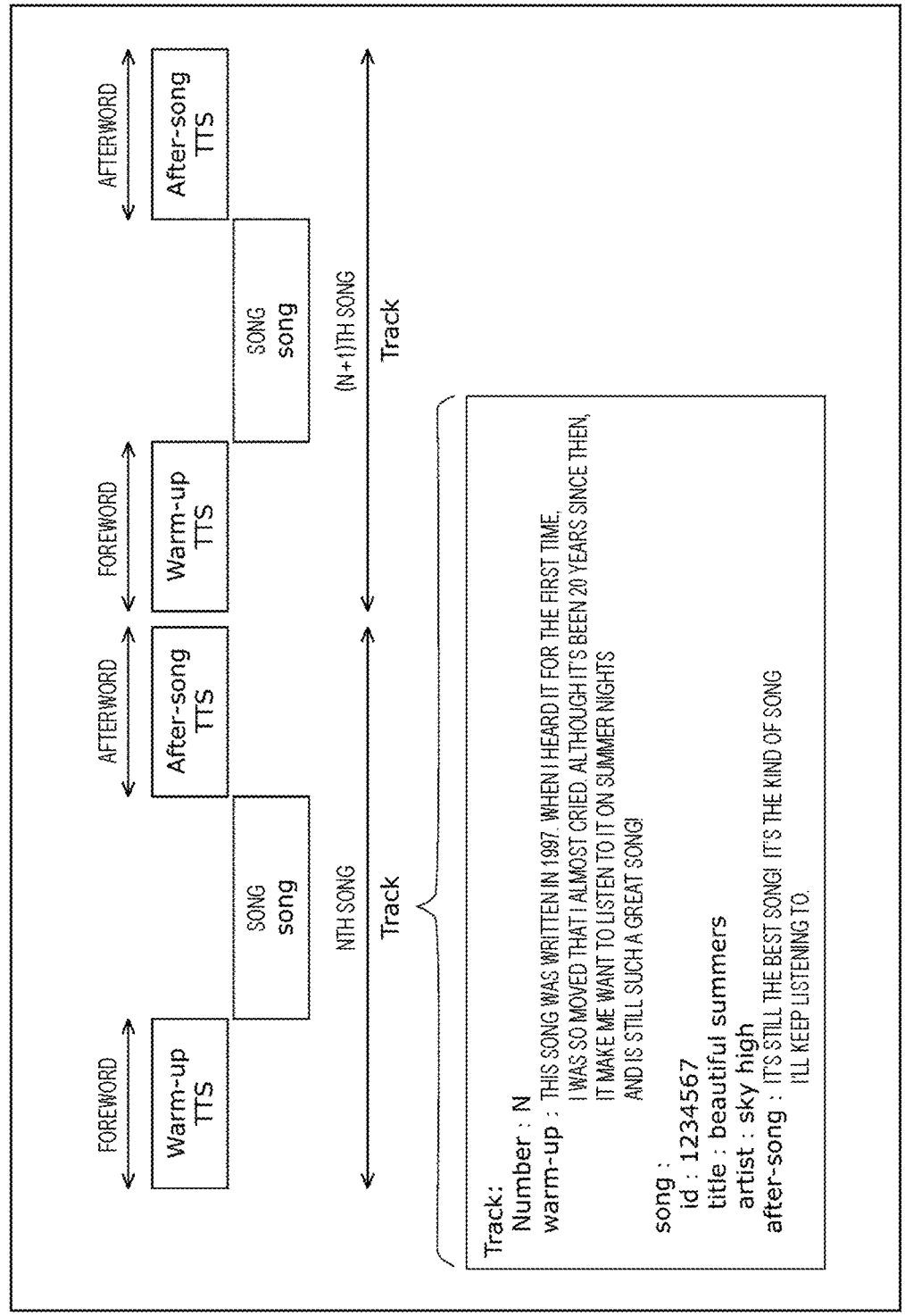
FIG. 3 is a diagram illustrating a flow of content reproduction by the content providing system to which the present technology is applied.

FIG. 3 illustrates a reproduction flow of a podcast program generated by the virtual podcast system.

FIG. 3 illustrates an Nth track and a (N+1)th track that are temporally continuous among tracks included in the podcast program.

Each track includes a foreword (warm-up), a song, and an afterword (after-song).

The foreword introduces the song and includes a text (sentence). In this example, as the foreword, a text "this song was written on . . . , still such a great song!" is described. The text corresponding to this foreword can be converted into a voice by text-to-speech (TTS) and read.

The song includes identification information (id) for identifying the song, and information regarding a title (title) and an artist name (artist) of the song. For example, by using the song ID of "1234567", streaming distribution of the song specified by the song ID can be requested to the music distribution service contracted by the user.

The afterword is a description after the song is listened and includes a text (sentence). In this example, as the afterword, a text "It's still the best song . . . ." is described. The text corresponding to this afterword can be read using the TTS.

Here, upon distributing a podcast program, the following two cases are assumed as the right processing for including the song in the program.

Figure 4:
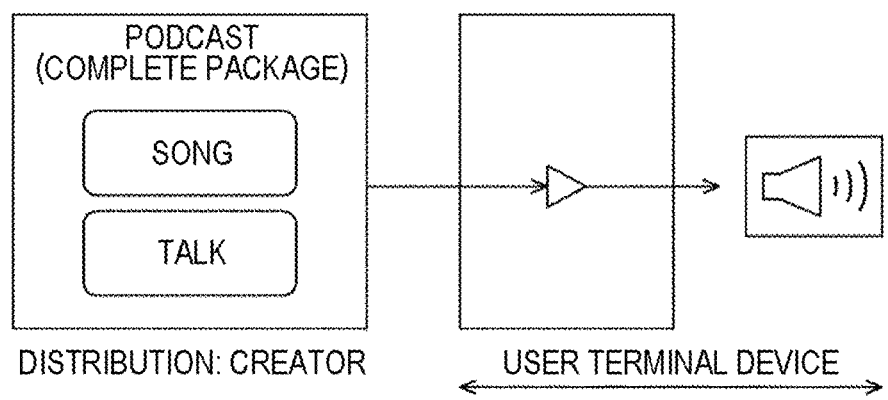
FIG. 4 is a diagram illustrating an example of right processing in a case where distribution including music is performed.

The first is a case where a program including the song is distributed. In this case, as illustrated in FIG. 4, the creator creates a podcast program that is a complete package including a song and talks (foreword and afterword) and the podcast program is distributed, and thus the copyright processing of the song occurs for the creator who distributes the program.

Figure 5:
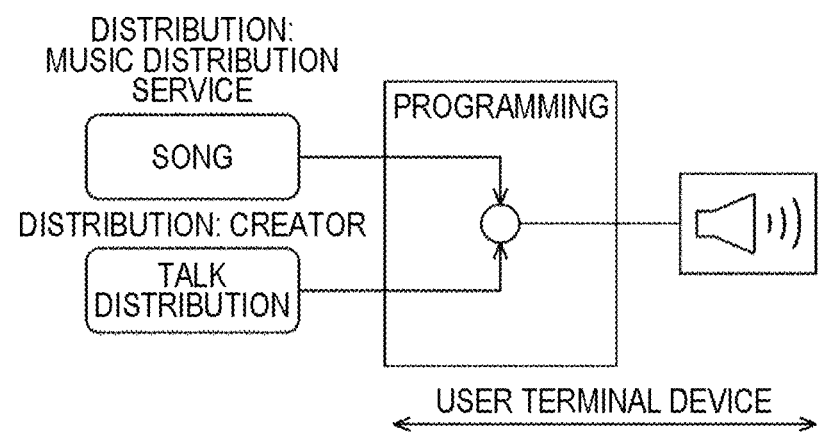
FIG. 5 is a diagram illustrating an example of right processing in a case where VPC type distribution is performed.

The second is a case where a VPC type distribution is performed. In this case, as illustrated in FIG. 5, the song is distributed using the music distribution service, and since the creator only creates and distributes talks (foreword and afterword), the copyright processing of the song does not occur for the creator.

That is, when the creator distributes the podcast program, configuration data, the foreword, and the afterword regarding the configuration of the program are distributed. Thus, since the portion of the song in the program is distributed by the music distribution service, the copyright processing of the song does not occur for the creator.

In the VPC type distribution, since the song to be distributed by streaming by the music distribution service and the talks (foreword and afterword) to be distributed by the creator are synthesized and programmed on the user terminal device used by the user, the right processing of the song portion in the podcast program programmed on the user terminal device side is performed by the user.

As described above, in the VPC type distribution, at the time of distributing the podcast, the creator distributes identification information (song ID) of the song without making a complete podcast program, so that the song streamed by the music distribution service is reproduced on the user terminal device side used by the user on the basis of the song ID.

That is, in the user terminal device, since the song is reproduced using the right that the user has already acquired by a contract with the music distribution service, the copyright processing of the song does not occur to the creator. On the other hand, since the user can also reproduce the song within a normal song distribution range in the music distribution service with which the user has a contract, the user can reproduce the song specified by the song ID an instruction on which is given by the creator without paying an additional fee in particular. In the virtual podcast system, the podcast program is distributed by this Virtual Pod Cast (VPC) type distribution.

Note that the user's contract with the music distribution service is not limited to a pay user subscription (premium user), and even in a free user subscription (free user), in a case where song can be reproduced only by inserting an advertisement, the right can be used.

Figure 6:
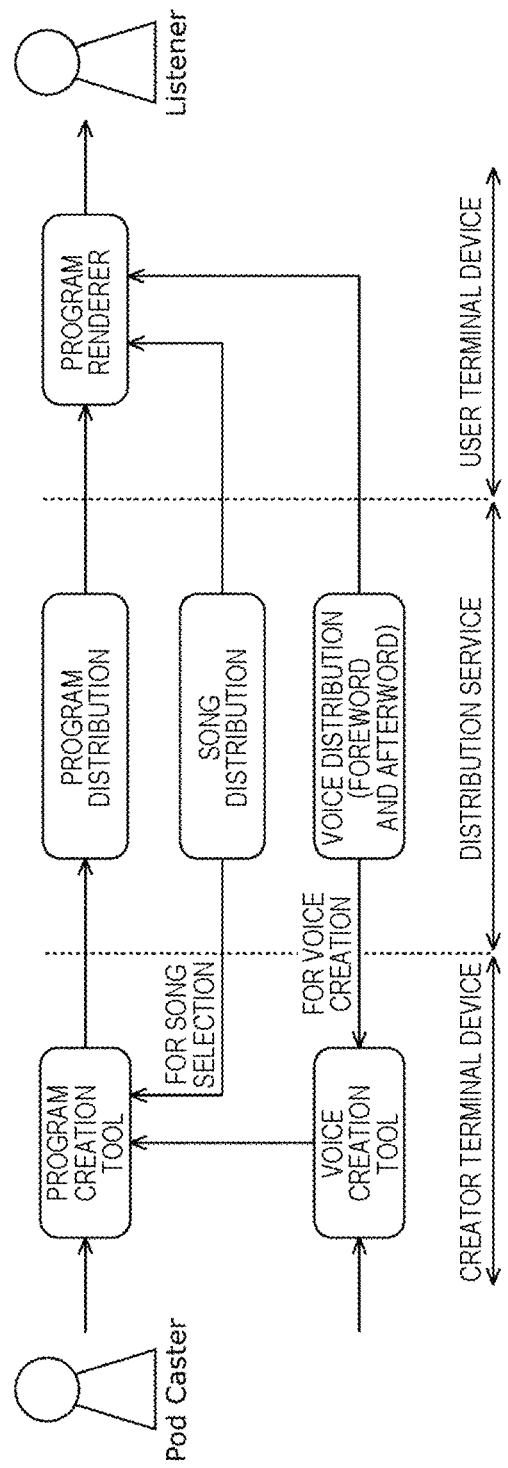
FIG. 6 is a diagram illustrating an example of an overall configuration of the content providing system to which the present technology is applied.

FIG. 6 illustrates an example of an overall configuration of the virtual podcast system.

As illustrated in FIG. 6, functions provided by the virtual podcast system are roughly divided into creator side functions provided by a creator terminal device, various distribution service side functions provided by a distribution server, and user side functions provided by a user terminal device.

In the creator terminal device, a program creation tool and a voice creation tool are executed according to the operation of the creator (PodCaster), and the podcast program is generated.

For example, the program creation tool generates the podcast program on the basis of the song ID of a song selected from a song list (catalog) for song selection provided from a song distribution service, and texts of the foreword and the afterword of the song whose sound at the time of voice synthesis has been adjusted by the voice creation tool, and registers the podcast program in a program distribution service.

The voice creation tool provides a TTS sound adjustment function on the basis of data for voice creation provided from the voice distribution service. By operating the voice creation tool and using the TTS sound adjustment function, the creator can make a TTS voice reproduced on the user side his or her favorite voice.

The program distribution service provides a service for distributing the podcast program registered by the program creation tool to the user terminal device.

The song distribution service corresponds to the music distribution service with which the user who uses the user terminal device has a contract (subscription).

The song distribution service distributes the song specified by the song ID set in the podcast program in response to a request from the user terminal device. Furthermore, the song distribution service provides the song list for song selection to the creator terminal device.

The voice distribution service provides a service for distributing, to a user terminal device, a TTS voice obtained by voice synthesis of texts of the foreword and afterword of the song set in the podcast program. Furthermore, the voice distribution service provides data for voice creation to the creator terminal device.

In the user terminal device, a program renderer is executed according to an operation of a user (listener), and the podcast program is reproduced.

When reproducing a desired program from among podcast programs published by the program distribution service, the program renderer performs rendering of a song distributed from the song distribution service and TTS voice distributed from the voice distribution service on the basis of configuration data (reproduction data) related to the configuration of the program.

Thus, the podcast program is reproduced (reproduced) and can be viewed or listened to by the user. Note that the program renderer executed by the user terminal device can also be said to be a reproducing player.

Figure 7:
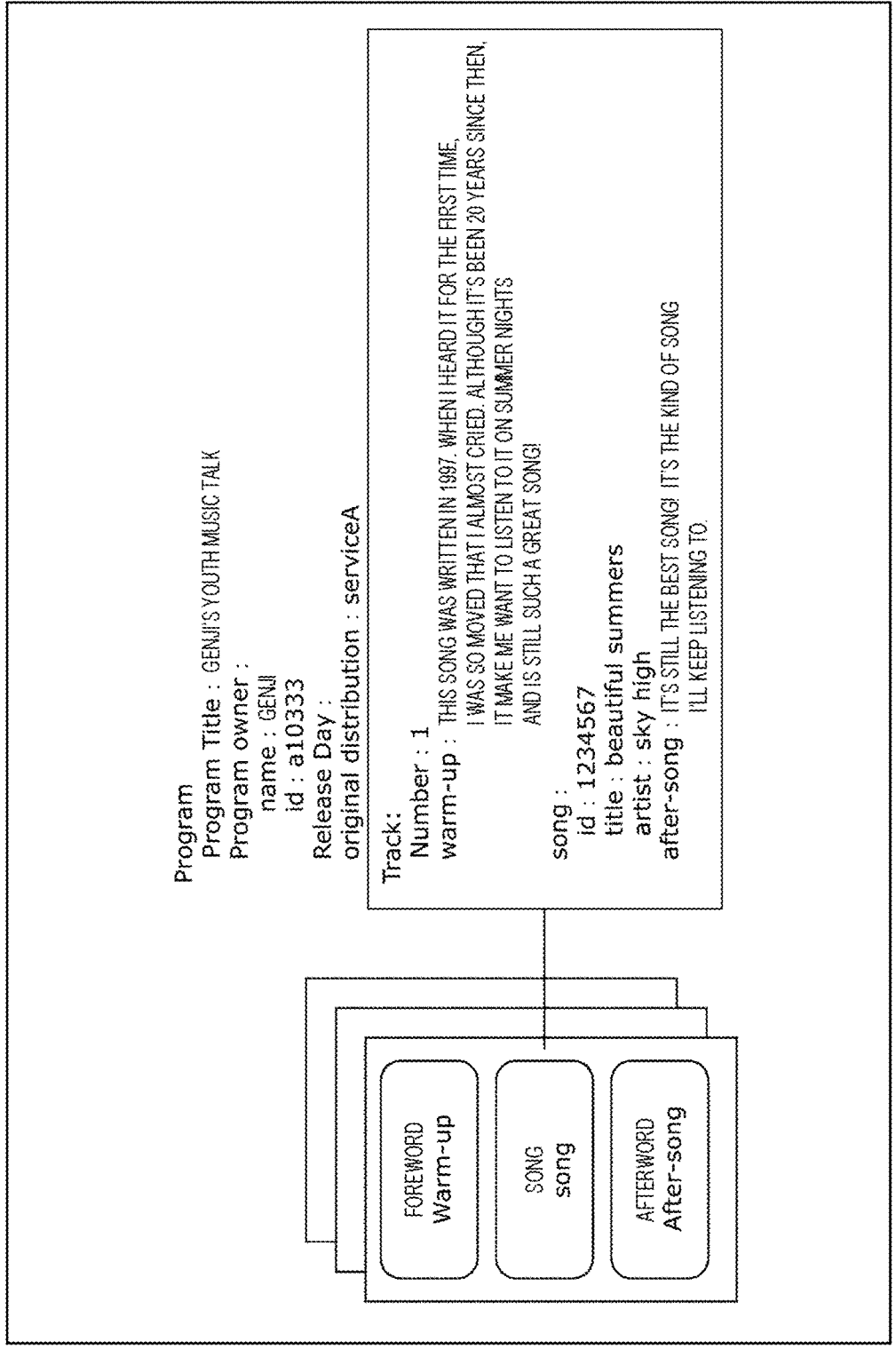
FIG. 7 is a diagram illustrating an example of a script used in the content providing system.

FIG. 7 illustrates an example of a script describing a configuration of the podcast program.

As illustrated in FIG. 7, in the virtual podcast system, a podcast program is configured by setting a plurality of sets of the song ID of a song to be programmed and the foreword and the afterword of the song. This configuration of the podcast program is described by the script illustrated in FIG. 7.

In FIG. 7, in the script, a title and an owner of the program, a release date, a service name serving as a distribution source of the song, and the like are described at the beginning as information regarding the program.

In the script, information regarding the track is described following the information regarding the program. FIG. 7 illustrates an example of description of a first track among the N tracks.

In the track, information regarding the number (Number) of the target track, the foreword (Warm-up), the music (song), and the afterword (After-song) are described.

In the music (song), identification information (id) for identifying the song, information regarding a title (title) and an artist name (artist) of the song, and the like are described. For example, by describing the song ID "1234567", it is possible to request the music distribution service "serviceA" to distribute the song specified by the song ID.

In the foreword (Warm-up) and the afterword (After-song), comment information corresponding to a comment regarding the song is described. For example, as the foreword, the text "This song was written in . . . still such a great song!" is described, and as the afterword, the text "It's still the best song . . . " is described, thereby enabling these texts to be converted into voice and read aloud using the TTS service.

In FIG. 7, only the first track is described, that is, a description example of information related to the song of the first track is illustrated. However, for the second and subsequent songs, similarly to the song of the first track, the song ID, the foreword, and the afterword are described as a set for each song.

In this way, the script including the song ID of the song and the foreword and the afterword related to the song is generated by the creator terminal device used by the creator and registered in the program distribution service, thereby being published to the user.

On the other hand, in the user terminal device used by the user, according to the script published by the program distribution service, control is performed so that the song indicated by the song ID is distributed by streaming using the right that the user has already acquired by the contract with the music distribution service, and control is performed so that the TTS voice of the foreword and the afterword is provided.

In other words, the script merely describes the song ID of the song and the foreword and the afterword in text but does not include the data itself of the song or the voice reproduced in the podcast program, but in the user terminal device, data of the song or the voice is reproduced on the basis of the song ID described in the script and the information indicated by the foreword and the afterword, to thereby reproduce the program created by the creator.

Furthermore, it is possible to program an already existing playlist by generating a script to which the foreword and the afterword are added with respect to (the song ID of) a song in the playlist, and thus the user can easily program the playlist only by inputting the foreword and the afterword of the song.

(Configuration of System)

Figure 8:
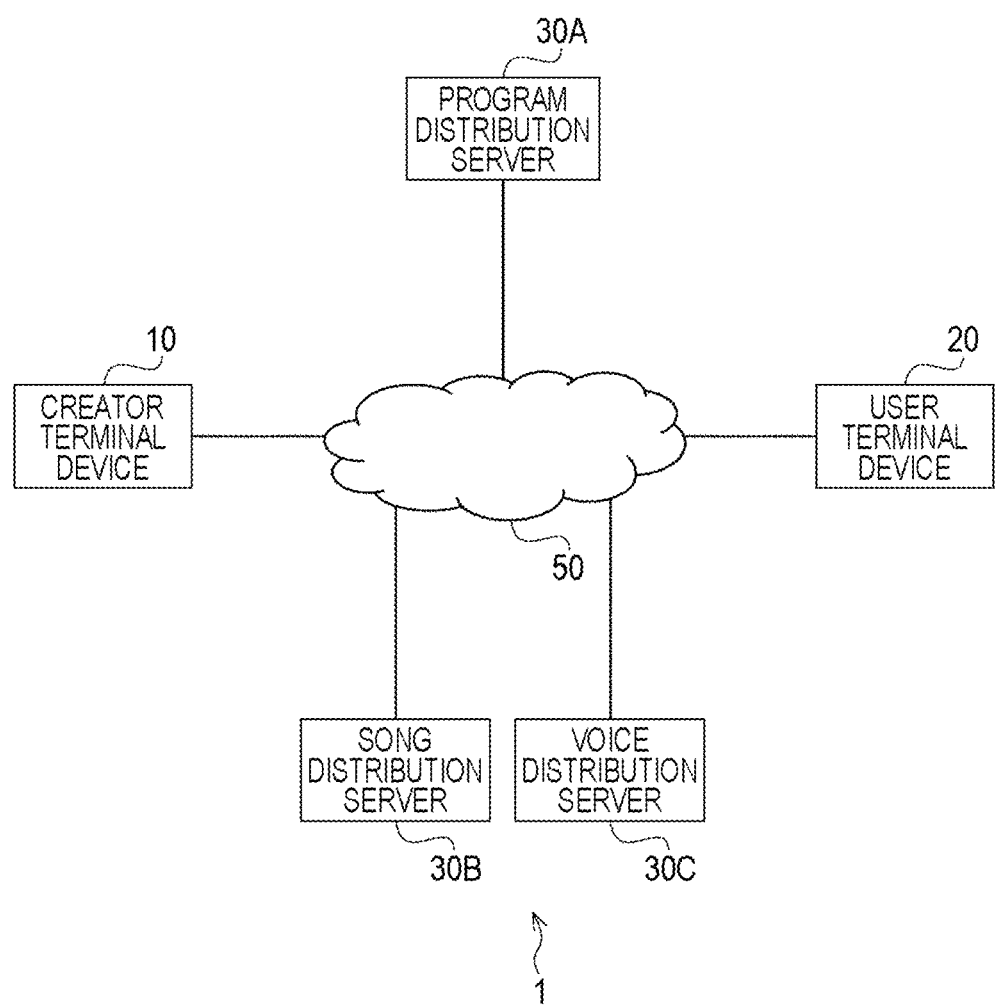
FIG. 8 is a diagram illustrating an example of a configuration of an embodiment of the content providing system to which the present technology is applied.

FIG. 8 illustrates a configuration of the virtual podcast system as an example of a configuration of the embodiment of the content providing system to which the present technology is applied.

In FIG. 8, the content providing system 1 includes a creator terminal device 10, a user terminal device 20, a program distribution server 30A, a song distribution server 30B, and a voice distribution server 30C.

In the content providing system 1, the creator terminal device 10, the user terminal device 20, the program distribution server 30A, the song distribution server 30B, and the voice distribution server 30C are mutually connected via a network 50.

The creator terminal device 10 is a device such as a smartphone, a tablet terminal, or a personal computer, and is used by the creator.

The creator terminal device 10 generates the podcast program script in accordance with the creator's operation, and transmits (uploads) the podcast program script to the program distribution server 30A via the network 50.

The user terminal device 20 is a device such as a smartphone, a tablet terminal, a music player, a game device, or a personal computer, and is used by a user.

The user terminal device 20 accesses the program distribution server 30A via the network 50 according to an operation by the user, and receives (downloads) the script of the podcast program.

The program distribution server 30A includes one or a plurality of servers that provides the program distribution service. The program distribution service is a service for distributing podcast programs, and is provided by a program distributor.

The program distribution server 30A receives the script of the program transmitted (uploaded) from the creator terminal device 10 via the network 50, and registers the script in the storage medium to be browsable by the user using the user terminal device 20.

In a case where the program distribution server 30A receives a reproduction request for the program transmitted from the user terminal device 20 via the network 50, the program distribution server 30A reads the script of the program from the storage medium and distributes the script to the user terminal device 20 that is the reproduction request source.

The song distribution server 30B includes one or a plurality of servers that provides the music distribution service. The music distribution service is a service that distributes songs through the Internet and is provided by a music distributor. For example, the music distribution service is provided in an unlimited-listening format of a flat-rate streaming.

In a case where a distribution request for a song transmitted from the user terminal device 20 via the network 50 is received, the song distribution server 30B specifies the song corresponding to the received distribution request and distributes streaming data of the song to the user terminal device 20 that is the distribution request source.

The voice distribution server 30C includes one or a plurality of servers that provides the voice distribution service. The voice distribution service is a service for distributing voice such as TTS voice or raw voice through the Internet, and is provided by a voice distributor.

In a case where the voice distribution server 30C receives the distribution request of the voice transmitted from the user terminal device 20 via the network 50, the voice distribution server 30C acquires the voice corresponding to the received distribution request, and distributes data of the voice to the user terminal device 20 as the distribution request source.

Note that, in the following description, the program distribution server 30A, the song distribution server 30B, and the voice distribution server 30C will be referred to as the distribution server 30 in a case where it is not particularly necessary to distinguish them. Furthermore, the program distributor, the music distributor, and the voice distributor may be the same business or different businesses.

The network 50 includes a communication network such as the Internet, an intranet, or a mobile phone network, and enables interconnection between devices using a communication protocol such as Transmission Control Protocol/Internet Protocol (TCP/IP).

(Configuration of Creator Terminal Device)

Figure 9:
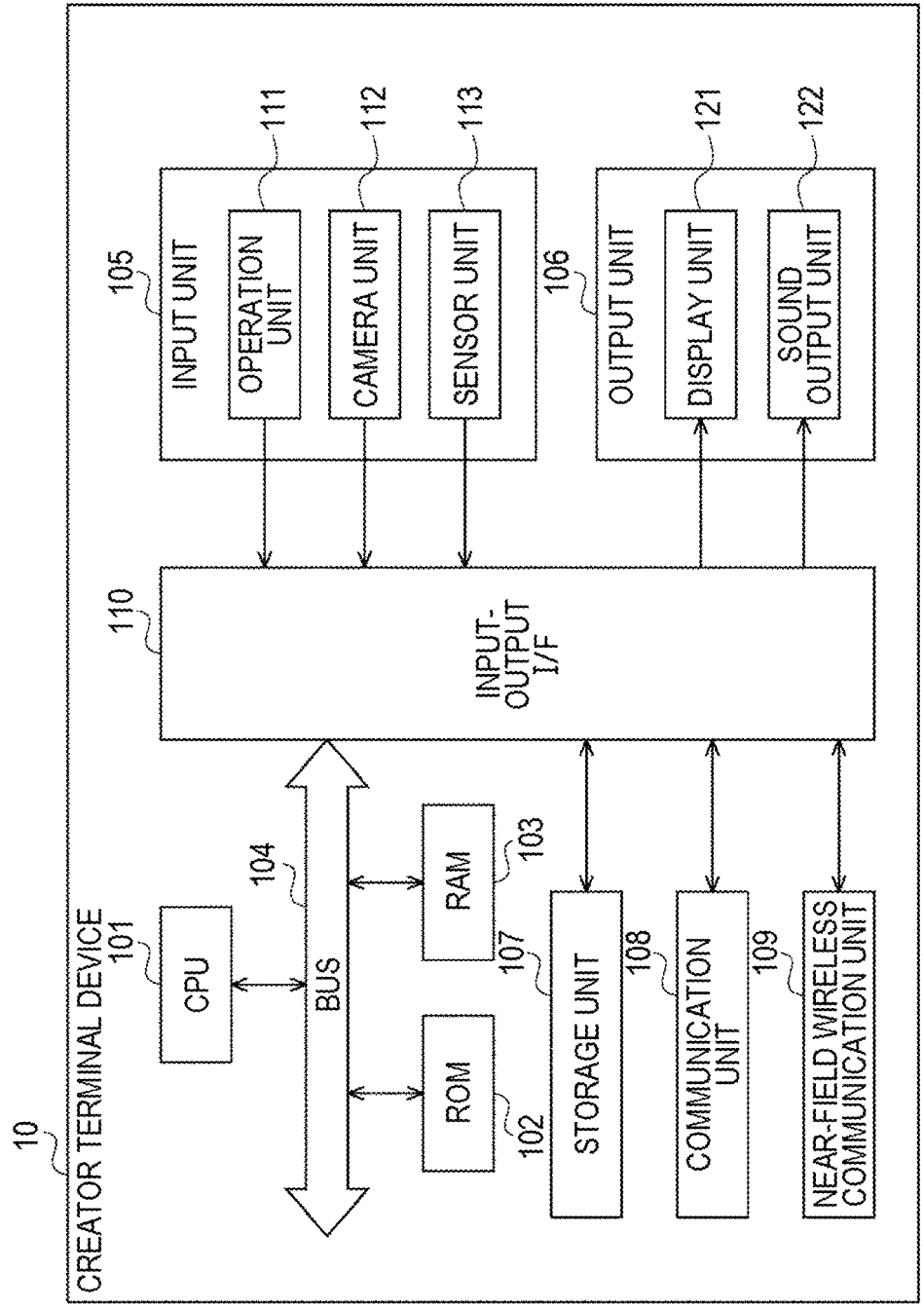
FIG. 9 is a diagram illustrating an example of a configuration of a creator terminal device.

FIG. 9 illustrates an example of a configuration of the creator terminal device 10 of FIG. 8.

As illustrated in FIG. 9, in the creator terminal device 10, a central processing unit (CPU) 101, a read only memory (ROM) 102, and a random access memory (RAM) 103 are mutually connected by a bus 104.

The CPU 101 controls the operation of each unit of the creator terminal device 10 by executing a program recorded in the ROM 102 or the storage unit 107. Various data are appropriately stored in the RAM 103.

An input-output I/F 110 is also connected to the bus 104. An input unit 105, an output unit 106, a storage unit 107, a communication unit 108, and a near-field wireless communication unit 109 are connected to the input-output I/F 110.

The input unit 105 supplies various input data to each unit including the CPU 101 via the input-output I/F 110. For example, the input unit 105 includes an operation unit 111, a camera unit 112, and a sensor unit 113.

The operation unit 111 is operated by the creator and supplies operation data corresponding to the operation to the CPU 101. The operation unit 111 includes a physical button, a touch panel, and the like.

The camera unit 112 photoelectrically converts light from a subject incident thereon, and performs signal processing on an electric signal obtained as a result, thereby generating and outputting captured image data. The camera unit 112 includes an image sensor, a signal processing unit, and the like.

The sensor unit 113 performs sensing of space information, time information, and the like, and outputs sensor data obtained as a result of the sensing.

The sensor unit 113 includes an acceleration sensor, a gyro sensor, and the like. The acceleration sensor measures accelerations in three directions of XYZ axes. The gyro sensor measures angular velocities of three axes of the XYZ axes. Note that an inertial measurement unit (IMU) may be provided to measure three-dimensional acceleration and angular velocity with an accelerometer in three directions and a gyroscope with three axes.

Furthermore, the sensor unit 113 can include various sensors such as a sound sensor (microphone) that detects a sound such as the creator's voice, a biological sensor that measures information such as a heart rate, a body temperature, or a posture of a living being, a proximity sensor that measures a nearby object, and a magnetic sensor that measures a magnitude and a direction of a magnetic field.

The output unit 106 outputs various types of information under the control of the CPU 101 via the input-output I/F 110. For example, the output unit 106 includes a display unit 121 and a sound output unit 122.

The display unit 121 displays an image or the like corresponding to image data under the control of the CPU 101. The display unit 121 includes a panel unit such as a liquid crystal panel or an organic light emitting diode (OLED) panel, a signal processing unit, and the like.

The sound output unit 122 outputs a sound corresponding to the sound data under the control of the CPU 101. The sound output unit 122 includes a speaker, a headphone connected to an output terminal, and the like.

The storage unit 107 records various data and programs under the control of the CPU 101. The CPU 101 reads and processes various data from the storage unit 107, and executes a program.

The storage unit 107 is configured as an auxiliary storage device such as a semiconductor memory. The storage unit 107 may be configured as an internal storage or may be an external storage such as a memory card.

The communication unit 108 communicates with other devices via the network 50 under the control of the CPU 101. The communication unit 108 is configured as a communication module compatible with cellular communication (for example, LTE-Advanced, 5G, or the like), wireless communication such as a wireless local area network (LAN), or wired communication.

The near-field wireless communication unit 109 performs wireless communication according to a near-field wireless communication standard such as Bluetooth (registered trademark) or near field communication (NFC), and exchanges various data.

Note that the configuration of the creator terminal device 10 illustrated in FIG. 9 is an example, and for example, a microphone may be provided as an input unit, or an image processing circuit such as a graphics processing unit (GPU), a power supply circuit, or the like may be provided.

Figure 10:
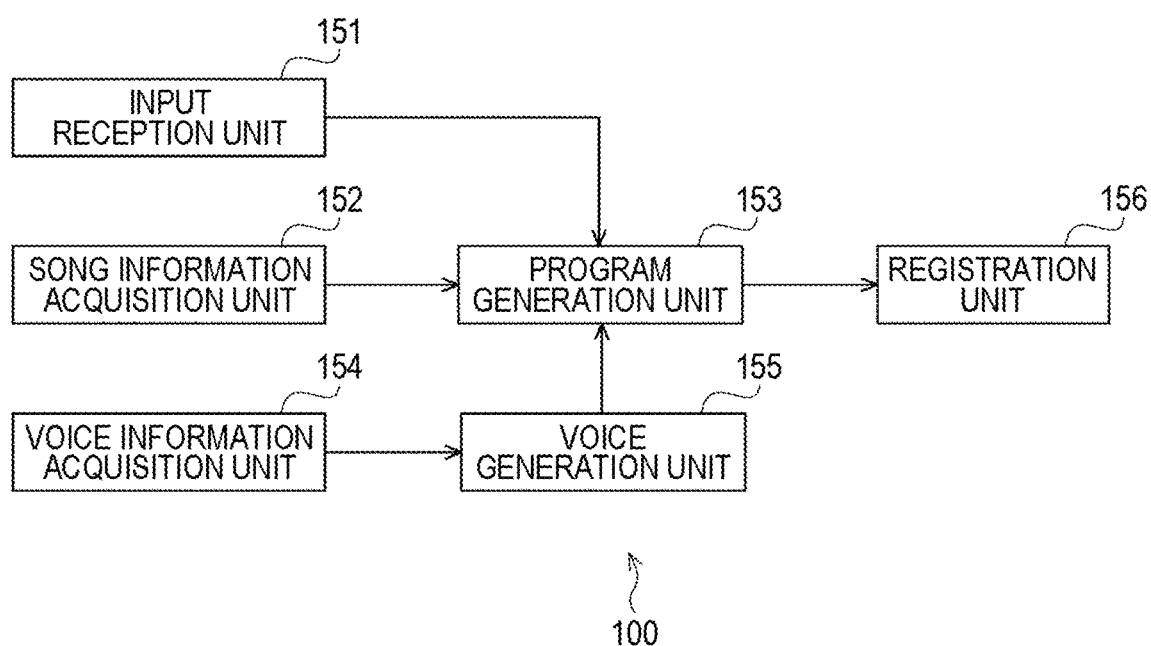
FIG. 10 is a diagram illustrating an example of a functional configuration of a control unit in the creator terminal device.

FIG. 10 illustrates an example of a functional configuration of the control unit 100 in the creator terminal device 10. The function of the control unit 100 is implemented by the CPU 101 executing a program such as the program creation tool or the voice creation tool.

In FIG. 10, the control unit 100 includes an input reception unit 151, a song information acquisition unit 152, a program generation unit 153, a voice information acquisition unit 154, a voice generation unit 155, and a registration unit 156.

The input reception unit 151 receives operation data corresponding to the operation of the creator supplied from the input unit 105, and supplies the operation data to the program generation unit 153.

The song information acquisition unit 152 acquires song information regarding a song supplied from the communication unit 108 that communicates with the song distribution server 30B, and supplies the song information to the program generation unit 153. The song information includes information such as a song list and a song ID received from the song distribution server 30B.

On the basis of the operation data supplied from the input reception unit 151, the program generation unit 153 processes the song information supplied from the song information acquisition unit 152 and the comment information regarding the foreword and the afterword, thereby generating the script of the podcast program and supplying the script to the registration unit 156.

The voice information acquisition unit 154 acquires voice information regarding the voices of the foreword and the afterword supplied from the communication unit 108 that communicates with the voice distribution server 30C, and supplies the voice information to the voice generation unit 155. The voice information includes information such as information regarding a voice at the time of voice synthesis or voice creation received from the voice distribution server 30C.

The voice generation unit 155 processes the voice information supplied from the voice information acquisition unit 154 to generate a voice for the creator to set the foreword and the afterword, and supplies the voice to the program generation unit 153.

Upon generating the podcast program, the program generation unit 153 uses the voice supplied from the voice generation unit 155 to provide the creator with information (voice or the like at the time of voice synthesis) regarding the setting of the foreword and the afterword, thereby generating a script of the program and supplying the script to the registration unit 156.

The registration unit 156 controls the communication unit 108 to upload and register the script of the program supplied from the program generation unit 153 to the program distribution server 30A via the network 50.

(Configuration of User Terminal Device)

Figure 11:
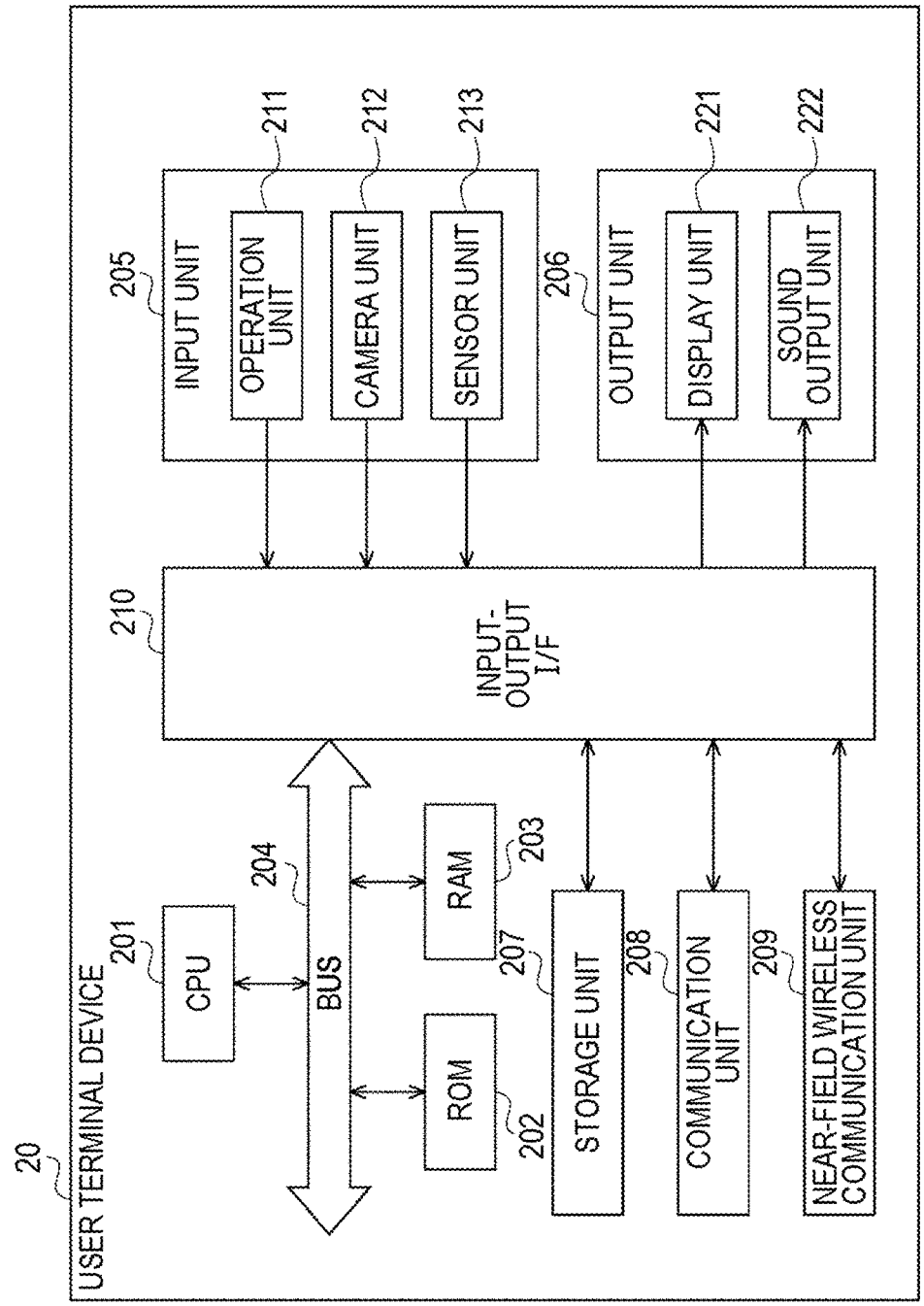
FIG. 11 is a diagram illustrating an example of a configuration of a user terminal device.

FIG. 11 illustrates an example of a configuration of the user terminal device 20 of FIG. 8.

In FIG. 11, the configuration of the user terminal device 20 corresponds to the configuration of the creator terminal device 10 illustrated in FIG. 9. That is, since the CPU 201 to the near-field wireless communication unit 209 have similar functions to those of the CPU 101 to the near-field wireless communication unit 109 described above, the description thereof will be omitted here.

Figure 12:
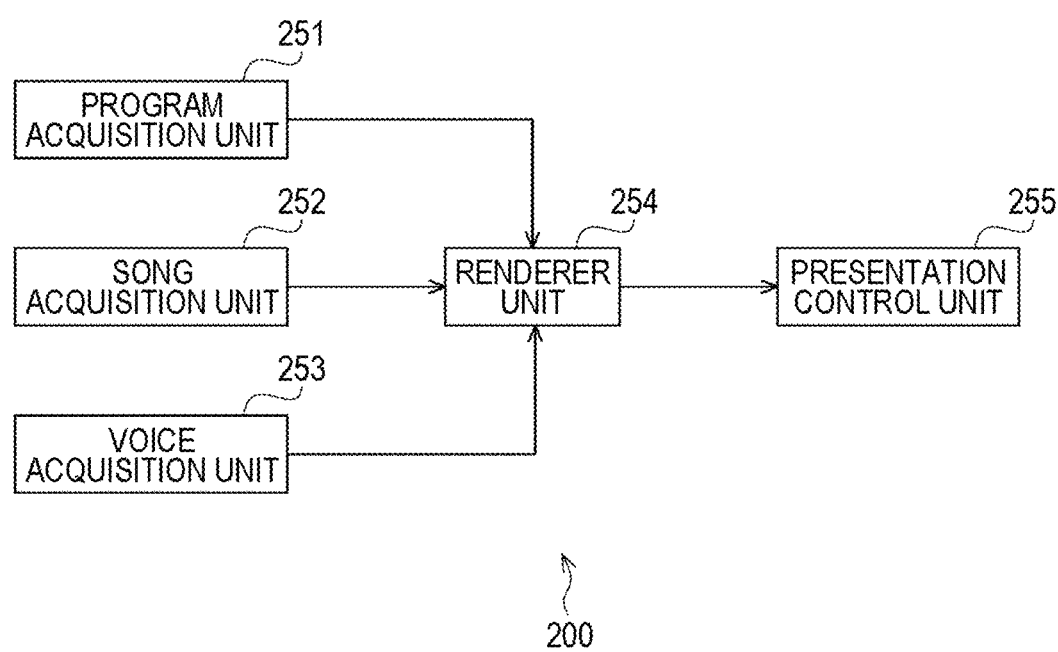
FIG. 12 is a diagram illustrating an example of a functional configuration of a control unit in the user terminal device.

FIG. 12 illustrates an example of a functional configuration of the control unit 200 in the user terminal device 20. The function of the control unit 200 is achieved by the CPU 201 executing a program such as a program renderer.

In FIG. 12, the control unit 200 includes a program acquisition unit 251, a song acquisition unit 252, a voice acquisition unit 253, a renderer unit 254, and a presentation control unit 255.

The program acquisition unit 251 acquires the script of the podcast program according to an operation by the user supplied from the communication unit 208 that communicates with the program distribution server 30A, and supplies the script to the renderer unit 254.

The song acquisition unit 252 acquires streaming data of the song corresponding to the song ID supplied from the communication unit 208 that communicates with the song distribution server 30B, and supplies the streaming data to the renderer unit 254.

The voice acquisition unit 253 acquires voice data corresponding to the foreword and the afterword supplied from the communication unit 208 that communicates with the voice distribution server 30C, and supplies the voice data to the renderer unit 254.

On the basis of the script of the program supplied from the program acquisition unit 251, the renderer unit 254 performs rendering processing on the voice data of the foreword supplied from the voice acquisition unit 253, the streaming data of the song supplied from the song acquisition unit 252, and the voice data of the afterword supplied from the voice acquisition unit 253, and supplies resulting data to the presentation control unit 255.

The presentation control unit 255 supplies the data supplied from the renderer unit 254 to the output unit 206 to thereby present the program to the user.

For example, by supplying the voice data of the foreword, the streaming data of the song, and the voice data of the afterword to the sound output unit 222, the presentation control unit 255 can output and present voice of the foreword and the afterword set in the program before and after the song together with the sound of a programmed song.

(Configuration of Distribution Server)

Figure 13:
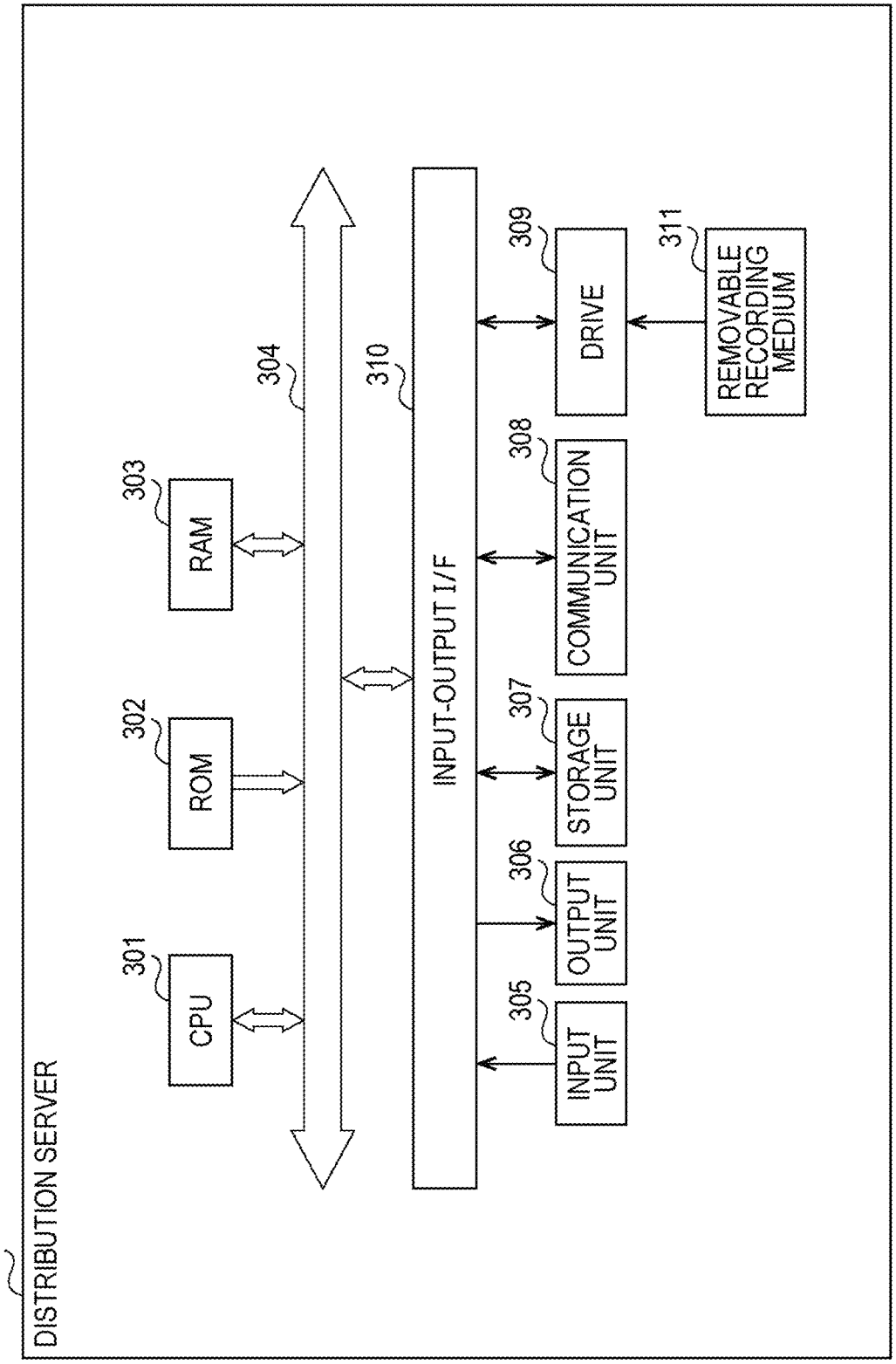
FIG. 13 is a diagram illustrating an example of a configuration of a distribution server.

FIG. 13 illustrates an example of a configuration of the distribution server 30 of FIG. 8. Note that the distribution server 30 corresponds to any server of the program distribution server 30A, the song distribution server 30B, and the voice distribution server 30C illustrated in FIG. 8.

In the distribution server 30, a CPU 301, a ROM 302, and a RAM 303 are mutually connected by a bus 304. An input-output I/F 310 is further connected to the bus 304. An input unit 305, an output unit 306, a storage unit 307, a communication unit 308, and a drive 309 are connected to the input-output I/F 310.

The input unit 305 includes a microphone, a keyboard, a mouse, and the like. The output unit 306 includes a speaker, a display, and the like.

The storage unit 307 includes a hard disk drive (HDD), a semiconductor memory, and the like. The communication unit 308 is configured as a communication module compatible with wireless communication such as a wireless LAN or wired communication such as Ethernet (registered trademark).

The drive 309 drives a removable recording medium 311 such as a magnetic disk, an optical disk, a magneto-optical disk, or a semiconductor memory.

Figure 14:
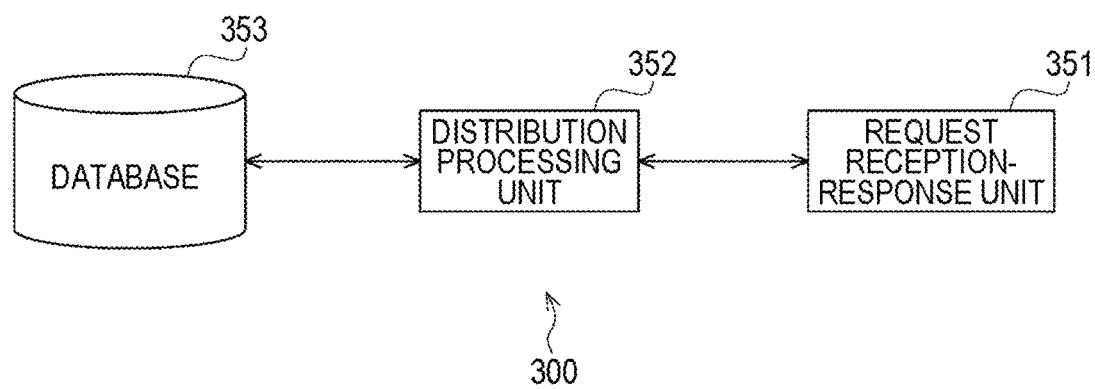
FIG. 14 is a diagram illustrating an example of a functional configuration of a control unit in the distribution server.

FIG. 14 illustrates an example of a functional configuration of a control unit 300 in the distribution server 30. The function of the control unit 300 is implemented by the CPU 301 executing a program of each service.

In FIG. 14, the control unit 300 includes a request reception-response unit 351, a distribution processing unit 352, and a database 353.

The request reception-response unit 351 receives various requests supplied from the communication unit 308 that communicates with the creator terminal device 10 or the user terminal device 20, and supplies the requests to the distribution processing unit 352.

The distribution processing unit 352 performs distribution processing according to various requests supplied from the request reception-response unit 351.

The database 353 is recorded in the storage unit 307 including a large-capacity storage such as an HDD or a semiconductor memory.

For example, the script of the podcast program or the like is stored in the database 353 of the program distribution server 30A. Furthermore, in the database 353 of the song distribution server 30B, a song provided by the music distribution service is stored in association with the song ID. Moreover, the database 353 of the voice distribution server 30C stores information regarding the voice at the time of voice synthesis or voice creation, voice data of the foreword or the afterword, and the like.

When performing the distribution processing, the distribution processing unit 352 processes various data stored in the database 353, generates responses according to various requests, and supplies the responses to the request reception-response unit 351.

The request reception-response unit 351 controls the communication unit 308 to transmit a response according to various requests supplied from the distribution processing unit 352 to the creator terminal device 10 or the user terminal device 20 as a request source via the network 50.

Next, a flow of processing executed in each device of the content providing system 1 will be described.

First Example

Figure 15:
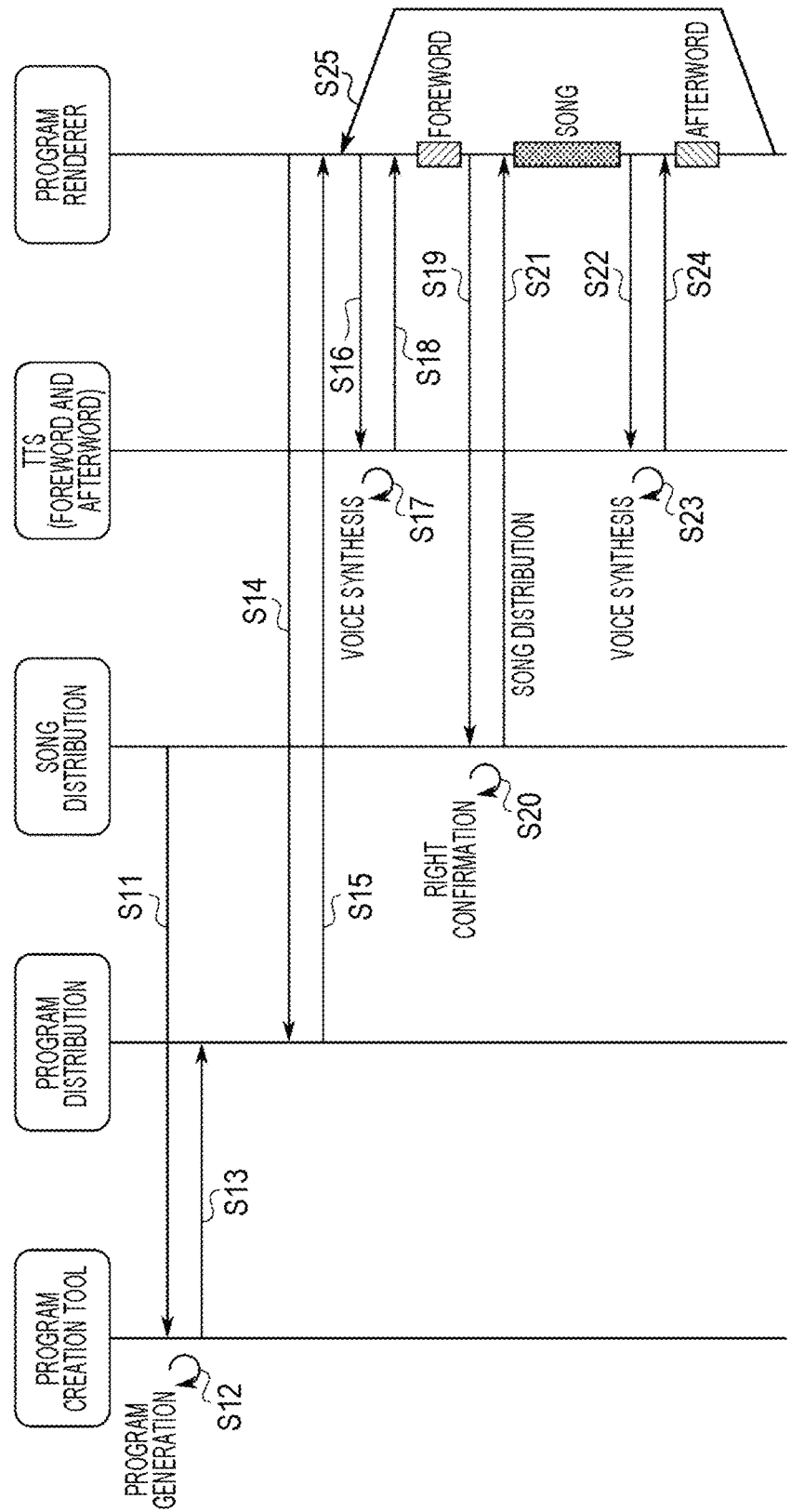
FIG. 15 is a sequence diagram illustrating a flow of processing in a case where voice synthesis is used in providing a foreword and an afterword of a song together with a programmed song.

FIG. 15 is a sequence diagram illustrating a flow of processing in a case where voice synthesis is used in providing the foreword and the afterword of the programmed song together with the song.

In FIG. 15, the program creation tool is executed by the creator terminal device 10, and the program renderer is executed by the user terminal device 20. Furthermore, in FIG. 15, the program distribution service is provided by the program distribution server 30A, the music distribution service is provided by the song distribution server 30B, and the TTS service is provided by the voice distribution server 30C.

In the creator terminal device 10, a program creation tool is executed by the control unit 100, and the processing of steps S11 to S13 is executed.

The program creation tool acquires the song list transmitted from the song distribution server 30B and presents the song list to the creator (S11).

The program creation tool generates the script of the podcast program on the basis of the song ID of the song selected from the song list by the creator and the texts of the foreword and the afterword of the song input by the creator (S12), and registers the script in the program distribution server 30A (S13).

Thus, in the program distribution server 30A, the script of the podcast program created by the creator is stored in the database 353, and can be browsed by the user using the user terminal device 20.

In the user terminal device 20, the program renderer is executed by the control unit 200, and the program renderer operates in cooperation with each distribution server 30, so that the processing of steps S14 to S25 is executed.

In the program renderer, in a case where an instruction to reproduce a podcast program published to be browsable on the program distribution server 30A is given by the user's operation, the script of the program distributed from the program distribution server 30A is received (S14 and S15).

The program renderer requests the voice distribution server 30C to synthesize the voice of the text of the foreword on the basis of the foreword set to the beginning of the received script (S16).

In the voice distribution server 30C, voice synthesis of the text of the foreword is performed in response to the request from the program renderer (S17), and a result of the voice synthesis is distributed (S18).

Thus, in the program renderer, a result of the voice synthesis distributed from the voice distribution server 30C is received, and the rendering processing is performed, so that the TTS voice of the foreword portion set in the programmed song is reproduced.

Next, on the basis of the song ID set next to the foreword of the received script, the program renderer requests the song distribution server 30B that provides the music distribution service contracted by the user to distribute the song specified by the song ID (S19).

In the song distribution server 30B, in response to the request from the program renderer, the right acquired by the contract with the music distribution service by the user is confirmed (S20), and in a case where it is determined that the user has a legitimate right and reproduction of the song specified by the song ID is possible, streaming distribution of the song is performed (S21).

Thus, in the program renderer, the streaming data of the song distributed from the song distribution server 30B is received and the rendering processing is performed, so that the song specified by the song ID is reproduced as the programmed song.

Thereafter, when the reproduction of the song that is distributed by streaming is completed, the program renderer requests the voice distribution server 30C to perform voice synthesis of the text of the afterword on the basis of the afterword set next to the song ID of the received script (S22).

In the voice distribution server 30C, the voice synthesis of the text of the afterword is performed in response to the request from the program renderer (S23), and a result of the voice synthesis is distributed (S24).

Thus, in the program renderer, the result of the voice synthesis distributed from the voice distribution server 30C is received and the rendering processing is performed, so that the TTS voice of the afterword set in the programmed song is reproduced.

Furthermore, in the script of the podcast program, since the song ID of each of a plurality of songs is programmed together with the texts of the foreword and the afterword of the song, after the processing of steps S16 to S24 is completed, the processing returns to the processing of step S16 (S25), and the processing of steps S16 to S25 is repeated according to the number of song IDs.

Thus, in the program renderer, reproduction is repeatedly performed in the order of the foreword, the song, and the afterword for each song ID set in the script, and the podcast program can be viewed or listened to by the user.

The flow of processing executed by each device in a case where voice synthesis is used in providing the foreword and the afterword of the song together with the programmed song has been described above.

(Example of UI of Program Creation Tool)

Details of the program creation tool executed by the creator terminal device 10 will be described with reference to FIGS. 16 to 23.

Figure 16:
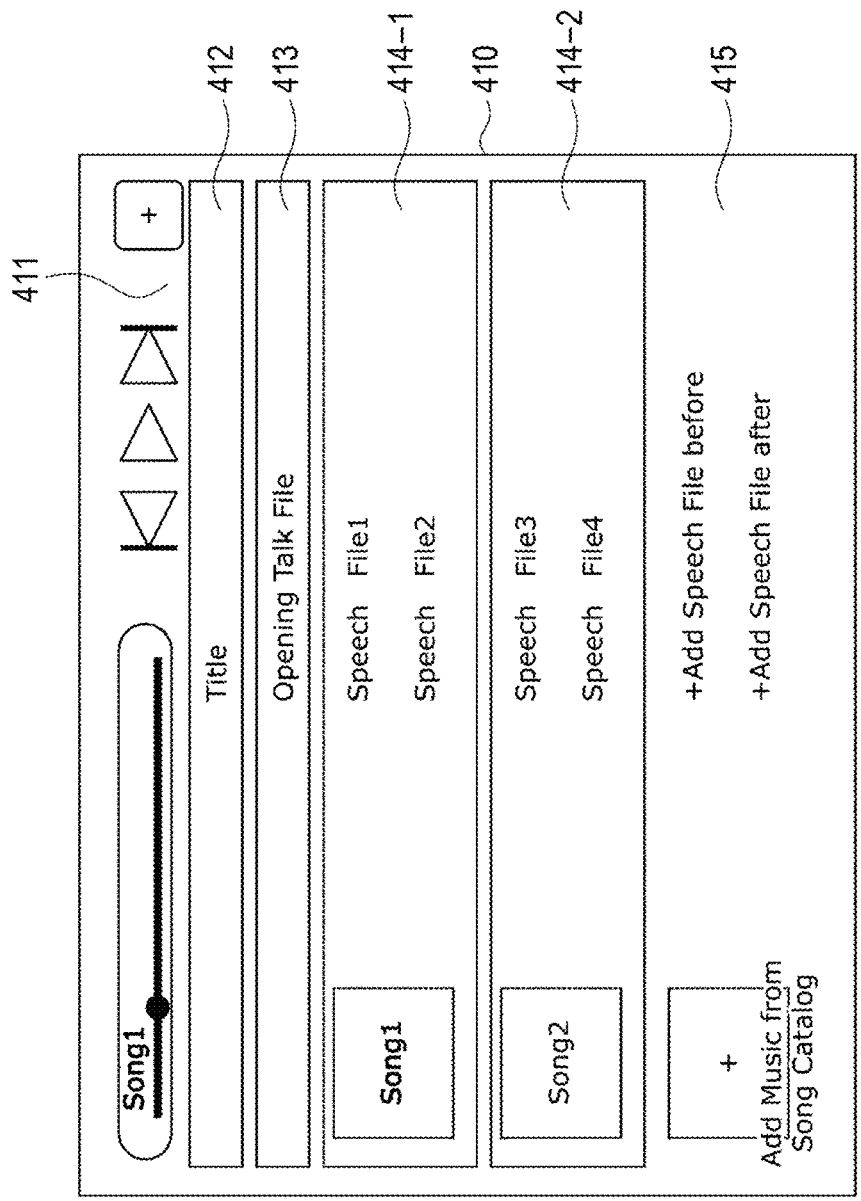
FIG. 16 is a diagram illustrating a first example of a user interface of a program creation tool.

FIG. 16 illustrates a first example of the user interface (UI) of the program creation tool.

In FIG. 16, a program creation screen 410 is a screen displayed when the program creation tool is executed, and is a UI for creating a podcast program in accordance with the operation of the creator.

The program creation screen 410 includes an operation area 411, a title setting area 412, an opening talk setting area 413, a set song foreword-afterword setting area 414, and a song foreword-afterword setting area 415.

The operation area 411 is an area for operating and listening to a song to be set in a program. The operation area 411 includes a button for reproducing or stopping the song, a button for selecting the previous song and the next song, a seek bar indicating the position of the song being reproduced, and the like.

The title setting area 412 is an area for setting the title of the program.

The opening talk setting area 413 is an area for setting an opening talk. For example, in the opening talk setting area 413, a voice file of the opening talk is set, but the voice file does not necessarily have to be set in a case where the opening talk is not necessary.

The set song foreword-afterword setting area 414 is an area in which the set song and the foreword and the afterword of the song are displayed.

For example, in the set song foreword-afterword setting area 414-1, a foreword of "Speech File1" and an afterword of "Speech File2" are set for the song of "Song1". Furthermore, in the set song foreword-afterword setting area 414-2, a foreword of "Speech File3" and an afterword of "Speech File4" are set for the song of "Song2".

The song foreword-afterword setting area 415 is an area for setting a song, and a foreword and an afterword of the song.

For example, the song foreword-afterword setting area 415 includes a song addition button ("Add Music from Song Catalog") for selecting a file of a desired song from a catalog of songs, a foreword addition button ("Add Speech File before") for setting a desired foreword, and an afterword addition button ("Add Speech File after") for setting a desired afterword, and the like.

Note that in addition to being set as a file in a text format according to an input operation of the creator, the foreword and the afterword may be set as a file in an audio format according to a voice input of the creator, for example.

By the creator operating this program creation screen 410, for example, a script of the program illustrated in FIG. 17 is created.

In FIG. 17, as a podcast program, next to the opening talk ("Opening Talk File"), the foreword ("Speech File1") of the first song, the first song ("Song1"), and the afterword ("Speech File2") of the first song are reproduced in that order, and further, the foreword ("Speech File3") of the second song, the second song ("Song2"), and the afterword ("Speech File4") of the second song are reproduced in that order.

Incidentally, this program creation tool may be provided as a function of an application (hereinafter, also referred to as a music distribution app) distributed by the music distribution service contracted by the creator. FIGS. 18 to 23 illustrate examples of the program creation tool provided as functions of the music distribution app executed by the creator terminal device 10.

Figure 18:
FIG. 18 is a diagram illustrating a second example of the user interface of the program creation tool.

In FIG. 18, a song reproduction screen 510 is a screen provided as a function of the music distribution app, and is a UI for playing a song distributed by the music distribution service via the network 50 such as the Internet. The song reproduction screen 510 includes a reproduction target song area 511 and a song operation area 512.

The reproduction target song area 511 is an area for displaying the title, artist name, jacket image, and the like of the reproduction target song.

The song operation area 512 is an area for operating a song. The song operation area 512 includes a button for reproducing or stopping the song, a button for selecting previous song and the next song, a seek bar indicating a position of the song being reproduced, and the like.

Figure 19:
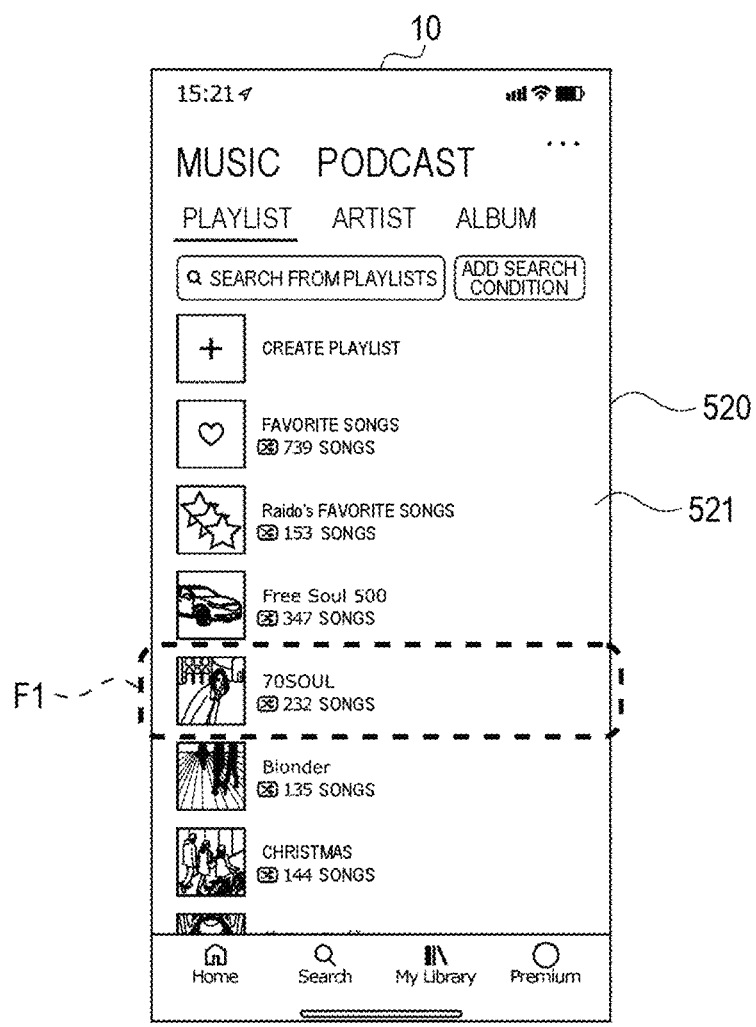
FIG. 19 is a diagram illustrating a second example of the user interface of the program creation tool.

In a case where a predetermined operation is performed by the creator on the song reproduction screen 510, a playlist selection screen 520 illustrated in FIG. 19 is displayed.

In FIG. 19, the playlist selection screen 520 is a screen provided as a function of the music distribution app, and is a UI for selecting a desired playlist. The playlist selection screen 520 includes a playlist list area 521.

The playlist list area 521 is an area for displaying and selecting from a list of playlists provided by the music distribution service, playlists created by the creator himself or herself or other users (published playlists), and the like.

Figure 20:
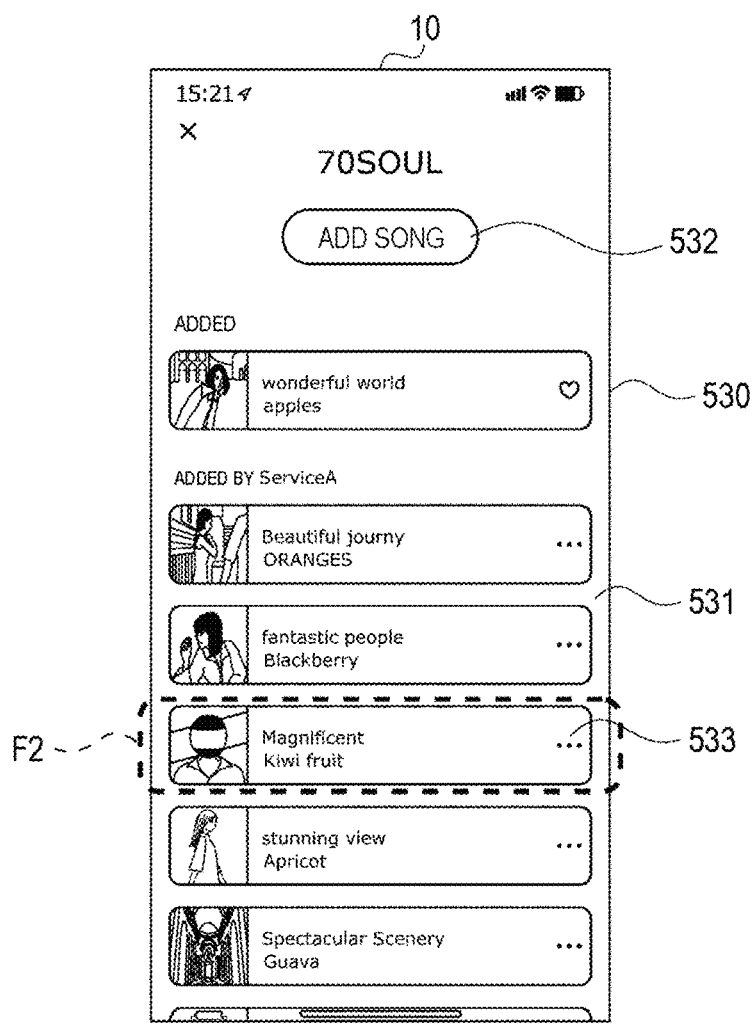
FIG. 20 is a diagram illustrating a second example of the user interface of the program creation tool.

In a case where a playlist of "70 SOUL" surrounded by a frame F1 in the diagram is selected from the playlists displayed in the playlist list area 521, a playlist editing screen 530 illustrated in FIG. 20 is displayed.

In FIG. 20, the playlist editing screen 530 is a screen provided as a function of the music distribution app, and is a UI for editing a selected playlist. The playlist editing screen 530 includes a song list area 531 and a song addition button 532.

The song list area 531 is an area for displaying and selecting from a list of songs registered in the selected playlist. The song addition button 532 is a button operated when a new song is added to the selected playlist.

Figure 21:
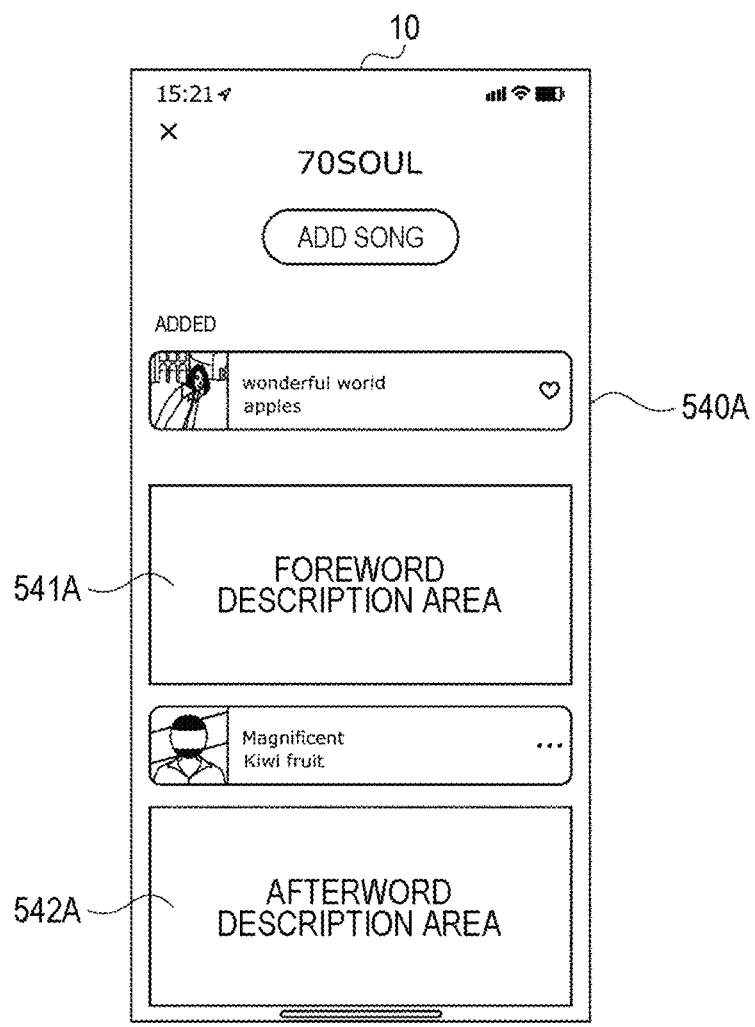
FIG. 21 is a diagram illustrating a second example of the user interface of the program creation tool.
Figure 22:
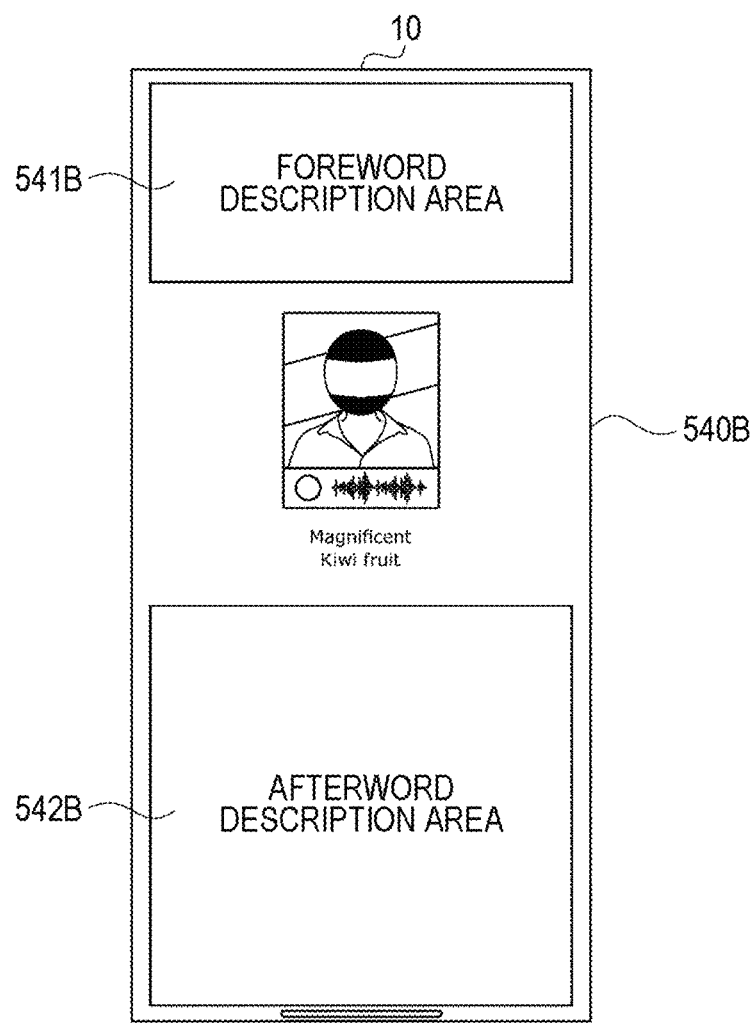
FIG. 22 is a diagram illustrating a second example of the user interface of the program creation tool.

In a case where a desired song surrounded by a frame F2 in the diagram is selected from the songs displayed in the song list area 531 and the edit button 533 of the selected song is operated, a song foreword-afterword editing screen 540A of FIG. 21 or a song foreword-afterword editing screen 540B of FIG. 22 is displayed.

In FIG. 21, the song foreword-afterword editing screen 540A is a UI for editing the foreword and the afterword of the selected song. The song foreword-afterword editing screen 540A includes a foreword description area 541A and an afterword description area 542A.

The foreword description area 541A is an area for describing the foreword text for the selected song.

For example, in a case where the creator terminal device 10 is a device such as a smartphone having a touch panel, the creator can perform a tap operation on a software keyboard displayed on the display unit 121 on which the touch panel is superimposed to input a desired foreword as a text. Alternatively, in a case where the creator terminal device 10 can use a service of a voice recognition application programming interface (API) on the cloud, a voice input of a desired foreword by the creator may be converted into a text using the voice recognition service.

Alternatively, in a case where the creator terminal device 10 is a device such as a personal computer having a keyboard, the creator is only required to input a comment of a desired foreword by operating the keyboard.

The afterword description area 542A is an area for describing the afterword text for the selected song. In the afterword description area 542A, a text of a desired afterword according to an operation of a software keyboard, an operation of voice input, or the like by the creator is input.

Furthermore, in FIG. 22, the song foreword-afterword editing screen 540B is a UI for editing the foreword and the afterword of the selected song. The song foreword-afterword editing screen 540B includes a foreword description area 541B and an afterword description area 542B.

The foreword description area 541B is an area for describing a foreword text for the selected song. In the foreword description area 541B, a text of a desired foreword according to an operation of a software keyboard or an operation of voice input by a creator is input.

The afterword description area 542B is an area for describing an afterword text for the selected song. In the afterword description area 542B, a text of a desired afterword according to an operation of a software keyboard, an operation of voice input, or the like by the creator is input.

In this way, the creator can program the playlist by adding the texts of the foreword and the afterword to each song in the playlist. Note that the song foreword-afterword editing screens 540A and 540B described above are examples of the UI for setting the foreword and the afterword for a song, and the foreword and the afterword may be set by another UI.

Figure 23:
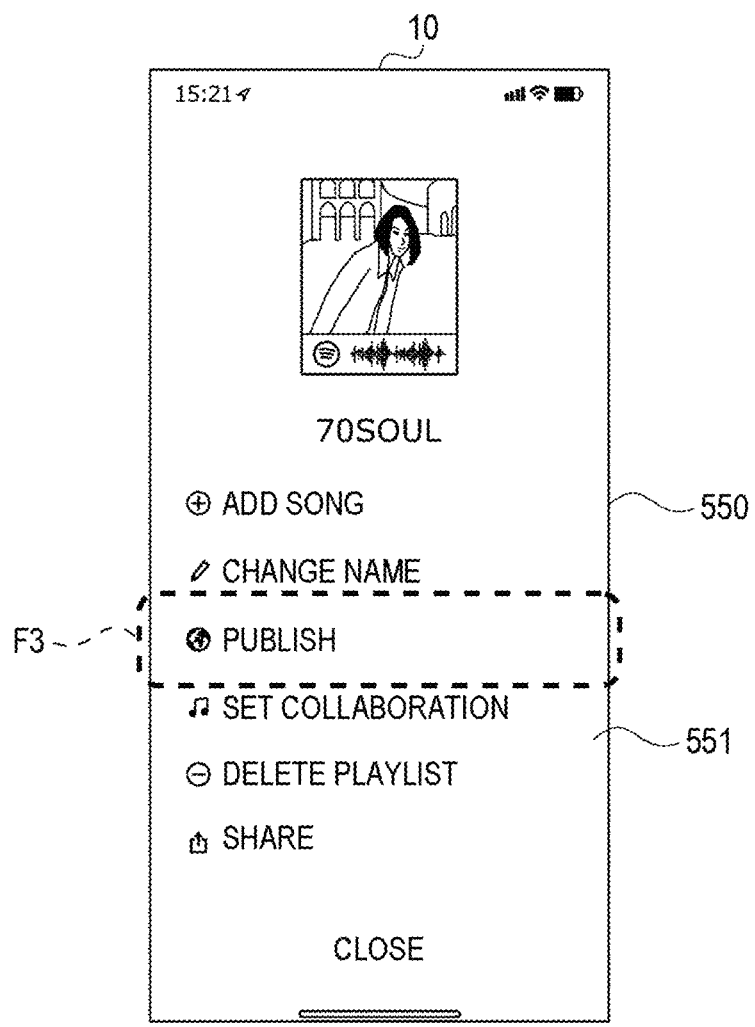
FIG. 23 is a diagram illustrating a second example of the user interface of the program creation tool.

Returning to the description of FIG. 20, in a case where a predetermined operation is performed by the creator on the playlist editing screen 530, a playlist setting screen 550 illustrated in FIG. 23 is displayed.

In FIG. 23, the playlist setting screen 550 is a screen provided as a function of the music distribution app, and is a UI for performing various settings related to a programmed playlist. The playlist setting screen 550 includes a setting area 551.

The setting area 551 includes items for setting, for example, a change of a name of a programmed playlist, publishing of the programmed playlist, and deletion of the programmed playlist. In a case where a tap operation is performed on the "publish" surrounded by a frame F3 in the drawing from among the items displayed in the setting area, the programmed playlist is published to other users.

Thus, the script of the programmed playlist, that is, the script of the program is stored in the database 353 of the program distribution server 30A, and can be browsed by the user who uses the user terminal device 20.

In this manner, the program creation function can be added as one function of the music distribution app provided by the music distribution service.

For example, the creator can program a playlist as a premium user of the music distribution service, set the foreword and the afterword for each song, and publish a script of the programmed playlist. At this time, the song ID set in the script generated by the music distribution app is the ID of the song managed by the music distribution service contracted by the creator.

Second Example

Figure 24:
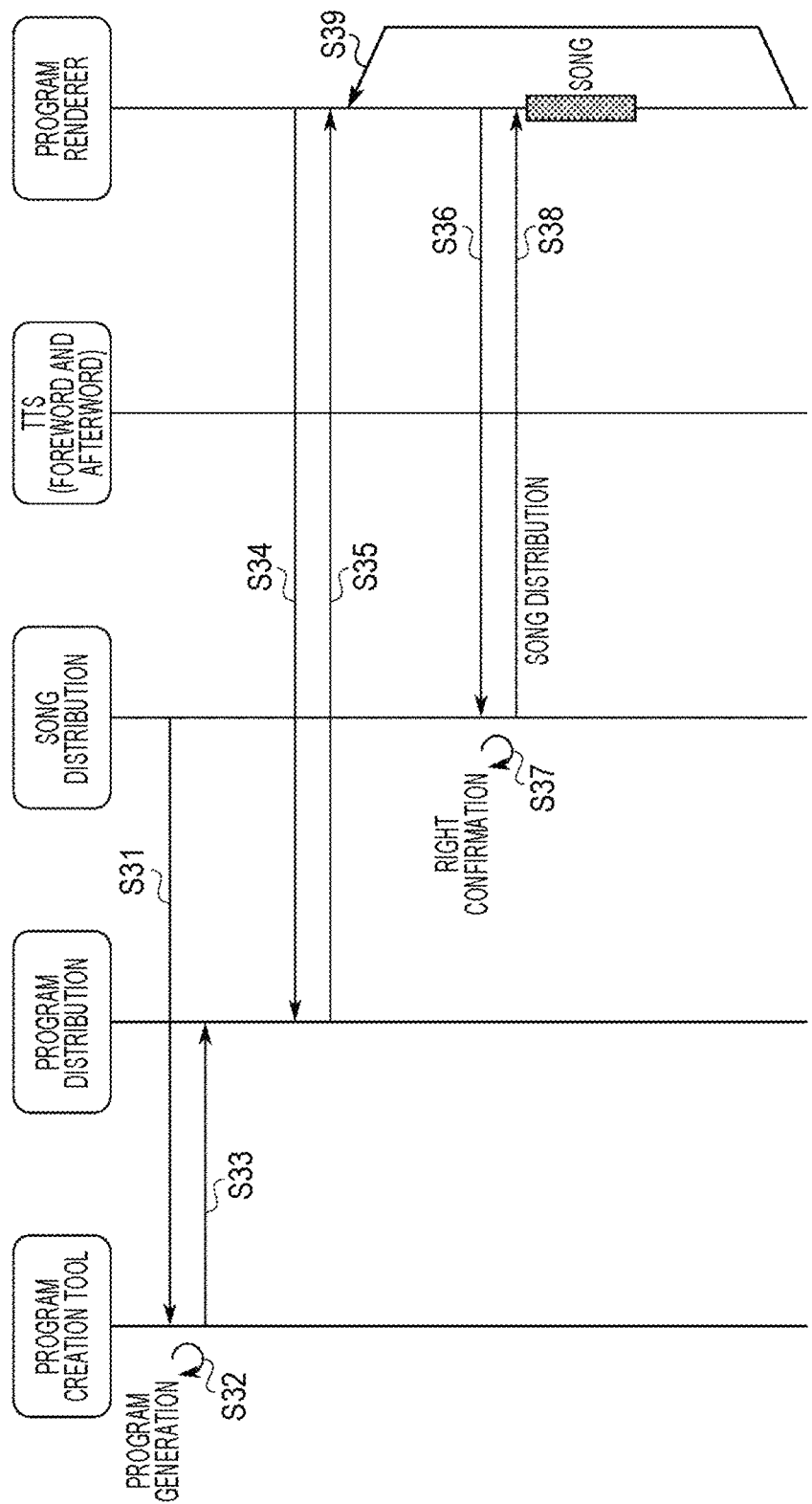
FIG. 24 is a sequence diagram illustrating a flow of processing in a case where the programmed song is reproduced as a playlist in a case where the foreword and the afterword of the song can be provided using voice synthesis.

FIG. 24 is a sequence diagram illustrating a flow of processing in a case where the programmed song is reproduced as a playlist in a case where the foreword and the afterword of the song can be provided using voice synthesis.

In FIG. 24, the fact that the program creation tool and the program renderer are executed by the terminal devices of the creator and the user, respectively, and the program distribution service, the music distribution service, and the TTS service are provided by the respective distribution servers is similar to the first example described with reference to FIG. 15.

In steps S31 to S33 of FIG. 24, as in steps S11 to S13 of FIG. 15, the script of the program is generated by the program creation tool and registered in the program distribution server 30A.

In the program renderer, in a case where an instruction to reproduce a program that is published to be browsable on the program distribution server 30A is given by the user's operation, the script of the program distributed from the program distribution server 30A is received (S34 and S35). Here, for example, it is assumed that the user gives an instruction to reproduce the program as a playlist.

The program renderer requests the song distribution server 30B that provides the music distribution service contracted by the user to distribute the song specified by the song ID set in the received script (S36).

In the song distribution server 30B, in response to the request from the program renderer, the right acquired by the contract with the music distribution service by the user is confirmed (S37), and in a case where it is determined that the user has a legitimate right and reproduction of the song specified by the song ID is possible, streaming distribution of the song is performed (S38).

Thus, in the program renderer, the streaming data of the song distributed from the song distribution server 30B is received and rendered, so that the song specified by the song ID is reproduced.

Furthermore, since the song IDs of a plurality of songs are listed in the order of reproduction in the program script, after the processing of steps S36 to S38 is completed, the processing returns to step S36 (S39), and the processing of steps S36 to S39 is repeated according to the number of song IDs.

Thus, in the program renderer, the songs are repeatedly reproduced in the order of the song IDs set in the script, and the songs reproduced as the playlist can be listened to by the user.

As described above, when the request for reproduction of the playlist is received by the user, reading of the foreword and the afterword included in the script is not performed according to the script selected by the user, and the song indicated by the song ID included in the script is read and provided to the user.

The flow of processing executed by each device in a case where the programmed song is reproduced as a playlist in a case where the foreword and the afterword of the song can be provided using voice synthesis has been described above.

Third Example

Figure 25:
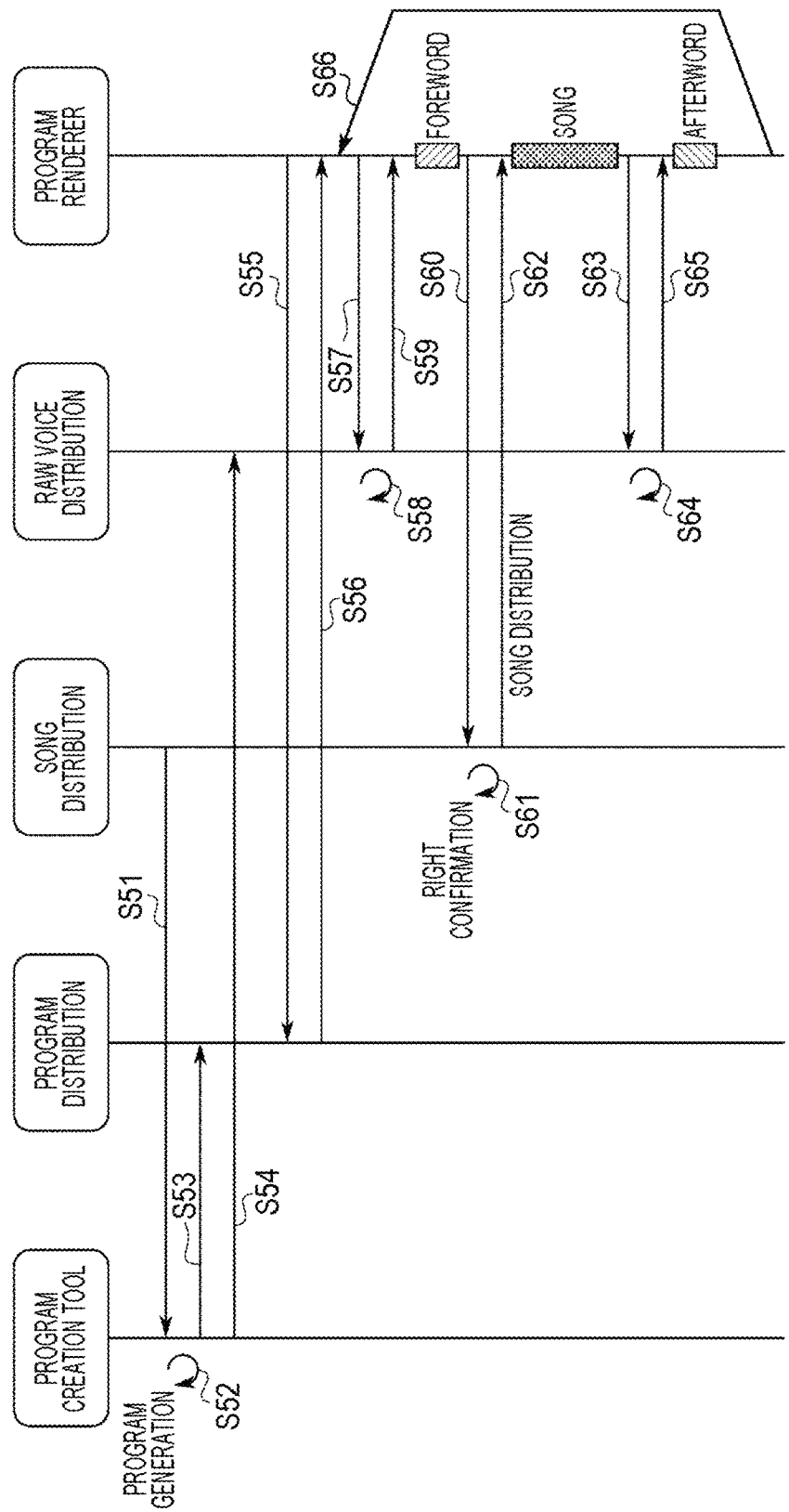
FIG. 25 is a sequence diagram illustrating a flow of processing in a case where a raw voice is used in providing a foreword and an afterword of a programmed song together with the song.

FIG. 25 is a sequence diagram illustrating a flow of processing in a case where a raw voice is used in providing the foreword and the afterword of a programmed song together with the song.

In FIG. 25, the fact that the program creation tool and the program renderer are executed by the terminal devices of the creator and the user, respectively, and the program distribution service and the music distribution service are provided by the respective distribution servers is similar to the first example described with reference to FIG. 15. On the other hand, in the third example of FIG. 25, unlike the first example illustrated in FIG. 15, the raw voice distribution service is provided by the voice distribution server 30C instead of the TTS service.

In steps S51 to S53 of FIG. 25, the script of the podcast program is generated by the program creation tool and registered in the program distribution server 30A, as in steps S11 to S13 of FIG. 15.

However, in the sequence diagram of FIG. 25, since the foreword and the afterword of the song are not included in the script as a text but the foreword and the afterword are read out with the raw voice of the creator, (the file of) the voice data is registered in the voice distribution server 30C (S54).

In other words, in the script registered in the program distribution server 30A, link information to the voice data of raw voice of the foreword and the afterword is set together with the song ID specifying the song.

In steps S55 and S56 of FIG. 25, similarly to steps S14 and S15 of FIG. 15, in a case where an instruction to reproduce the podcast program published to be browsable on the program distribution server 30A is given, the program renderer receives the script of the program distributed from the program distribution server 30A.

The program renderer accesses the voice distribution server 30C on the basis of the link information of the foreword set at the beginning of the received script, and requests raw voice distribution of the foreword (S57).

In the voice distribution server 30C, the voice data of the raw voice of the foreword registered by the creator is processed in response to the request from the program renderer (S58), and the voice data of the raw voice is distributed (S59).

Thus, in the program renderer, the voice data of the foreword distributed from the voice distribution server 30C is received and rendered, so that the raw voice of the foreword portion set in the programmed song is reproduced.

In steps S60 to S62 of FIG. 25, similarly to steps S19 to S21 of FIG. 15, the program renderer reproduces the song distributed by streaming from the song distribution server 30B on the basis of the song ID set next to the foreword of the received script.

Thereafter, when the reproduction of the song that is distributed by streaming ends, the program renderer accesses the voice distribution server 30C on the basis of the link information of the afterword set next to the song ID of the received script, and requests raw voice distribution of the afterword (S63).

In the voice distribution server 30C, the voice data of the afterword registered by the creator is processed in response to the request from the program renderer (S64), and the voice data of the raw voice is distributed (S65).

Thus, in the program renderer, the voice data of the raw voice of the afterword distributed from the voice distribution server 30C is received and rendered, so that the raw voice of the afterword portion set in the programmed song is reproduced.

Furthermore, in the script of the podcast program, since the song IDs of a plurality of songs are programmed together with the link information of the raw voices of the foreword and the afterword of the songs, after the processing of steps S57 to S65 is completed, the processing returns to the processing of step S57 (S66), and the processing of steps S57 to S66 is repeated.

Thus, in the program renderer, reproduction is repeatedly performed in the order of the foreword, the song, and the afterword for each song ID set in the script, and the podcast program can be viewed or listened to by the user.

The flow of the processing executed by each device in a case where the raw voice is used in providing the foreword and the afterword of the song together with the programmed song has been described above.

Fourth Example

Figure 26:
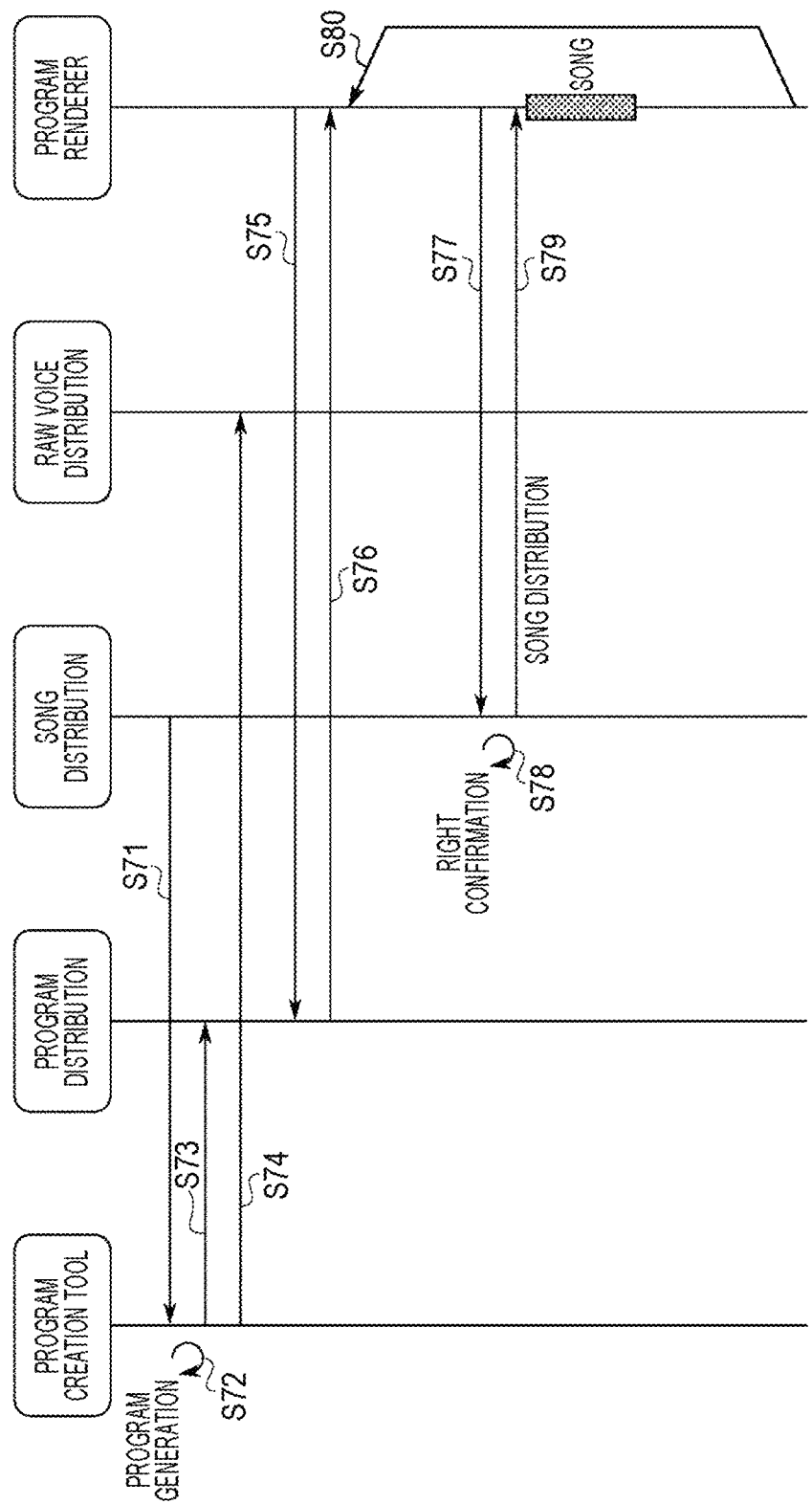
FIG. 26 is a sequence diagram illustrating a flow of processing in a case where the programmed song is reproduced as a playlist in a case where the foreword and the afterword of the song can be provided using raw voice.

FIG. 26 is a sequence diagram illustrating a flow of processing in a case where the programmed song is reproduced as a playlist in a case where the foreword and the afterword of the song can be provided using raw voice.

In FIG. 26, the fact that the program creation tool and the program renderer are executed by the terminal devices of the creator and the user, respectively, and the program distribution service, the music distribution service, and the raw voice distribution service are provided by the respective distribution servers is similar to the third example described with reference to FIG. 25.

In steps S71 to S74 of FIG. 26, similarly to steps S51 to S54 of FIG. 25, the script of a program is registered in the program distribution server 30A by the program creation tool, and (files of) the foreword and the afterword read out with the raw voice of the creator are registered in the voice distribution server 30C.

In the program renderer, in a case where an instruction to reproduce a program that is published to be browsable on the program distribution server 30A is given by the user's operation, the script of the program distributed from the program distribution server 30A is received (S75 and S76). Here, for example, it is assumed that the user gives an instruction to reproduce the program as a playlist.

The program renderer requests the song distribution server 30B that provides the music distribution service contracted by the user to distribute the song specified by the song ID set in the received script (S77).

In the song distribution server 30B, in response to the request from the program renderer, the right acquired by the contract with the music distribution service by the user is confirmed (S78), and in a case where it is determined that the user has a legitimate right and reproduction of the song specified by the song ID is possible, streaming distribution of the song is performed (S79).

Thus, in the program renderer, the streaming data of the song distributed from the song distribution server 30B is received and rendered, so that the song specified by the song ID is reproduced.

Furthermore, since the song IDs of a plurality of songs are listed in the order of reproduction in the script of the program, after the processing of steps S77 to S79 is completed, the processing returns to step S77 (S80), and the processing of steps S77 to S80 is repeated.

Thus, in the program renderer, the songs are repeatedly reproduced in the order of the song IDs set in the script, and the songs reproduced as the playlist can be listened to by the user.

As described above, when the request for reproduction of the playlist is received by the user, reading of the foreword and the afterword included in the script is not performed according to the script selected by the user, and the song indicated by the song ID included in the script is read and provided to the user.

The flow of the processing executed by each device in a case where the programmed song is reproduced as a playlist in a case where the foreword and the afterword of the song can be provided using raw voice has been described above.

(Overall Image of Processing)

Figure 27:
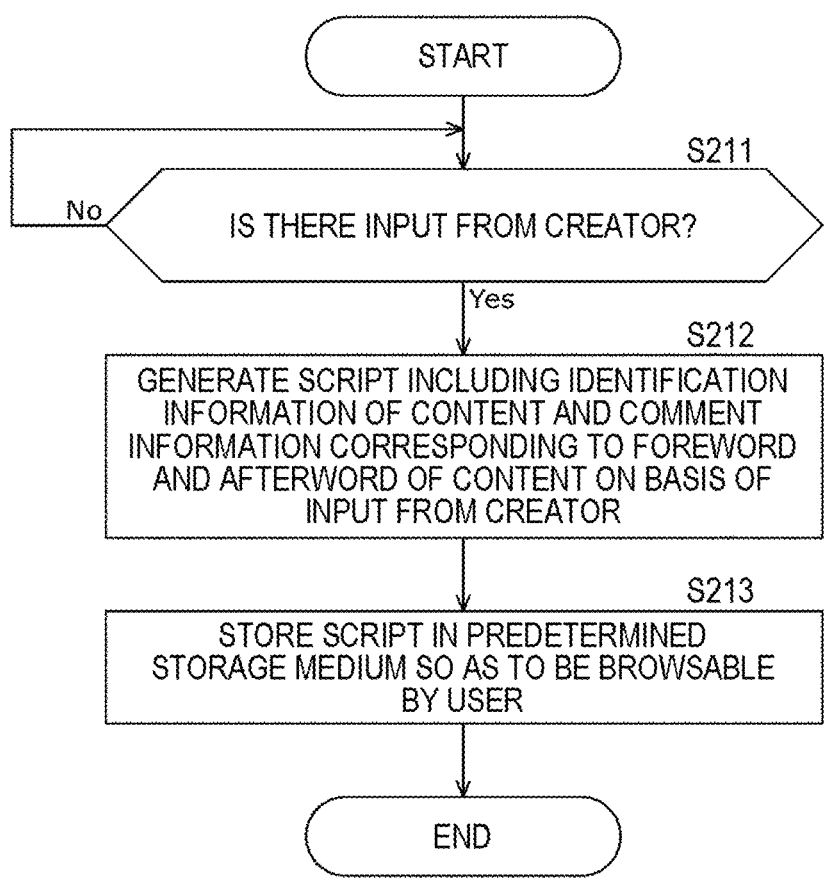
FIG. 27 is a flowchart describing an overall image of processing in a first embodiment.
Figure 28:
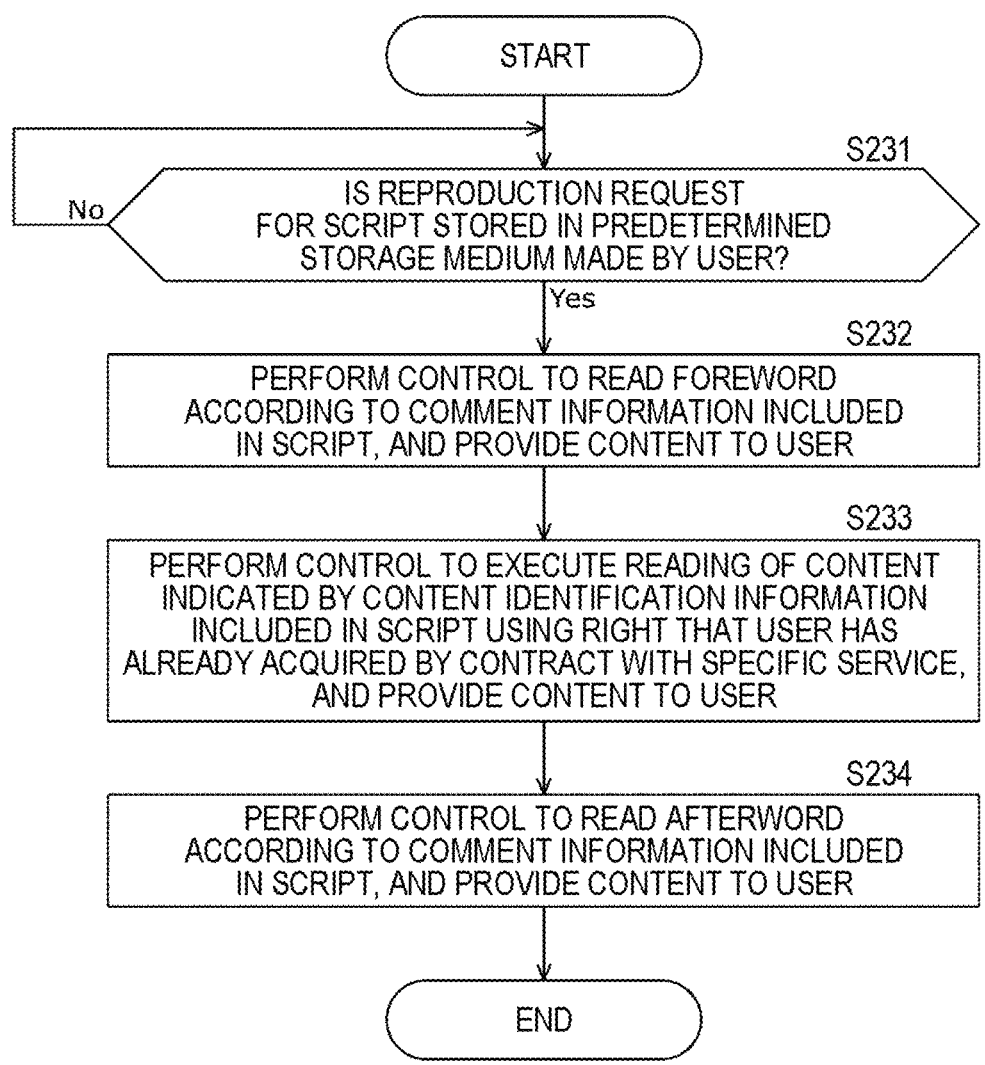
FIG. 28 is a flowchart describing an overall image of processing in the first embodiment.

FIGS. 27 and 28 are flowcharts describing an overall image of processing in the first embodiment.

The processing illustrated in FIGS. 27 and 28 is implemented by (the control unit 100 of) the creator terminal device 10, (the control unit 200 of) the user terminal device 20, and (the control unit 300 of) the distribution server 30 in the content providing system to which the present technology is applied operating in cooperation.

That is, this processing is executed by at least one of the control unit 100, the control unit 200, or the control unit 300.

In the content providing system 1, as illustrated in FIG. 27, in a case where there is an input from the creator who uses the creator terminal device 10 ("Yes" in S211), a script including identification information of content and comment information corresponding to the foreword and the afterword of the content is generated on the basis of the input (S212), and the script is stored in a predetermined storage medium to be browsable by the user who uses the user terminal device 20 (S213).

Here, the content includes a song and the like distributed by the music distribution service, and the identification information of the content includes a song ID or the like that can identify the song. Furthermore, the foreword and the afterword are examples of comments on the content, and it is only required that at least one of the foreword or the afterword is set. For example, in programming the song, in addition to inserting the foreword or the afterword in units of songs, a narration or the like may be inserted as the foreword and then three songs may be continuously reproduced, or an impression or the like of the song may be inserted as the afterword after four songs are reproduced continuously.

The comment information includes text indicating the comment, link information to the raw voice of the creator, or the like. Note that the description will be given assuming that the comment information corresponds to the comment related to the content, but the comment information is not necessarily related to the content, and may correspond to a comment not related to the content. The predetermined storage medium can be, for example, (the database 353 of) the storage unit 307 of the program distribution server 30A.

Furthermore, in the content providing system 1, as illustrated in FIG. 28, in a case where a reproduction request for the script stored in the predetermined storage medium is made by the user who uses the user terminal device 20 ("Yes" in S231), first, control is performed to read the foreword according to the comment information included in the script, and provide the foreword to the user (S232).

Here, the predetermined storage medium can be, for example, (the database 353 of) the storage unit 307 of the program distribution server 30A. Furthermore, the foreword read according to the comment information of the script includes voice such as TTS voice or raw voice.

Subsequently, in the content providing system 1, control is performed to execute reading of the content indicated by the content identification information included in the script using the right that the user has already acquired by the contract with the specific service, and provide the content to the user (S233).

Here, the content identification information includes the song ID or the like that can identify a song. Furthermore, for example, the specific service is a music distribution service, and rights that the user has already acquired include rights of a pay premium user, a free user, and the like.

Furthermore, in the content providing system 1, after the content is provided, control is performed to read the afterword according to the comment information included in the script, and provide the afterword to the user (S234).

Here, the afterword that is read according to the comment information of the script includes a voice such as a TTS voice or a raw voice. Note that the comment (text such as the foreword and the afterword) indicated by the comment information may be converted (translated) into a foreign language and provided to the user. For example, in a case where the system side grasps the profile of the user, when the native language of the user is known, the comment may be converted into the native language and provided to the user as text, or the text may be voice-synthesized by TTS and a voice synthesis result thereof may be provided to the user.

As described above, when content is programmed, a comment regarding content or the like is provided together with the content by using the contract of the user with the service, the text-to-speech synthesis, or the like, and thus the content and the comment thereof can be provided more easily.

2. Second Embodiment

The business that distributes the programmed song is not limited to the same business as the business that distributes the podcast program, and may be a different business. For example, a script of a program created on a specific music distribution app provided by a certain music distribution service can be provided to another music distribution service.

Specifically, the script of the created program is stored in a manner referable from not only the music distribution service that provides the specific music distribution app but also the another music distribution service. At that time, in addition to the identification information such as the song ID that can be recognized by the specific music distribution app, metadata enabling the song to be searched for is stored together. For example, the metadata can include a song name, a song writer, a composer, an artist name, and the like.

Then, in the another music distribution service, in response to a reproduction request from the user terminal device 20 used by the user who has a contract with the another music distribution service, it is only required to specify the song from the database managed by the user himself or herself by using the information such as a song name included in the metadata, and distribute the specified song by streaming.

Note that due to the contract between the user and the another music distribution service, the copyright processing related to the song reproduction has been solved. Furthermore, a part of a revenue corresponding to reproduction of such a song distributed from the another music distribution service may be returned to the music distribution service providing the specific music distribution app, or a part thereof may be returned to the creator.

Note that the configuration of the content providing system 1 according to the second embodiment is similar to the configuration of the first embodiment, and thus the description thereof will be omitted. Hereinafter, a flow of processing executed in each device of the content providing system 1 will be described.

(Flow of Processing in Case Where Distributor is Different)

Figure 29:
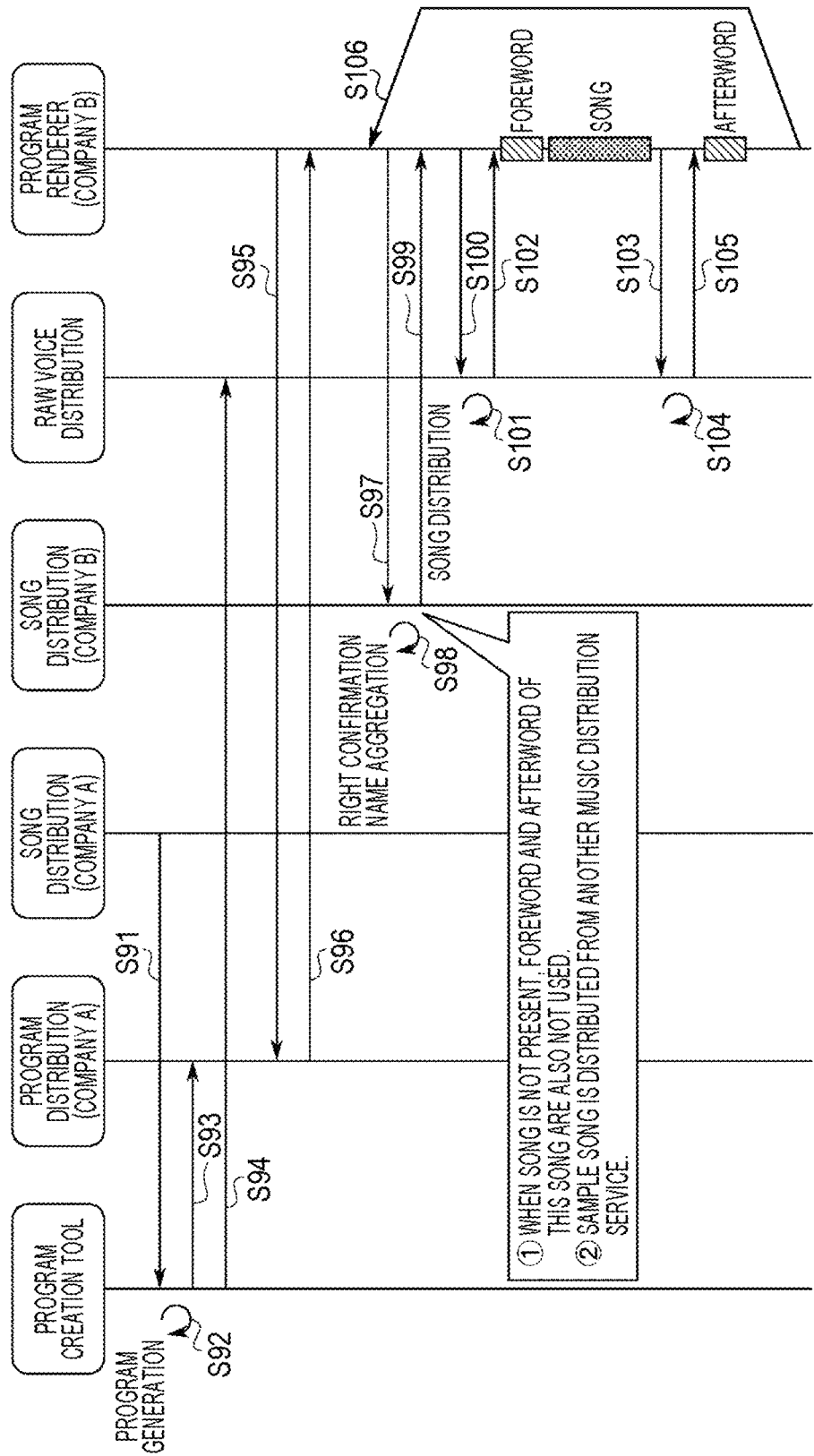
FIG. 29 is a sequence diagram illustrating a flow of processing in a case where a script is provided to another music distribution service.

FIG. 29 is a sequence diagram describing a flow of processing in a case where a script created using the certain music distribution service is provided to the another music distribution service.

In FIG. 29, the fact that the program creation tool and the program renderer are executed by the terminal devices of the creator and the user, respectively, and the program distribution service, the music distribution service, and the raw voice distribution service are provided by the respective distribution servers is similar to the third example described with reference to FIG. 25, and the like.

Furthermore, in the example of FIG. 29, it is assumed that a song distribution server 30B-1 of a company A that provides a music distribution service A and a song distribution server 30B-2 of a company B that provides a music distribution service B are provided, and the program distribution server 30A is provided by the company A. Furthermore, it is assumed that, in the user terminal device 20, the program renderer as the music distribution app provided by the company B is executed.

In steps S91 to S94 of FIG. 29, similarly to steps S51 to S54 of FIG. 25, the script of a program is registered in the program distribution server 30A of the company A by the program creation tool executed by the creator terminal device 10, and (files of) voice data of foreword and afterword read out with raw voice of the creator are registered in the voice distribution server 30C.

In the user terminal device 20, the program renderer of the company B is executed, and in a case where an instruction on reproduction of a program published to be browsable on the program distribution server 30A of the company A is given by the user's operation, the script of the program distributed from the program distribution server 30A of the company A is received (S95 and S96).

The script includes metadata for searching for content in addition to the song ID regarding the programmed song.

For example, the metadata includes a song name, a song writer, a composer, an artist name, and the like. More specifically, information specified in items such as "title" and "artist" in the script illustrated in FIG. 7 can be used as metadata.

Next, on the basis of the received script, the program renderer of the company B requests the song distribution server 30B-2 of the company B that provides the music distribution service B contracted by the user to distribute the song specified by the metadata (S97).

In the song distribution server 30B-2, in response to the request from the program renderer of the company B, the right acquired by the contract with the music distribution service B by the user is confirmed, and in a case where it is determined that the user has a legitimate right, the specification of song using the metadata is performed (S98).

In the song distribution server 30B-2, a search for a song using the metadata is performed targeting at songs distributed by streaming by the music distribution service B, and in a case where the song can be specified by the metadata, streaming distribution of the song is performed to the user terminal device 20 (S99).

In this case, in the program renderer of the company B, before the song is provided, the voice distribution server 30C is accessed on the basis of the link information of the foreword set in the script, and thereby the raw voice of the foreword portion set in the programmed song is reproduced (S101 to S102). Subsequently, the program renderer of the company B reproduces the song distributed by streaming from the song distribution server 30B-2 of the company B.

Thereafter, when the reproduction of the song to be streaming-distributed ends, the program renderer of the company B accesses the voice distribution server 30C on the basis of the link information of the afterword set in the script, thereby reproducing the raw voice of the afterword set in the programmed song (S103 to S105).

Note that by repeating the processing of steps S97 to S106, in the program renderer of the company B, reproduction is repeatedly performed in the order of the foreword, the song, and the afterword for each song ID set in the script, and the podcast program can be viewed or listened to by the user.

On the other hand, in the processing of step S98, in a case where the song has not been specified by the metadata included in the request from the program renderer of the company B by the song distribution server 30B-2 of the company B, for example, the following process is performed.

First, the song distribution server 30B-2 of the company B responds to the program renderer of the company B with the fact, and skips reproduction of the song that has not been specified and the foreword and the afterword of the song. Thus, in the user terminal device 20, the target song is skipped by the program renderer of the company B, and the reproduction of the next song (or the foreword of the next song) is started.

Second, the song distribution server 30B-2 of the company B distributes a sample song of the song corresponding to the metadata from the song distribution server 30B-1 of the company A to the user terminal device 20. Thus, in the user terminal device 20, the sample song distributed from the music distribution service A to which the user is not subscribed is reproduced by the program renderer of the company B.

Note that, in the example of FIG. 29, a case where the raw voice is used in providing the foreword and the afterword of the song together with the programmed song has been described, but the foreword and the afterword of the song may be provided by using voice synthesis.

(Overall Image of Processing)

Figure 30:
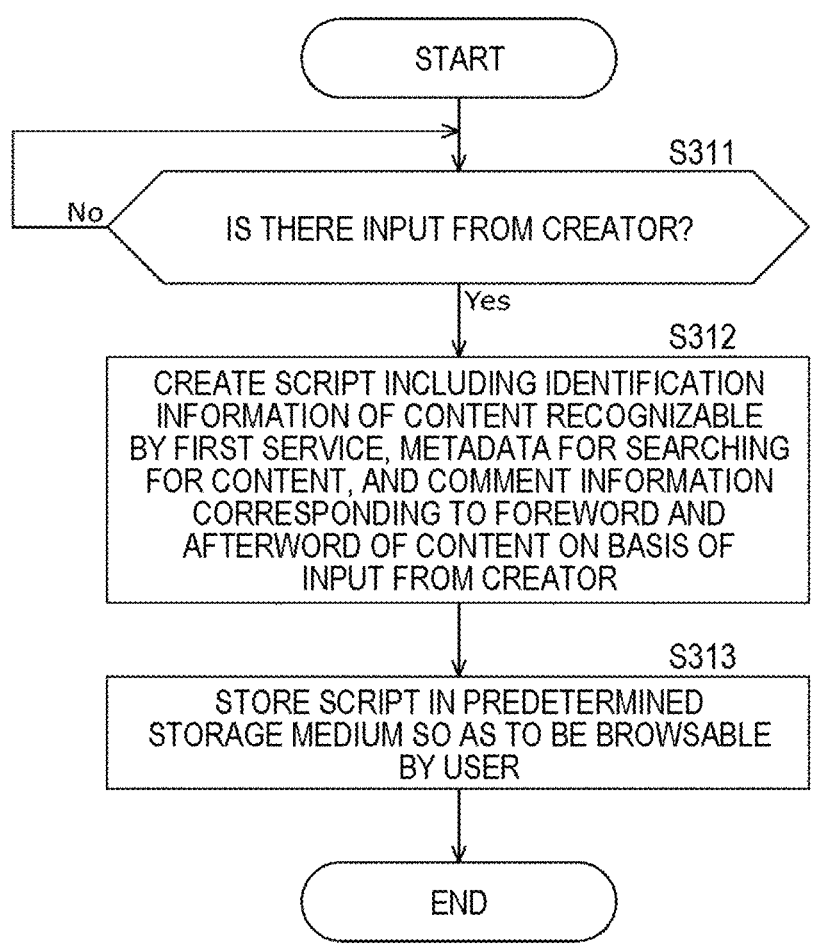
FIG. 30 is a flowchart describing an overall image of processing in a second embodiment.
Figure 31:
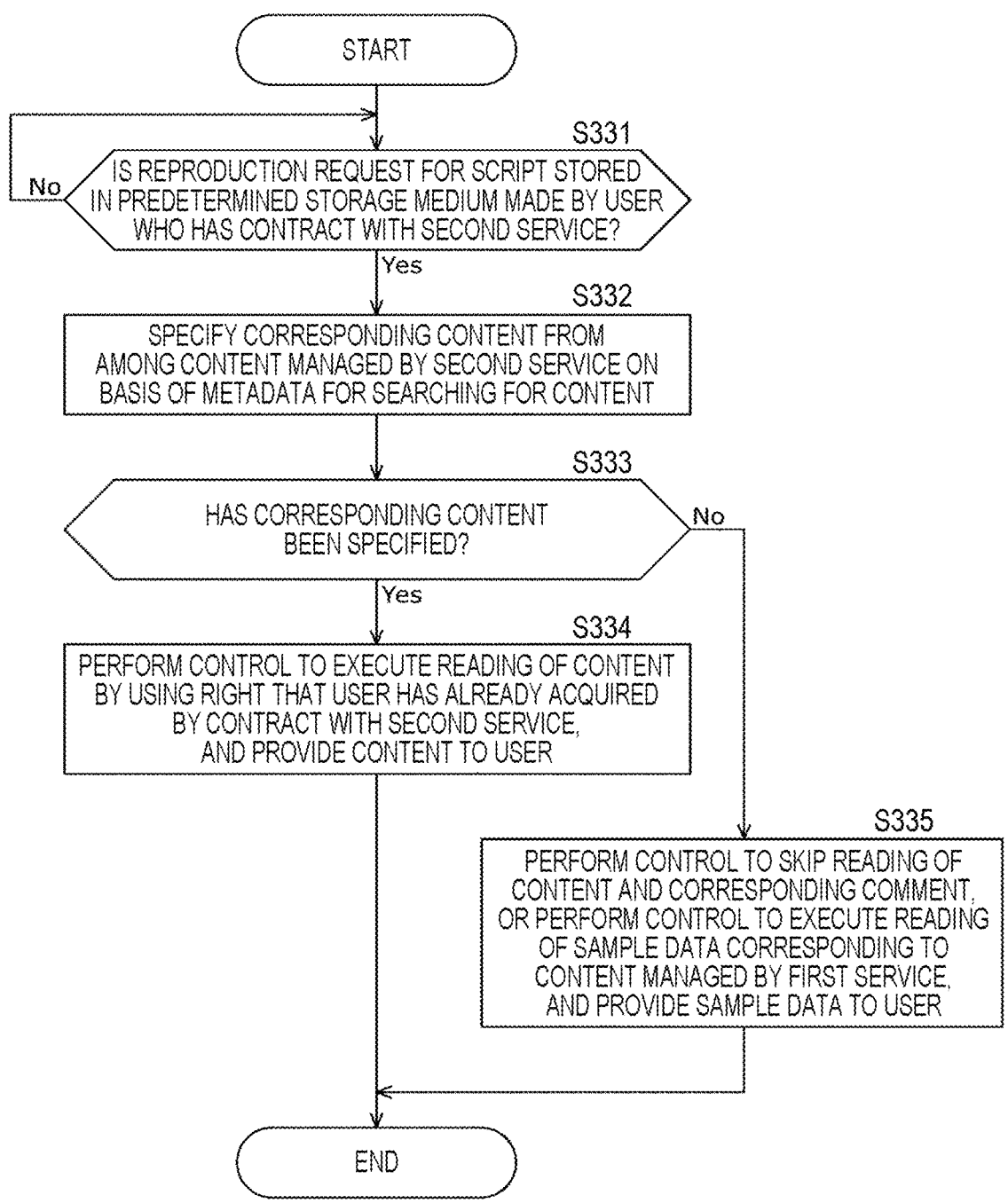
FIG. 31 is a flowchart describing an overall image of processing in the second embodiment.

FIGS. 30 and 31 are flowcharts describing an overall image of processing in the second embodiment.

The processing illustrated in FIGS. 30 and 31 is implemented by (the control unit 100 of) the creator terminal device 10, (the control unit 200 of) the user terminal device 20, and (the control unit 300 of) the distribution server 30 in the content providing system to which the present technology is applied operating in cooperation.

In the content providing system 1, as illustrated in FIG. 30, in a case where there is an input from the creator who uses the creator terminal device 10 ("Yes" in S311), a script including the identification information of the content that can be recognized by the first service, the metadata for searching for the content, and the comment information corresponding to the foreword and afterword of the content is generated on the basis of the input (S312), and the script is stored in a predetermined storage medium to be browsable by the user who uses the user terminal device 20 (S313).

Here, the content includes a song and the like distributed by the music distribution service, and the identification information of the content includes a song ID or the like that can identify the song. Furthermore, the foreword and the afterword are examples of comments on the content, and it is only required that at least one of the foreword or the afterword is set.

Further, the first service is, for example, the music distribution service A provided by the company A. Furthermore, the metadata includes a song name and the like. The predetermined storage medium can be, for example, the database 353 of the program distribution server 30A.

Furthermore, in the content providing system 1, as illustrated in FIG. 31, in a case where a reproduction request for the script recorded in the predetermined storage medium is made by the user who has a contract with a second service ("Yes" in S331), processing of specifying the corresponding content from among contents managed by the second service is performed on the basis of the metadata for searching for the content (S332), and it is determined whether or not the corresponding content has been specified (S333).

Here, the second service is, for example, the music distribution service B provided by the company B. Furthermore, the content includes a song distributed by the music distribution service and the like, and the metadata includes a song name and the like.

In a case where it is determined in the determination processing of step S333 that the corresponding content has been specified, control is performed to execute reading of the content by using the right that the user has already acquired by the contract with the second service, and provide the content to the user (S334).

That is, the rights that the user has already acquired include rights of a pay premium user, a free user, and the like in the music distribution service B provided by the company B, and the user terminal device 20 reproduces the song distributed from the music distribution service B.

On the other hand, in a case where it is determined in the determination processing of step S333 that the corresponding content has not been be specified, control is performed to skip reading of the content and the corresponding comment, or control is performed to execute reading of sample data corresponding to the content managed by the first service, and provide the sample data to the user (S335).

In other words, in the user terminal device 20, the reproduction target song and the foreword and the afterword of the song are skipped, or the sample song distributed from the music distribution service A provided by the company A is reproduced.

3. Third Embodiment

For the foreword and the afterword set in the programmed song, for example, a word or context and the like that are not appropriate as the foreword or the afterword of the song, such as slander and defamation terms are automatically specified, and in a case where there is a sentence in which such a word or context and the like are specified, it is possible to display a warning at the stage of creating the program or prohibit registration at the stage of registering the program.

Furthermore, in a case where the copyright holder or the like of the song points out not to permit continuous reproduction of a specific foreword or afterword and the song after the program is registered, for example, reproduction of only the foreword or afterword may be prohibited (reproduction of the song is possible), reproduction of the foreword, the song, and the afterword in this order may be prohibited, or reproduction of the song itself may be prohibited.

In this manner, it is possible to use a minimum use permission function when registering or providing the podcast program.

(Another Configuration of Distribution Server)

Figure 32:
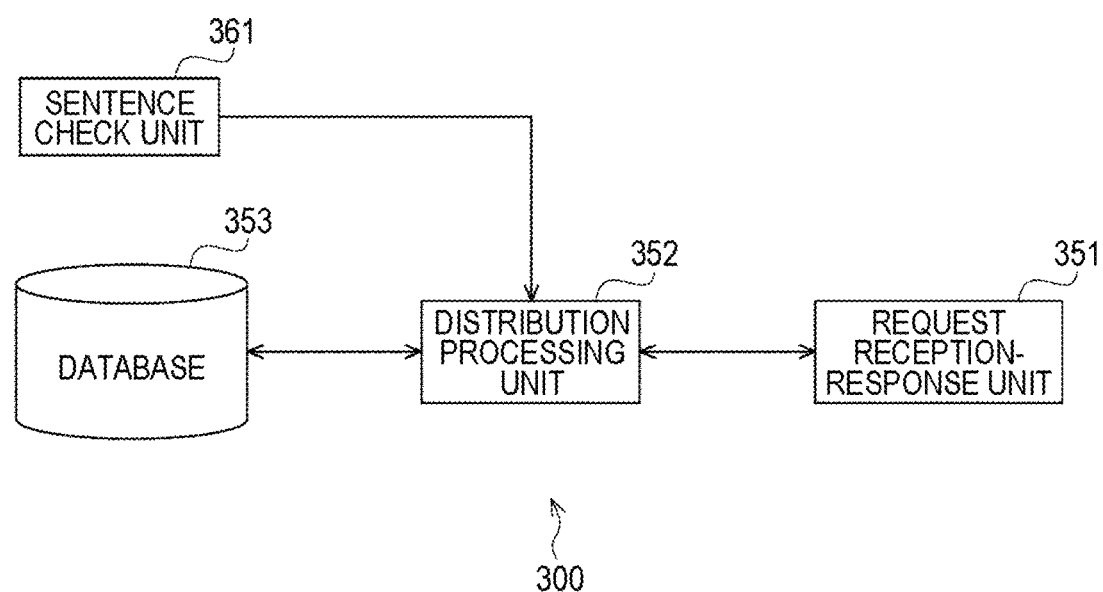
FIG. 32 is a diagram illustrating another example of the functional configuration of the control unit in the distribution server.

FIG. 32 illustrates another example of the functional configuration of the control unit 300 in the distribution server 30.

In FIG. 32, as in FIG. 14, the control unit 300 includes the request reception-response unit 351, the distribution processing unit 352, and the database 353, but a sentence check unit 161 is further provided.

In the program distribution server 30A, when registration of the script of a program is requested from the program creation tool, the distribution processing unit 352 supplies the texts of the foreword and the afterword included in the script of the program to the sentence check unit 161.

The sentence check unit 161 performs sentence check processing on the texts of the foreword and the afterword supplied from the distribution processing unit 352, and supplies a result of the sentence check to the distribution processing unit 352.

In the sentence checking processing, for example, natural language processing and the like including morphological analysis and syntax analysis are performed, and sentences of the texts of the foreword and the afterword are analyzed to check whether or not a word or context (sentence meaning) of slander and defamation terms and the like is included.

In a case where the result of the sentence check supplied from the sentence check unit 161 indicates that the sentence is appropriate as a sentence of the foreword and the afterword, the distribution processing unit 352 stores the script of the program requested to be registered by the program creation tool in the database 353.

Note that the sentence check unit 161 can be provided, for example, inside the program distribution server 30A, but may be provided as an external server to check a sentence in response to a request from the program distribution server 30A, and respond with a result of the sentence check.

(Flow of Processing in Case Where Sentence Check is Performed)

Figure 33:
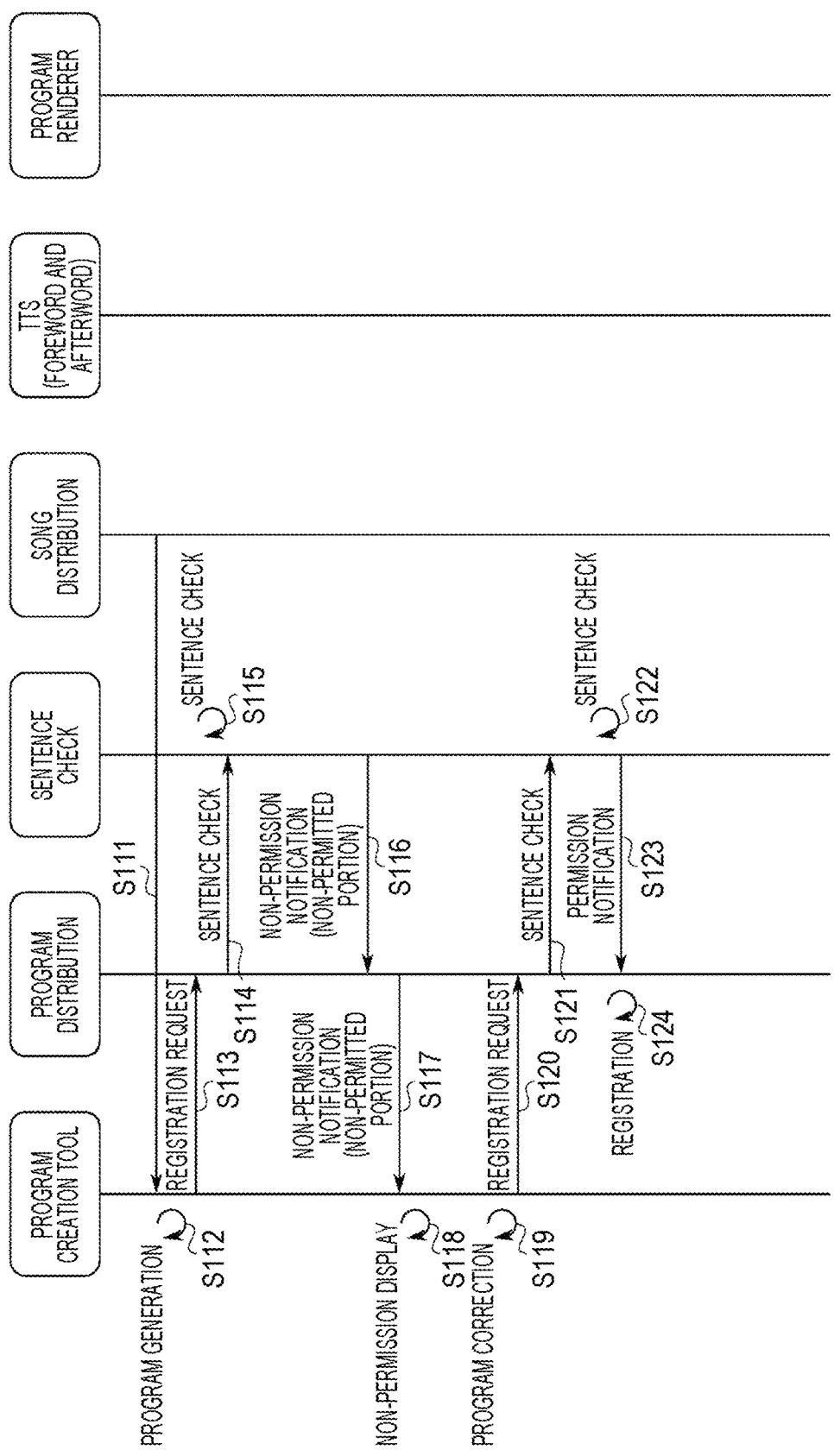
FIG. 33 is a sequence diagram illustrating a flow of processing in a case where a sentence check is performed.

FIG. 33 is a sequence diagram illustrating a flow of processing in a case where the sentence check is performed.

In the example of FIG. 33, the fact that the program creation tool and the program renderer are executed by the terminal devices of the creator and the user, respectively, and the program distribution service, the music distribution service, and the TTS service are provided by the respective distribution servers is similar to the first example and the like described with reference to FIG. 15, and the like, but the program distribution server 30A also executes processing related to the sentence check.

In the creator terminal device 10, the program creation tool is executed and operates in cooperation with each distribution server 30, thereby executing the processing of steps S111 to S124.

The program creation tool acquires the song list transmitted from the song distribution server 30B and presents the song list to the creator (S111).

The program creation tool generates a script of a podcast program on the basis of the song ID of the song selected from the song list by the creator and the texts of the foreword and the afterword of the song input by the creator (S112), and makes a registration request to the program distribution server 30A (S113).

At this time, the program distribution server 30A requests for sentence check of the foreword and the afterword by sending the texts of the foreword and the afterword requested to be registered by the program creation tool to the sentence check unit 361 (S114).

In response to the request for the sentence check, the sentence check unit 361 performs the sentence check on the texts of the foreword and the afterword (S115), and gives notification of results of the sentence check (S116).

In the program distribution server 30A, the program creation tool is notified of the result of the sentence check on the basis of the response from the sentence check unit 361 (S117). Thus, the program creation tool displays the result of the sentence check (S118).

For example, in a case where the sentence check unit 361 determines that the sentences are not appropriate as sentences of the foreword and the afterword, the sentence check unit gives notification of non-permission.

In this notification of non-permission, notification of a non-permitted portion in the checked sentence may be given. The non-permission notification including the non-permitted portion is given to the program creation tool, and the presented with the fact that the foreword and the afterword of the song input by the creator are not permitted and the sentence of the non-permitted portion are presented to the creator.

On the basis of the notification presented by the program creation tool, the creator can correct the sentences of the foreword and the afterword of the song to be programmed.

The program creation tool regenerates the podcast program on the basis of the texts of the foreword and the afterword of the song corrected by the creator (S119), and requests the program distribution server 30A for registration again (S120).

At this time, the program distribution server 30A requests for sentence check of the foreword and the afterword by sending the texts of the foreword and the afterword requested for registration by the program creation tool to the sentence check unit 361 (S121).

In response to the request for the sentence check, the sentence check unit 361 performs the sentence check of the texts of the foreword and the afterword (S122), and gives notification of results of the sentence check (S123).

For example, in a case where the sentence check unit 361 determines that the sentences are appropriate as sentences of the foreword and the afterword, the sentence check unit 361 gives notification of permission.

On the basis of the permission notification from the sentence check unit 361, in the program distribution server 30A, the script of the program including the texts of the foreword and the afterword of the song after correction that is requested to be re-registered from the program creation tool is stored in the database 353, and the script can be browsed by the user using the user terminal device 20 (S124).

(Overall Image of Processing)

Figure 34:
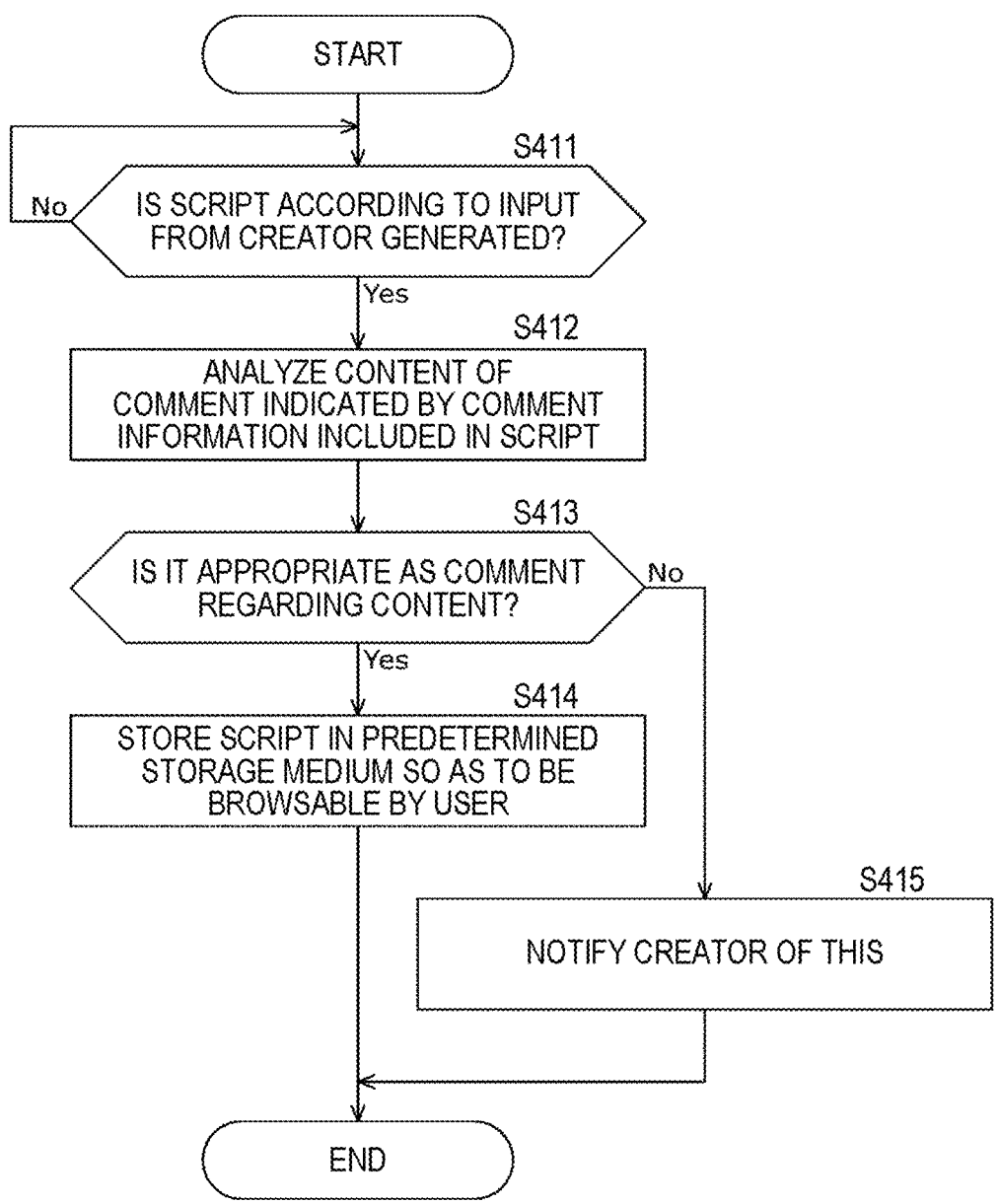
FIG. 34 is a flowchart describing an overall image of processing in a third embodiment.

FIG. 34 is a flowchart describing an overall image of processing in the third embodiment.

The processing illustrated in FIG. 34 is implemented by (the control unit 100 of) the creator terminal device 10 and (the control unit 300 of) the distribution server 30 in the content providing system to which the present technology is applied operating in cooperation.

In the content providing system 1, as illustrated in FIG. 34, in a case where a script according to an input from a creator who uses the creator terminal device 10 is generated ("Yes" in S411), the content of the comment indicated by the comment information corresponding to the foreword and the afterword of the content included in the script is analyzed (S412), and whether or not the content of the comment is appropriate as the comment regarding the content is determined on the basis of the analysis result (S413).

Here, the content includes a song and the like distributed by the music distribution service. Furthermore, the foreword and the afterword are examples of comments on the content, and it is only required that at least one of the foreword or the afterword is set.

In a case where it is determined in the determination processing of step S413 that the content of the comment is appropriate as the comment regarding the content, the script including the comment information is stored in a predetermined storage medium to be browsable by the user who uses the user terminal device 20 (S414).

That is, in a case where a word or context of slander and defamation terms, and the like is not included in the foreword or the afterword of the song to be programmed, it is determined that the foreword or the afterword is appropriate, and the script of the program is registered in the database 353 of the program distribution server 30A.

On the other hand, in a case where it is determined in the determination processing of step S413 that the content of the comment is not appropriate as the comment regarding the content, the creator terminal device 10 used by the creator is notified of this determination.

In other words, in a case where the foreword or the afterword of the song to be programmed includes a word or context of slander and defamation terms, and the like, the foreword or the afterword is automatically specified, and a warning is displayed in a program production stage by a program creation tool, or registration is disapproved in a program registration stage.

4. Fourth Embodiment

An advertisement may be inserted into a podcast program. For example, it is possible to analyze the content of at least one of the foreword or the afterword set in the programmed song, and insert a related advertisement before the foreword or after the afterword according to the analysis result.

The advertisement to be inserted into the program can be described in text in the script, for example, and voice synthesis can be performed on the basis of the same phonemes as the voice synthesis of the texts of the foreword and the afterword.

In other words, in the user terminal device 20, according to the script of the program selected by the user, in a case where the foreword and the afterword included in the script are voice-synthesized with a specific voice and provided to the user, the text of the advertisement is also voice-synthesized with the specific voice and provided to the user.

(Other Configurations of System)

Figure 35:
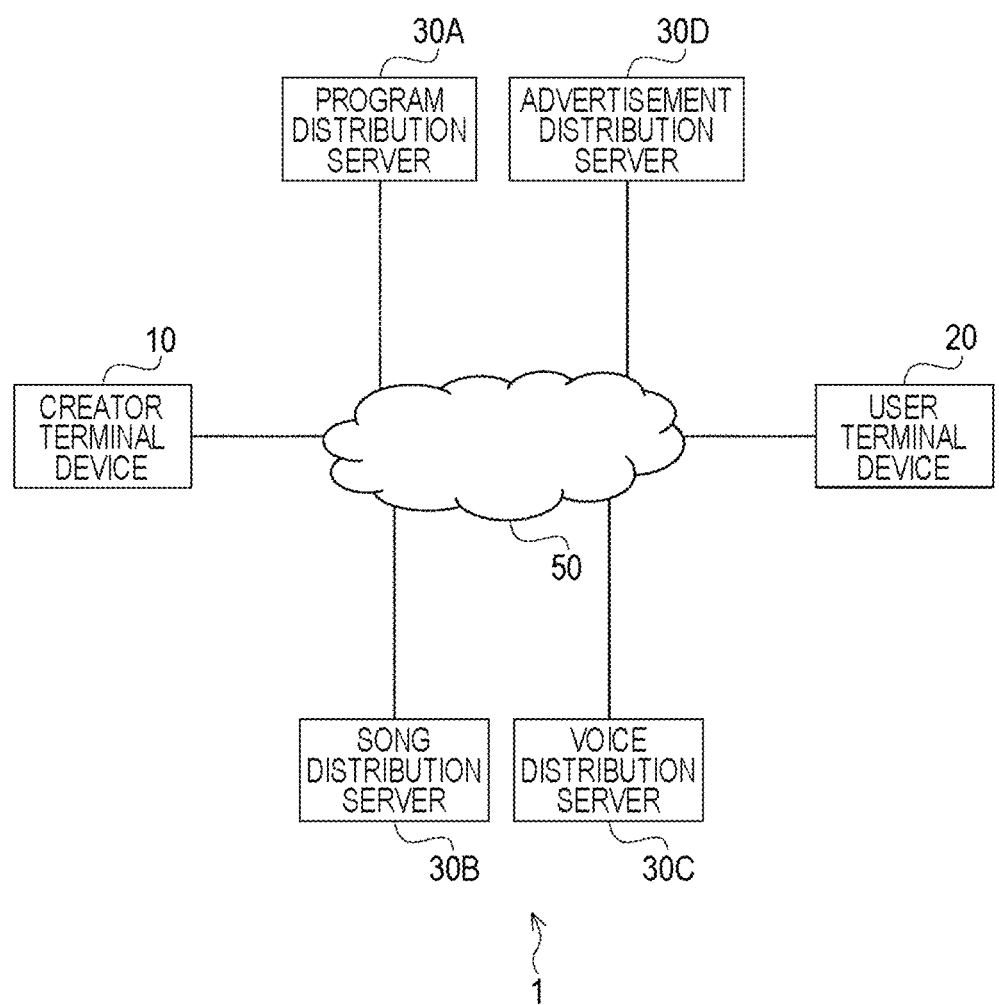
FIG. 35 is a diagram illustrating an example of another configuration of an embodiment of the content providing system to which the present technology is applied.

FIG. 35 illustrates an example of another configuration of an embodiment of the content providing system to which the present technology is applied.

In FIG. 35, similarly to FIG. 8, the content providing system 1 includes the creator terminal device 10, the user terminal device 20, the program distribution server 30A, the song distribution server 30B, and the voice distribution server 30C, but an advertisement distribution server 30D is further provided.

The advertisement distribution server 30D includes one or a plurality of servers that provides advertisement distribution services. The advertisement distribution service is a service that distributes an advertisement through the Internet, and is provided by, for example, an advertisement distribution company.

For example, the advertisement distribution server 30D specifies an advertisement managed by the database 353 for advertisement management or advertisement in response to a request from the program distribution server 30A, and distributes the specified advertisement (advertisement text).

Note that the advertisement distribution server 30D has a configuration similar to the configuration of the distribution server 30 and the functional configuration of the control unit 300 illustrated in FIGS. 13 and 14.

(Example of Advertisement)

Figure 36:
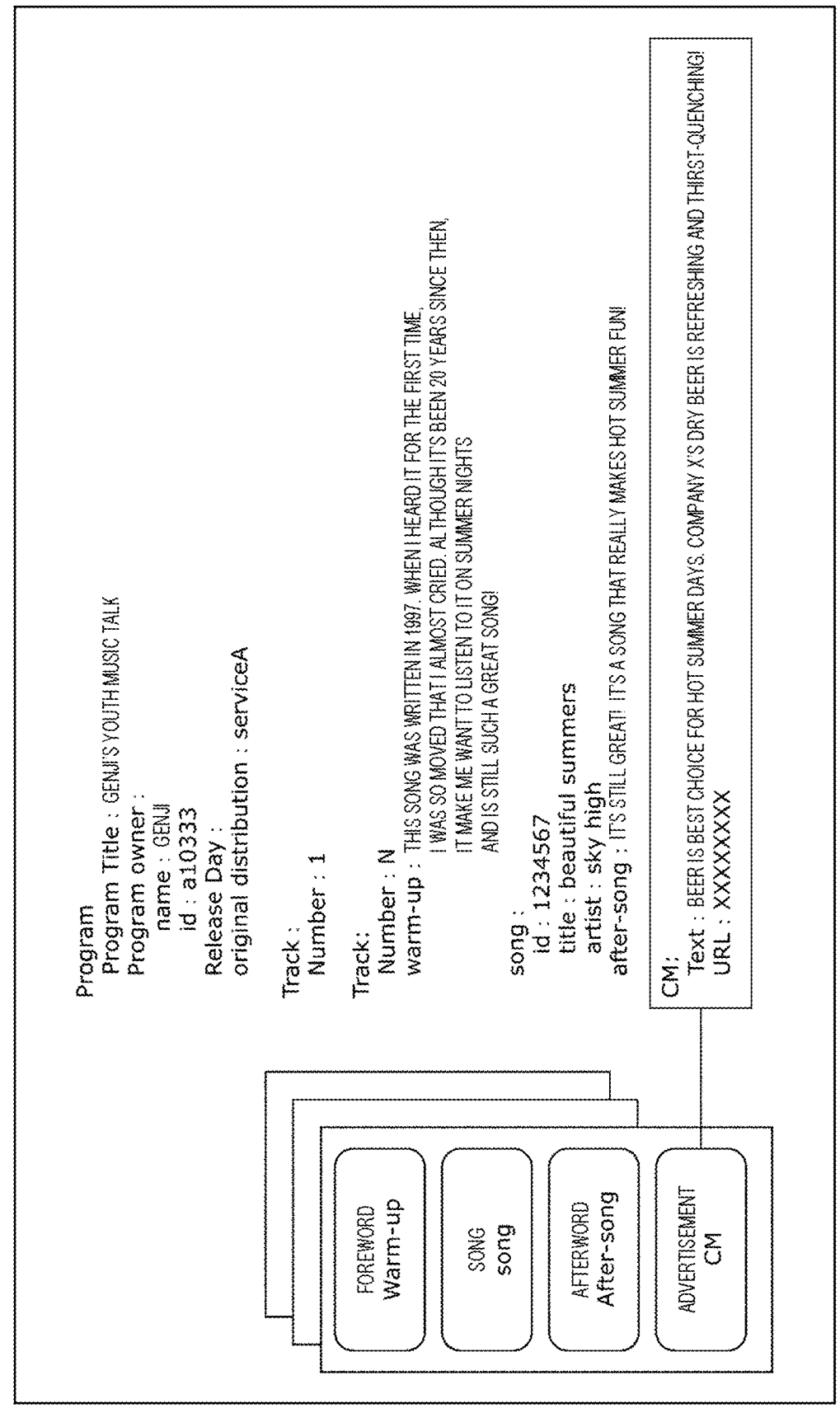
FIG. 36 is a diagram illustrating an example of an advertisement inserted into a program.

FIG. 36 illustrates an example of an advertisement inserted into the script of the podcast program.

As described above, in the script of the podcast program, the music (song) to be programmed, the foreword (Warm-up) of the song, and the afterword (After-song) are described as a set, and in FIG. 36, the text of the advertisement is inserted after the afterword.

In the example of FIG. 36, the foreword includes the text " . . . , it makes me want to listen to it in the summer . . . " and the afterword includes the text "it's a song that really makes hot summer fun!", and these texts are analyzed.

In the script of the program, according to the analysis result of these texts, as an advertisement related to the keyword of "summer", an advertisement of beer formed by a text "beer is the best choice for hot summer days. Company X's dry beer is refreshing and thirst-quenching!" is inserted. Furthermore, a uniform resource locator (URL) of a web page related to the beer of the company X is also described together with the text of the advertisement of beer.

Here, in a case where the texts of the foreword and the afterword are voice-synthesized and the TTS voice is read out, the sentence of the text can be analyzed by natural language processing or the like on the text, so that more accurate analysis can be performed as compared with a case where the analysis of the raw voice is performed in the raw voice distribution.

Thus, it is possible to present more relevant advertisements by analyzing the texts of the foreword and the afterword. For example, an advertisement for wine can be presented in a case where there is a foreword or an afterword of "How about having a glass of wine while listening to this song".

Furthermore, when the text of the inserted advertisement is voice-synthesized and the TTS voice is read out, the text may be read out as it is, but for example, the text may be read out according to the tone of voice of the DJ or read out in a dialect. Alternatively, the tone of the TTS voice of the advertisement may be matched with the tone of the TTS voice of the foreword or the afterword.

Note that, in the example of FIG. 36, a case where the advertisement is inserted after the afterword has been described. However, the advertisement can be inserted in an arbitrary place, and in particular, it is preferable to insert the advertisement before the foreword or after the afterword from the relationship with the song.

(Flow of Processing in Case of Inserting Advertisement into Program)

Figure 37:
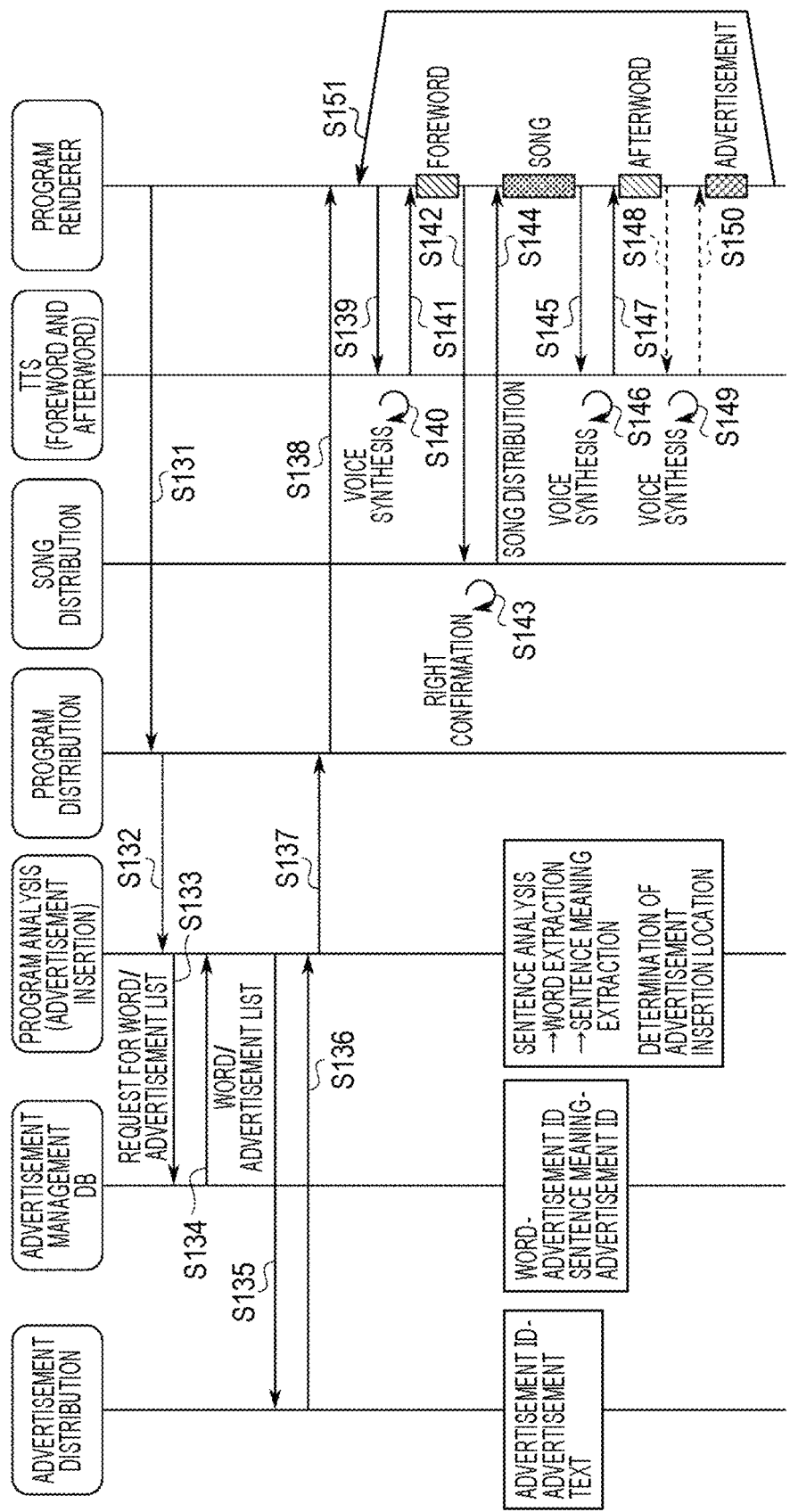
FIG. 37 is a sequence diagram illustrating a flow of processing in a case where an advertisement is inserted into a program.

FIG. 37 is a sequence diagram illustrating a flow of processing in a case where the advertisement is inserted into the program.

In the example of FIG. 37, the fact that the program renderer is executed by the user terminal device 20, and the program distribution service, the music distribution service, and the TTS service are provided by the respective distribution servers is similarly to the first example or the like described with reference to FIG. 15, but the advertisement distribution server 30D that provides the advertisement distribution service and the advertisement management DB is provided.

In the program distribution server 30A, in a case where an instruction to reproduce a podcast program published to be browsable is given by the program renderer operated by the user, the script of the program is analyzed (S131 and S132).

The program distribution server 30A acquires a word-advertisement list from the advertisement management database 353 by transmitting a request corresponding to the analysis result of the script of the program to the advertisement distribution server 30D (S133 and S134).

For example, at the time of analyzing the script, sentences of texts of the foreword and the afterword set in the script are analyzed, words and sentence meanings included in the sentences are extracted, and the insertion place of the advertisement in the program is determined. Furthermore, in the advertisement management database 353, since words or sentence meanings are associated with an advertisement ID, the advertisement ID corresponding to the foreword and the afterword is acquired as the word-advertisement list.

Furthermore, the program distribution server 30A acquires an advertisement (advertisement text) by transmitting a request including an advertisement ID to the advertisement distribution server 30D (S135 and S136).

That is, in the advertisement distribution server 30D, since the advertisement ID and the advertisement text are managed by the advertisement database 353 in association with each other, the program distribution server 30A can acquire the advertisement text specified by the advertisement ID corresponding to the foreword and the afterword and insert an advertisement text into the determined insertion place (S137). The script of the program into which the advertisement is inserted is transmitted to the program renderer (S138).

In steps S139 to S147, similarly to the steps S16 to S24 in FIG. 15, in the program renderer, the foreword set in the script of the program, the song specified by the song ID, and the afterword are reproduced in this order, and the program can be viewed or listened to.

Furthermore, since the text of the advertisement is inserted into the script of the program after the afterword, the program renderer requests the voice distribution server 30C that provides the TTS service to perform voice synthesis of the text of the advertisement (S148).

In the voice distribution server 30C, the voice synthesis of the text of the advertisement is performed in response to a request from the program renderer (S149), and a result of the voice synthesis is distributed (S150).

Thus, in the program renderer, the result of the voice synthesis distributed from the voice distribution server 30C is received, and the rendering processing is performed, so that the TTS voice of the advertisement portion inserted into the program is reproduced.

Furthermore, in the script of the podcast program, since the song IDs of a plurality of songs are programmed together with the texts of the foreword and the afterword of the song, after the processing of steps S139 to S150 is completed, the processing returns to the processing of step S139 (S151), and the processing of steps S139 to S151 is repeated according to the number of song IDs.

Thus, in the program renderer, reproduction is repeatedly performed in the order of the foreword, the song, and the afterword for each song ID set in the script of the program, and the podcast program can be viewed or listened to by the user.

Furthermore, in a case where an advertisement related to the foreword or the afterword is inserted before the foreword or after the afterword, or the like, the TTS voice of the advertisement is also reproduced, so that the foreword or the afterword, the song, and the advertisement can be linked to the user. Note that the advertisement is not limited to voice output and may be presented as a graphical user interface (GUI), and for example, the advertisement can be displayed in a predetermined area of a screen of the music distribution app.

Note that, for example, in a case where the voice data of the raw voice of the comment such as the foreword or the afterword is distributed, specific song may be created by using the voice data of the raw voice as a learning material, and the TTS for performing the voice synthesis by the specific song may be created. By this TTS, the voice distribution server 30C may synthesize the text of the advertisement by voice and distribute the text to the user terminal device 20. Thus, since the advertisement is provided with a voice close to the user's favorite raw voice, there is a possibility of leading to improvement in conversion rate of the advertisement, or the like.

Furthermore, in the sequence diagram illustrated in FIG. 37, in order to simplify the description, it has been described that both the processes related to the program distribution service and the program analysis are executed by the program distribution server 30A, but these processes may be executed by different servers. Furthermore, although it has been described that both the processes related to the advertisement distribution service and the advertisement management DB are executed by the advertisement distribution server 30D, these processes may be executed by different servers.

Figure 38:
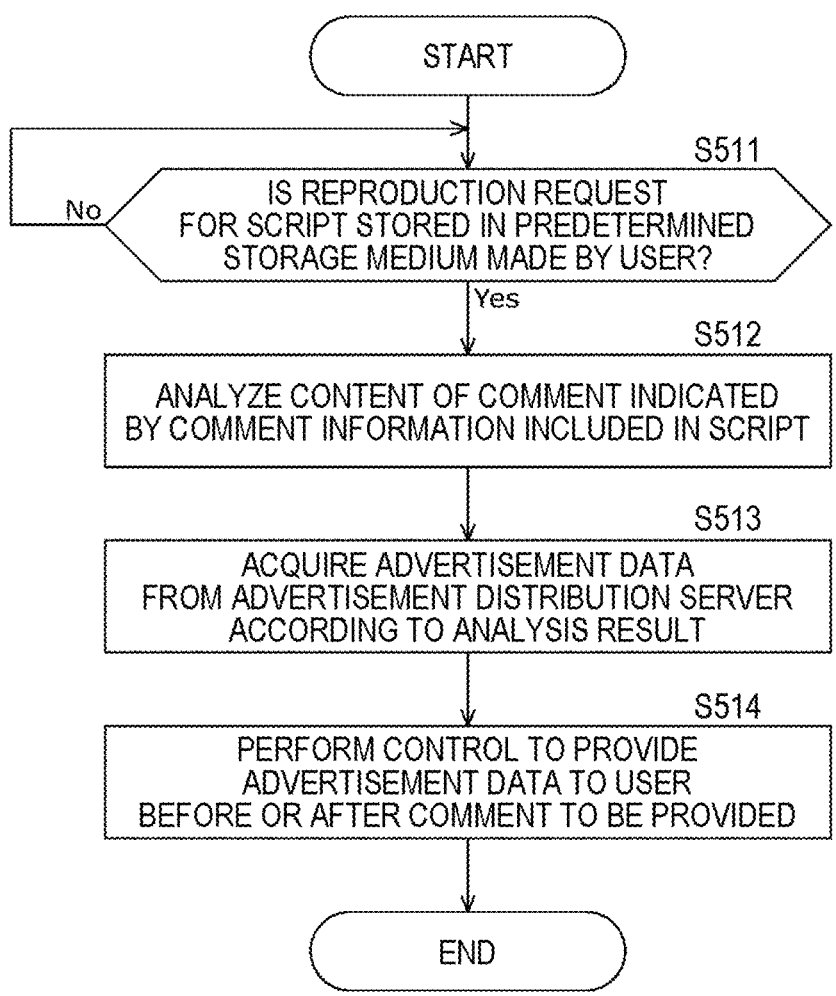
FIG. 38 is a flowchart describing an overall image of processing in a fourth embodiment.

(Overall Image of Processing) FIG. 38 is a flowchart describing an overall image of processing in the fourth embodiment.

The processing illustrated in FIG. 38 is implemented by (the control unit 200 of) the user terminal device 20 and (the control unit 300 of) the distribution server 30 in the content providing system to which the present technology is applied operating in cooperation.

In the content providing system 1, as illustrated in FIG. 38, in a case where the user who uses the user terminal device 20 makes a reproduction request for the script stored in the predetermined storage medium ("Yes" in S511), the content of the comment indicated by the comment information included in the script is analyzed (S512).

Here, the comment includes at least one of the foreword or the afterword of the song as the content, and for example, the contents of the foreword and the afterword are analyzed by analyzing the sentences of the texts of the foreword and the afterword and extracting words and sentence meanings included in the sentences.

Then, in the content providing system 1, advertisement data (advertisement text) is acquired from the advertisement distribution server 30D on the basis of the analysis result of the content of the comment (S513), and the advertisement data is controlled to be provided to the user before or after the comment to be provided (S514).

5. Modification Example

An original ID held by each record company may be used as content identification information such as the song ID described in the script of the podcast program.

(Other Configurations of System)

Figure 39:
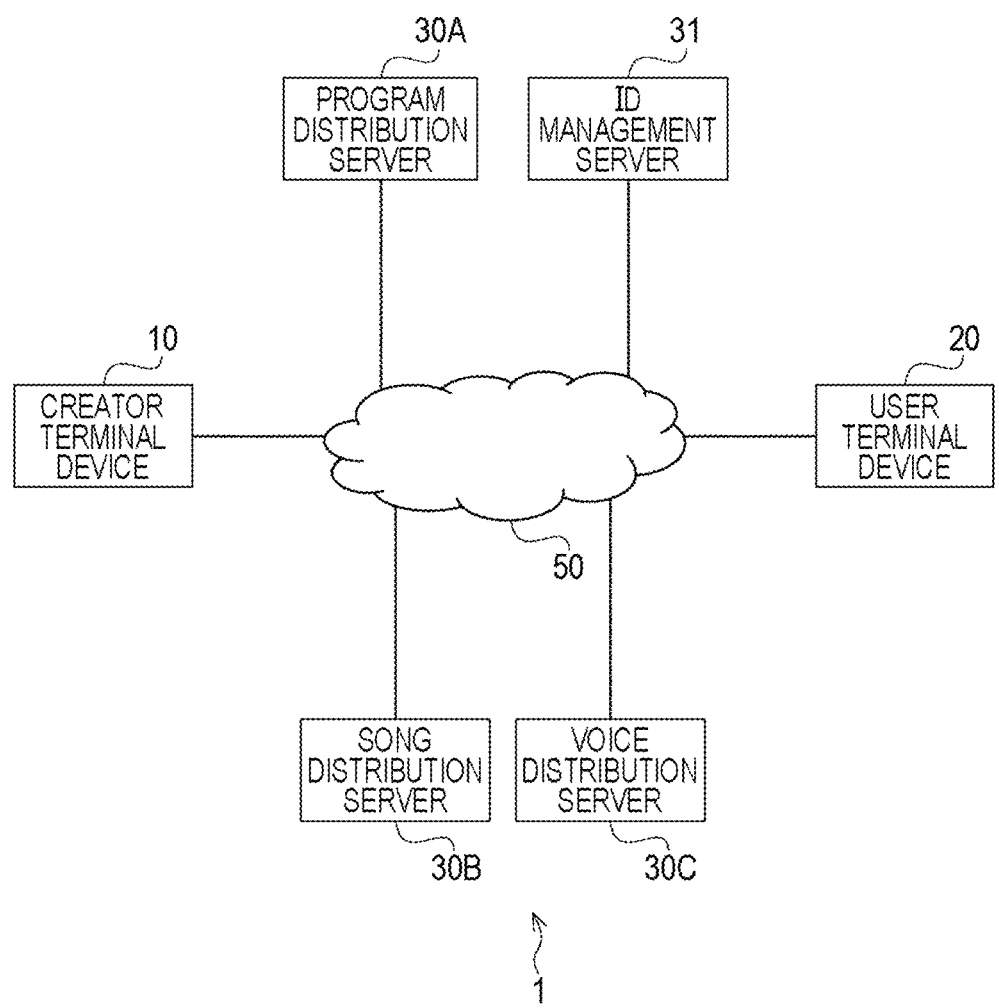
FIG. 39 is a diagram illustrating an example of another configuration of an embodiment of the content providing system to which the present technology is applied.

FIG. 39 illustrates an example of another configuration of an embodiment of the content providing system to which the present technology is applied.

In FIG. 39, similarly to FIG. 8, the content providing system 1 includes the creator terminal device 10, the user terminal device 20, the program distribution server 30A, the song distribution server 30B, and the voice distribution server 30C, but an ID management server 31 is further provided.

The ID management server 31 manages song IDs used for each music distribution service in association with each other by the management database. The ID management server 31 provides information related to the managed song ID in response to a request from a device such as the user terminal device 20.

Note that the ID management server 31 has a configuration similar to the configuration of the distribution server 30 illustrated in FIG. 13.

(Flow of Processing in Case of Sharing Program Information)

Figure 40:
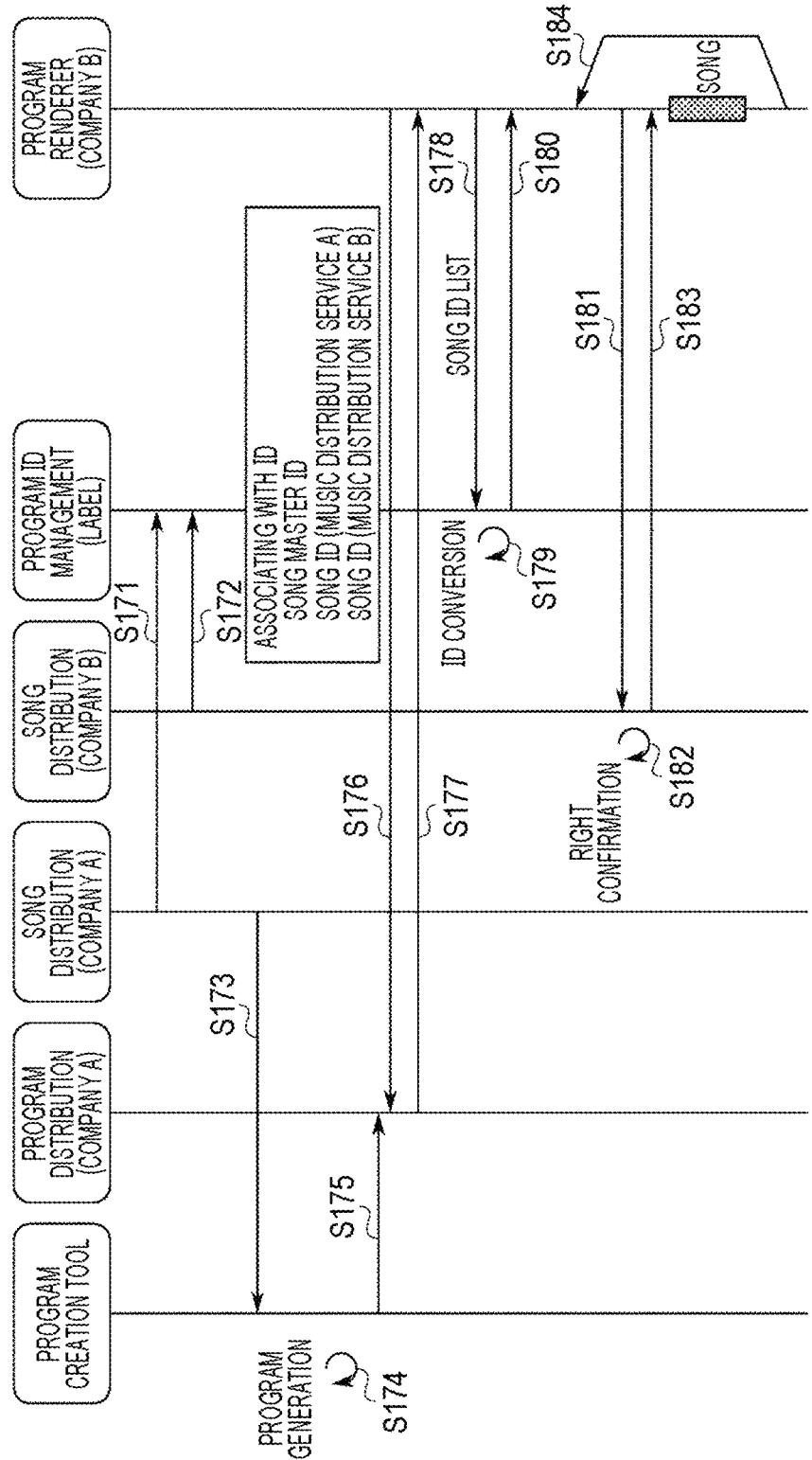
FIG. 40 is a sequence diagram illustrating a flow of processing in a case where song IDs are managed and program information is shared.

FIG. 40 is a sequence diagram illustrating a flow of processing in a case where song IDs are managed and program information is shared.

In the example of FIG. 40, the fact that the program creation tool and the program renderer are executed by the terminal devices of the creator and the user, respectively, and the program distribution service and the music distribution service are provided by the respective distribution servers is similar to the first example described with reference to FIG. 15, and the like.

Furthermore, in the example of FIG. 40, it is assumed that the song distribution server 30B-1 of the company A that provides the music distribution service A and the song distribution server 30B-2 of the company B that provides the music distribution service B are provided, and the program distribution server 30A is provided by the company A.

Furthermore, the ID management server 31 that manages program IDs is provided. Moreover, it is assumed that, in the user terminal device 20, the program renderer as the music distribution app provided by the company B is executed.

The ID management server 31 receives each of the song ID used in the music distribution service A transmitted from the song distribution server 30B-1 of the company A and the song ID used in the music distribution service B transmitted from the song distribution server 30B-2 of the company B (S171 and S172). These song IDs are original IDs owned by each of the company A and the company B.

In the ID management server 31, the song ID used in the music distribution service A and the song ID used in the music distribution service B are managed in association with each other using a song master ID.

In steps S173 to S175, similarly to steps S11 to S13 in FIG. 15, the program creation tool executed by the creator terminal device 10 generates the script of the program including the song to which the song ID of the company A is assigned on the basis of the song list or the like transmitted from the song distribution server 30B-1 of the company A, and the script is registered in the program distribution server 30A of the company A.

At this time, in the user terminal device 20, the program renderer of the company B is executed, and in a case where an instruction on reproduction of the podcast program published to be browsable on the program distribution server 30A is given by the operation of the user who has a contract with the music distribution service B, the script of the program distributed from the program distribution server 30A is received (S176 and S177).

The program renderer of the company B transmits a list of song IDs of the company A set in the received script to the ID management server 31, and requests conversion of the song IDs (S178).

In response to the request from the program renderer, the ID management server 31 converts the list of the song IDs of the company A into a list of song IDs of the company B and transmits the list to the program renderer of the company B (S179 and S180).

That is, while the song ID set in the script of the program is the original ID of the company A, the user has a contract with the music distribution service B of the company B, and thus the song specified by the song ID cannot be reproduced as it is using the music distribution service B.

Accordingly, the ID management server 31 converts the original song ID of the company A into the original song ID of the company B by the ID conversion, so that the song specified by the song ID of the company A set in the script can be reproduced using the music distribution service B of the company B.

The program renderer requests the song distribution server 30B-2 that provides the music distribution service B to distribute the song specified by the converted song ID (S181).

In the song distribution server 30B-2 of the company B, the right acquired by the contract with the music distribution service B by the user is confirmed in response to the request from the program renderer (S182), and in a case where it is determined that the song specified by the song ID can be reproduced, streaming distribution of the song is performed to the program renderer of the company B (S183).

Thus, in the program renderer of the company B, the streaming data of the song distributed from the song distribution server 30B-2 of the company B is received, and the rendering processing is performed, so that the song specified by the song ID is reproduced.

Note that although omitted here for the sake of easy understanding, in the script of the podcast program, the song ID is programmed together with the texts of the foreword and the afterword. Thus, the song is reproduced after the voice of the portion of the foreword introducing the song specified by the song ID is reproduced, and the voice of the portion of the afterword is reproduced after the song is reproduced.

Furthermore, in the script of the podcast program, since the song IDs of a plurality of songs are programmed together with the texts of the foreword and the afterword of the song, after the processing of steps S181 to S183 is completed, the processing returns to step S181 (S184) and the processing of steps S181 to S184 is repeated.

Thus, in the program renderer of the company B, reproduction is repeatedly performed in the order of the foreword, the song (the song distributed by the music distribution service B of the company B), and the afterword for each song ID of the company A set in the script of the program.
(Overall Image of Processing)

Figure 41:
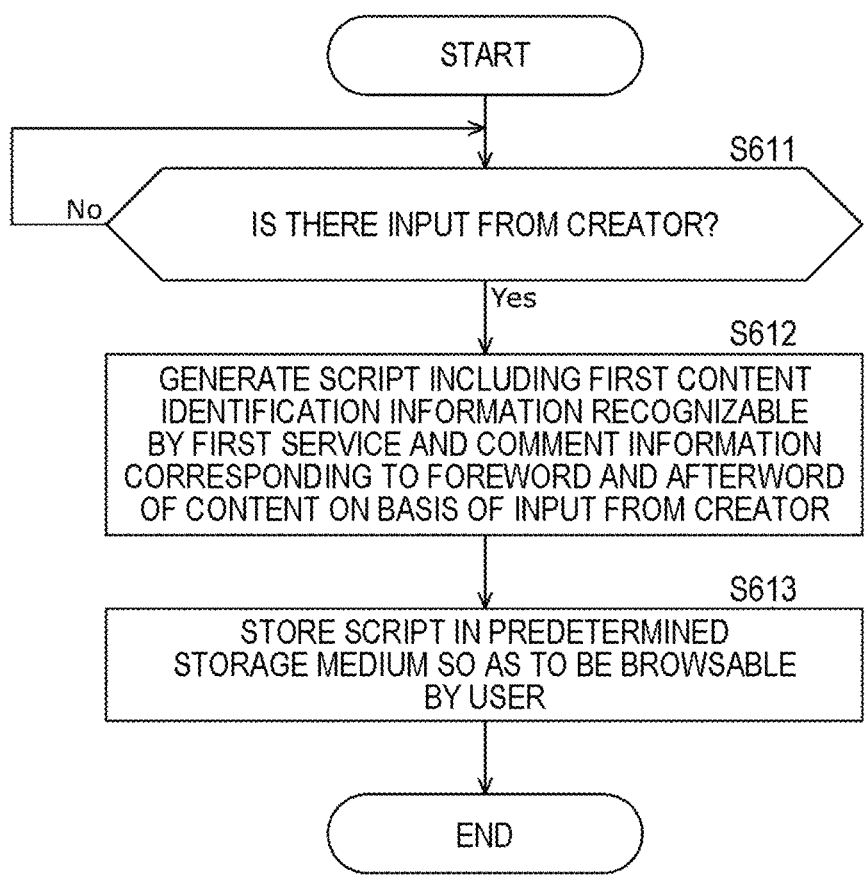
FIG. 41 is a flowchart describing an overall image of processing in a modification example.
Figure 42:
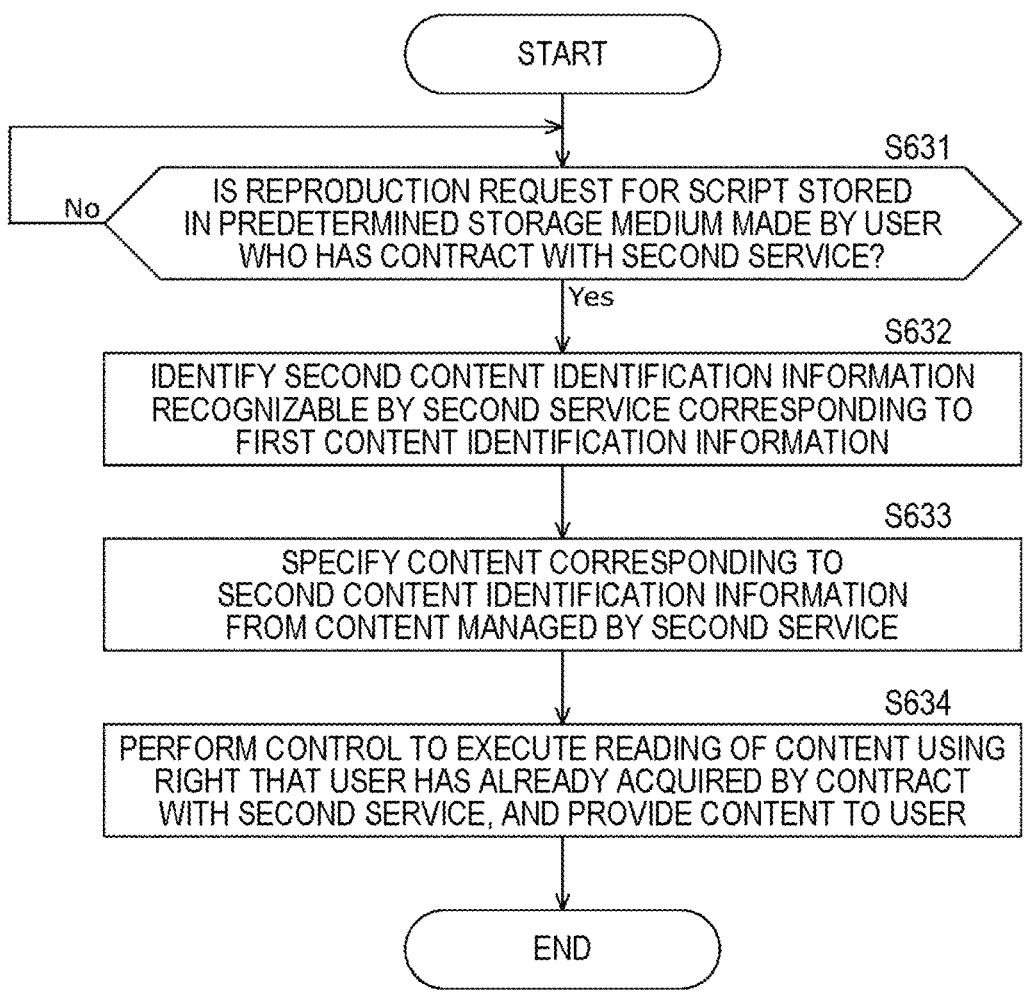
FIG. 42 is a flowchart describing an overall image of processing in a modification example.

FIGS. 41 and 42 are flowcharts describing an overall image of processing in a modification example.

The processing illustrated in FIGS. 41 and 42 is implemented by (the control unit 100 of) the creator terminal device 10, (the control unit 200 of) the user terminal device 20, (the control unit 300 of) the distribution server 30, and (the control unit of) the ID management server 31 in the content providing system to which the present technology is applied operating in cooperation.

In the content providing system 1, as illustrated in FIG. 41, in a case where there is an input from a creator who uses the creator terminal device 10 ("Yes" in S611), a script including first content identification information that can be recognized by the first service and the comment information corresponding to the foreword and the afterword of the content is generated on the basis of the input from the creator (S612), and the script is stored in a predetermined storage medium to be browsable by the user (S613).

Here, the content includes a song and the like distributed by the music distribution service, and the identification information of the content includes a song ID or the like that can identify the song. Furthermore, the foreword and the afterword are examples of comments on the content, and it is only required that at least one of the foreword or the afterword is set.

The comment information includes text indicating a comment, link information to a raw voice, or the like. Further, the first service is, for example, the music distribution service A provided by the company A. The predetermined storage medium can be, for example, the database 353 of the program distribution server 30A.

Furthermore, in the content providing system 1, as illustrated in FIG. 42, in a case where a reproduction request for the script stored in the predetermined storage medium is made by the user contracted with the second service ("Yes" in S631), control is performed to specify second content identification information that can be recognized by the second service corresponding to the first content identification information (S632), specify the content corresponding to the second content identification information from the content managed by the second service (S633), execute reading of the content using the right that the user has already acquired by the contract with the second service, and provide the content to the user (S634).

Here, the second service is, for example, the music distribution service B provided by the company B, and the right that the user has already acquired include rights of a pay premium user, a free user, and the like.
(Other Modification Examples)

Note that, in the user terminal device 20, when the song is reproduced by the program renderer, it is also possible to achieve a video jockey (VJ) by adding a character or an image.

6. Configuration of Computer

The processes of respective steps of the above-described flowcharts can be executed by hardware or software. In a case where the series of processes is executed by software, a program constituting the software is installed in a computer of each device.

The program executed by the computer can be provided, for example, by being recorded in a removable recording medium as a package medium or the like. Furthermore, the program can be provided via a wired or wireless transmission medium such as a local area network, the Internet, or digital satellite broadcasting.

In the computer, the program can be installed in the storage unit via the input-output I/F by attaching the removable recording medium to the drive. Furthermore, the program can be received by the communication unit via a wired or wireless transmission medium and installed in the storage unit. In addition, the program can be installed in advance in the ROM or the storage unit.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology. For example, the present technology can take a configuration of cloud computing in which one function is shared by a plurality of devices via a network and processed jointly.

Furthermore, each step described in the above-described flowcharts can be executed by one device, or can be executed in a shared manner by a plurality of devices. Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

Note that the present technology can also employ the following configurations.

(1)
A content providing system in which a script that is generated by a creator and includes identification information of content and comment information is stored in a predetermined storage medium to be browsable by a user, the content providing system including
 a control unit that performs control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

(2)
The content providing system according to (1) above, in which
 the control unit performs control to synthesize, according to the script selected by the user, a voice of a text as the comment information included in the script, and provide the voice to the user.

(3)
The content providing system according to (1) above, in which
 the control unit performs control to access, according to the script selected by the user, link information to voice data as the comment information included in the script, read the voice data, and provide the voice data to the user.

(4)
The content providing system according to any one of (1) to (3) above, in which
 when a request for playlist reproduction is received by the user, the control unit performs control in such a manner that, according to the script selected by the user, reading of a comment according to the comment information included in the script is not performed, and content indicated by content identification information included in the script is read and provided to the user.

(5)
The content providing system according to any one of (1) to (4) above, in which
 the control unit,
 with a script that is generated by the creator and includes identification information of content, first comment information corresponding to a foreword introducing the content, and second comment information corresponding to an afterword after reproduction of the content being stored in a predetermined storage medium to be browsable by the user, performs control to
 read the foreword according to a script selected by the user and according to the first comment information included in the script, and provide the foreword to the user,
 read content indicated by content identification information subsequent to the first comment information and provide the content to the user, and
 read the afterword according to the second comment information subsequent to the content identification information and provide the afterword to the user.

(6)
The content providing system according to (1) above, in which
 the control unit,
 with a script that is generated by the creator and includes content identification information recognizable by a specific service and comment information being stored in a predetermined storage medium to be browsable by the user,
 performs, according to a script selected by the user, control to execute reading content indicated by content identification information included in the script by using a right that the user has already acquired by a contract with the specific service and provide the content to the user, and read a comment according to the comment information included in the script and provide the comment to the user at least one of before or after the provision of the content.

(7)
The content providing system according to (6) above, in which
 the control unit,
 with a script that is generated by the creator and includes content identification information recognizable by a first service, metadata for searching for content, and comment information being stored in a predetermined storage medium to be browsable by the user,
 performs, when the script is selected by the user who has a contract with a second service different from the first service, control to specify corresponding content by content managed by the second service by the metadata, and execute reading of the content by using the right that the user has already acquired by the contract with the second service and provide the content to the user.

(8)

The content providing system according to (7) above, in which the control unit, when the script is selected by the user who has the contract with the second service, and when the corresponding content has not been specified from the content managed by the second service by the metadata, performs control to skip reading of the content and the corresponding comment.

(9)

The content providing system according to (7) above, in which the control unit, when the script is selected by the user who has the contract with the second service, and when the corresponding content has not been specified from the content managed by the second service by the metadata, performs control to execute reading sample data corresponding to the content managed by the first service and provide the sample data to the user.

(10)

The content providing system according to any one of (1) to (9) above, in which the control unit analyzes comment content indicated by the comment information included in the script before the script generated by the creator is stored in the predetermined storage medium, and in a case where it is determined that the comment is not appropriate as a comment regarding the content on the basis of an analysis result, performs control to notify the user of the determination.

(11)

The content providing system according to (10) above, in which in a case where it is determined that the comment is not appropriate as the comment regarding the content, the control unit performs control to notify the user of an inappropriate portion of the comment.

(12)

The content providing system according to (10) or (11) above, in which in a case where it is determined that the comment is not appropriate as the comment regarding the content, the control unit performs control in such a manner that a script including the comment information corresponding to the comment is not stored in the predetermined storage medium.

(13)

The content providing system according to any one of (1) to (12) above, in which the control unit analyzes content of a comment indicated by the comment information included in the script selected by the user, and performs, according to a result of the analysis, control in such a manner that advertisement data acquired from an advertisement distribution server is provided to the user before a comment to be provided before provision of the content to the user, or after a comment to be provided after provision of the content to the user.

(14)

The content providing system according to (13) above, in which the control unit performs control to perform synthesis of a voice of a text as the comment information included in a script selected by the user with specific phonemes according to the script and provide the voice to the user, and perform synthesis of a voice of a text as the advertisement data with the specific phonemes and provide the voice to the user.

(15)

The content providing system according to (13) or (14) above, in which the control unit analyzes content of a text as the comment information included in the script selected by the user.

(16)

The content providing system according to (1) above, in which master identification information that identifies specific content and content identification information with which each service is capable of recognizing the specific content are managed in association with each other by a management database, and the control unit, with a script that is generated by the creator and includes first content identification information recognizable by a first service and comment information being stored in a predetermined storage medium to be browsable by the user, specifies, when the script is selected by a user who has a contract with a second service different from the first service, according to the management database, second content identification information that corresponds to the first content identification information and that is recognizable by the second service, specifies content corresponding to the second content identification information by content managed by the second service, and executes reading content using a right that the user has already acquired by a contract with the second service and provides the content to the user.

(17)

The content providing system according to any one of (1) to (16) above, in which the content includes a song, the comment includes at least one of a foreword or an afterword set to the song, and the specific service includes a music distribution service contracted by the user.

(18)

The content providing system according to any one of (1) to (17) above, further including:

a first terminal device used by the creator;

a second terminal device used by the user;

a first server that has the predetermined storage medium that stores the script; and a second server that distributes the content.

(19)

A content providing method in which a script that is generated by a creator and includes identification information of content and comment information is stored in a predetermined storage medium to be browsable by a user, the content providing method including performing control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

(20)

A storage medium recording a program in which a script that is generated by a creator and includes identification information of content and comment information is stored in a predetermined storage medium to be browsable by a user, the program causing a computer to function as a control unit that performs control to execute reading, according to a script selected by the user, content indicated by content identification information included in the script by using a right that the user has already acquired by a contract with a specific service, and provide the content to the user, and control to read a comment according to the comment information included in the script and provide the comment to the user at least one of before or after the provision of the content.

REFERENCE SIGNS LIST

1 Content providing system
10 Creator terminal device
20 User terminal device
30 Distribution server
30A Program distribution server
30B Song distribution server
30C Voice distribution server
30D Advertisement distribution server
31 ID management server
50 Network
100 Control unit
101 CPU
102 ROM
103 RAM
104 Bus
105 Input unit
106 Output unit
107 Storage unit
108 Communication unit
109 Near-field wireless communication unit
110 Input-output I/F
111 Operation unit
112 Camera unit
113 Sensor unit
121 Display unit
122 Sound output unit
151 Input reception unit
152 Song information acquisition unit
153 Program generation unit
154 Voice information acquisition unit
155 Voice generation unit
156 Registration unit
200 Control unit
201 CPU
202 ROM
203 RAM
204 Bus
205 Input unit
206 Output unit
207 Storage unit
208 Communication unit
209 Near-field wireless communication unit
210 Input-output I/F
211 Operation unit
212 Camera unit
213 Sensor unit
221 Display unit
222 Sound output unit
251 Program acquisition unit
252 Song acquisition unit
253 Voice acquisition unit
254 Renderer unit
255 Presentation control unit
300 Control unit
301 CPU
302 ROM
303 RAM
304 Bus
305 Input unit
306 Output unit
307 Storage unit
308 Communication unit
309 Drive
310 Input-output I/F
351 Input reception unit
352 Distribution processing unit
353 Database
361 Sentence check unit

The invention claimed is:

1. A content providing system wherein a script that is generated by a creator and includes identification information of content and comment information is stored in a predetermined storage medium to be browsable by a user, the content providing system comprising:
processing circuitry configured to
execute reading, according to a script selected by the user, content indicated by content identification information included in the script,
at a time of distributing the content to a user terminal device, distribute the content identification information so that the content streamed by a specific service is reproduced on the user terminal device based on the content identification information,
automatically clear copyright for the content reproduced on the user terminal using the content identification information based on a right for listening to the content that the user has already acquired by a contract with the specific service,
analyze comment content indicated by the comment information included in the script before the script generated by the creator is stored in the predetermined storage medium,
in a case where it is determined that the comment is not appropriate as a comment regarding the content based on an analysis result, notify the user of the determination, and
provide the content to the user, and control to read a comment according to the comment information included in the script and provide the comment to the user at least one of before or after the provision of the content.

2. The content providing system according to claim 1, wherein the processing circuitry is further configured to
synthesize, according to the script selected by the user, a voice of a text as the comment information included in the script, and provide the voice to the user.

3. The content providing system according to claim 1, wherein the processing circuitry is further configured to
access, according to the script selected by the user, link information to voice data as the comment information included in the script, read the voice data, and provide the voice data to the user.

4. The content providing system according to claim 1, wherein the processing circuitry is further configured to when a request for playlist reproduction is received by the user according to the script selected by the user, not read a comment according to the comment information included in the script, and read and provide content indicated by content identification information included in the script to the user.

5. The content providing system according to claim 1, wherein,
the processing circuitry, with a script that is generated by the creator and includes identification information of content, first comment information corresponding to a foreword introducing the content, and second comment information corresponding to an afterword after reproduction of the content being stored in a predetermined storage medium to be browsable by the user, is further configured to
read the foreword according to a script selected by the user and according to the first comment information included in the script, and provide the foreword to the user,
read content indicated by content identification information subsequent to the first comment information and provide the content to the user, and
read the afterword according to the second comment information subsequent to the content identification information and provide the afterword to the user.

6. The content providing system according to claim 1, wherein
the processing circuitry, with a script that is generated by the creator and includes content identification information recognizable by a specific service and comment information being stored in a predetermined storage medium to be browsable by the user, is further configured to
according to a script selected by the user, read content indicated by content identification information included in the script by using a right that the user has already acquired by a contract with the specific service and provide the content to the user, and read a comment according to the comment information included in the script and provide the comment to the user at least one of before or after the provision of the content.

7. The content providing system according to claim 6, wherein
the processing circuitry, with a script that is generated by the creator and includes content identification information recognizable by a first service, metadata for searching for content, and comment information being stored in a predetermined storage medium to be browsable by the user, is further configured to
when the script is selected by the user who has a contract with a second service different from the first service, specify corresponding content by content managed by the second service by the metadata, and execute reading of the content by using the right that the user has already acquired by the contract with the second service and provide the content to the user.

8. The content providing system according to claim 7, wherein the processing circuitry is further configured to
when the script is selected by the user who has the contract with the second service, and when the corresponding content has not been specified from the content managed by the second service by the metadata, skip reading of the content and the corresponding comment.

9. The content providing system according to claim 7, wherein the processing circuitry is further configured to when the script is selected by the user who has the contract with the second service, and when the corresponding content has not been specified from the content managed by the second service by the metadata, execute reading sample data corresponding to the content managed by the first service and provide the sample data to the user.

10. The content providing system according to claim 1, wherein the processing circuitry is further configured to
in a case where it is determined that the comment is not appropriate as the comment regarding the content, notify the user of an inappropriate portion of the comment.

11. The content providing system according to claim 1, wherein the processing circuitry is further configured to
in a case where it is determined that the comment is not appropriate as the comment regarding the content, not store a script including the comment information corresponding to the comment in the predetermined storage medium.

12. The content providing system according to claim 1, wherein the processing circuitry is further configured to
analyze content of a comment indicated by the comment information included in the script selected by the user, and
according to a result of the analysis, provide advertisement data acquired from an advertisement distribution server to the user before a comment to be provided before provision of the content to the user, or after a comment to be provided after provision of the content to the user.

13. The content providing system according to claim 12, wherein the processing circuitry is further configured to
perform synthesis of a voice of a text as the comment information included in a script selected by the user with specific phonemes according to the script and provide the voice to the user, and
perform synthesis of a voice of a text as the advertisement data with the specific phonemes and provide the voice to the user.

14. The content providing system according to claim 12, wherein the processing circuitry is further configured to
analyze content of a text as the comment information included in the script selected by the user.

15. The content providing system according to claim 1, wherein
master identification information that identifies specific content and content identification information with which each service is capable of recognizing the specific content are managed in association with each other by a management database, and
the processing circuitry, with a script that is generated by the creator and includes first content identification information recognizable by a first service and comment information being stored in a predetermined storage medium to be browsable by the user, is further configured to
specify, when the script is selected by a user who has a contract with a second service different from the first service, according to the management database, second content identification information that corresponds to the first content identification information and that is recognizable by the second service,
specify content corresponding to the second content identification information by content managed by the second service, and execute reading content using a right that the user has already acquired by a contract with the second service and provides the content to the user.

16. The content providing system according to claim 1, wherein
the content includes a song,
the comment includes at least one of a foreword or an afterword set to the song, and
the specific service includes a music distribution service contracted by the user.

17. The content providing system according to claim 1, further comprising:
a first terminal device used by the creator;
a second terminal device used by the user;
a first server that has the predetermined storage medium that stores the script; and
a second server that distributes the content.

18. A content providing method wherein a script that is generated by a creator and includes identification information of content and comment information is stored in a predetermined storage medium to be browsable by a user, the content providing method comprising:
executing reading, according to a script stored in the predetermined storage medium of a distribution server and selected by the user, content indicated by content identification information included in the script by using a right for listening to the content that the user has already acquired by a contract with a specific service;
at a time of distributing the content to a user terminal device, distributing the content identification information so that the content streamed by a specific service is reproduced on the user terminal device based on the content identification information;
automatically clearing copyright for the content reproduced on the user terminal using the content identification information based on a right for listening to the content that the user has already acquired by a contract with the specific service;
analyzing comment content indicated by the comment information included in the script before the script generated by the creator is stored in the predetermined storage medium;
in a case where it is determined that the comment is not appropriate as a comment regarding the content based on an analysis result, notifying the user of the determination;
providing the content to the user; and
reading a comment according to the comment information included in the script and providing the comment to the user at least one of before or after the provision of the content.

19. A non-transitory computer-readable storage medium recording a program wherein a script that is generated by a creator and includes identification information of content and comment information is stored in a predetermined storage medium to be browsable by a user, the program causing a computer to perform a method, the method comprising:
executing reading, according to a script selected by the user, content indicated by content identification information included in the script by using a right to listen to the content that the user has already acquired by a contract with a specific service;
at a time of distributing the content to a user terminal device, distributing the content identification information so that the content streamed by a specific service is reproduced on the user terminal device based on the content identification information;
automatically clearing copyright for the content reproduced on the user terminal using the content identification information based on a right for listening to the content that the user has already acquired by a contract with the specific service;
analyzing comment content indicated by the comment information included in the script before the script generated by the creator is stored in the predetermined storage medium;
in a case where it is determined that the comment is not appropriate as a comment regarding the content based on an analysis result, notifying the user of the determination;
providing the content to the user; and
reading a comment according to the comment information included in the script and provide the comment to the user at least one of before or after the provision of the content.

* * * * *